c
United States Patent
Ueno et al.

(12) United States Patent
(10) Patent No.: US 7,103,845 B2
(45) Date of Patent: Sep. 5, 2006

(54) TERMINAL APPARATUS FOR OPERATOR AND COMMUNICATION PATH SETTING METHOD

(75) Inventors: Michiko Ueno, Niiza (JP); Hidetoshi Iwasaki, Kawasaki (JP); Masaaki Nagano, Koganei (JP); Shinichi Izawa, Sagamihara (JP); Tooru Nakao, Tachikawa (JP); Youko Yamamoto, Tsukui-gun (JP); Hakaru Nakagawa, Hino (JP); Yasushi Ariga, Fuchu (JP); Tatsuko Akimoto, Tokyo (JP); Kiyoshi Yamaguchi, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 906 days.

(21) Appl. No.: 09/982,908

(22) Filed: Oct. 22, 2001

(65) Prior Publication Data

US 2002/0029294 A1 Mar. 7, 2002

Related U.S. Application Data

(63) Continuation of application No. PCT/JP01/01270, filed on Feb. 21, 2001.

(30) Foreign Application Priority Data

Feb. 21, 2000 (JP) ........................ 2000-043277

(51) Int. Cl.
*G06F 13/00* (2006.01)

(52) U.S. Cl. ....................................... 715/744; 715/734

(58) Field of Classification Search ................. 715/744, 715/734, 740, 742, 743; 345/763, 765, 853, 345/854; 709/226, 228

See application file for complete search history.

(56) References Cited

U.S. PATENT DOCUMENTS 6,480,901 B1 * 11/2002 Weber et al. ................ 709/246
6,769,022 B1 * 7/2004 DeKoning et al. .......... 709/223

FOREIGN PATENT DOCUMENTS

EP 0 820 203 A2 1/1998

OTHER PUBLICATIONS

Hiroshi Asou, et al., "Network Operation System", NEC Gihou, vol. 46, No. 5, pp. 41–53, Kabushiki Kaisha Nihon Denki Bunka Center, Jun. 15, 1993 (15.0693) (CS–NH–1998–00137–001) p. 47, right column to p. 49, left column; p. 52, left column; Fig. 6; table 6; photographs 5–7.
Hiroyuki Kan, "Kousoku Koutaiiki Network you Ami Kanri System", Hitachi Hyouron, vol. 77, No. 9, pp. 27–30, Hitachi Hyouronsha, Sep. 1, 1995 (CS–NH–1998–00235–006) p. 27, drawings; p. 29 left column to p. 30, left column, Fig. 3.
"Hitachi HI–UX/WE2 Sougou Network Kanri System/Network Hyouji NETM/EYE Kaisetsu, Tebiki, Sousasho" the $2^{nd}$ printing, Hitachi Ltd., Jun. 1, 1994 (CS–NA–1998–00302–001) p. 110 "(6) buzzer no Settei wo suru", table 4.3–1 p. 22, pp. 156–159.

(Continued)

*Primary Examiner*—Cao (Kevin) Nguyen
(74) *Attorney, Agent, or Firm*—Oblon, Spivak, McClelland, Maier & Neustadt, P.C.

(57) ABSTRACT

On a screen of a display unit, all NODEs in a ring network to which a connected node (NODE) belongs are minimized and displayed on a screen of a display unit, and a line connecting NODEs with each other is displayed between respective NODE icons. Display colors of the NODE icon and the line icon are changed depending on presence/absence of a failure. Further, a display color of each object displayed in each window varies in a plurality of stages in accordance with a degree of a failure.

27 Claims, 52 Drawing Sheets

OTHER PUBLICATIONS

"Fujitsu SNMP Manager Setsumeisho", 99SP-2530-1, the 1st printing, Fujitsu Ltd., et al., Jan. 31, 1994 (CS-NA-2000-00944-001) pp. 55-70, Figs. 4.1, 4.2, 4.4., 4.5.

Yasumasa Iwase et al., "Service no Koudoka ni taioushi, Network no1gen Kanri wo Jitsugen; Atarashii Kousoku Digital Senyou Sen System No Seigyo, Operation kei no Kousei", NTT Gijutsu Journal, vol. 2, No. 7, pp. 19-23 Shadan Houjin Denki Tsushin Kyoukai, Jul. 1, 1990 Fig. 2.

Yuuji Tokunaga "Service Operation System Platform" NTT R&D, vol. 42, No. 2, pp. 195-200, Shadan Houjin Denki Tsuushin Kyoukai, Feb. 10, 1993, (CS-NH-1999-00267-010), p. 197 ("3.1 Zentai Kouse").

H. Yamaguchi "UNIX Communication Notes 128 Network Kanri (12) Account Kanri", UNIX Magazine, vol. 14, No. 2, pp. 14-21, Kabushiki Kaisha Askii, Feb. 1, 1999 (CS-ND-1999-00039-00) pp. 17-18 ("Password no Yukou Kigen Settei"), List 2.

"Hitachi Multimedia Kousoku Kikan Network; Super LAN Σ—600 Kaisetsusho", 8080-2-156-10, the 2nd printing, (CS-NA-1998-04194-001) p. 4, (Figs. 1.4.1).

"SDH you Pass Kanri System on Kaihatsu" NEC Gihou, vol. 51, No. 5, p. 115, lower column, Kabushiki Kaisha NEC Creative, May 25, 1998, Full text; all drawings.

Kunio Hoshizawa et al., "Kaisen Unyou wo Shien suru Network Operation System" NTT Gijutsu Journal, vol. 1, No. 8, pp. 12-19, Shadan Houjin Denki Tsushin Kyoukai, Nov. 1, 1989, Fig. 3.

Naoki Ishii et al., "SDH Network no Unyou, Kanri", NEC Gihou, vol. 46, No. 5, pp. 62-68, Kabushiki Kaisha Nihon Denki Bunka Center, Jun. 15, 1993, Full text, all drawings.

Hiroshi, Sakano et al., "NETMOS ni yoru Dai kibo, Kou Shinraisei Computer kei Manager", NEC Gihou, vol. 46, No. 8, pp. 54062, Kabushiki Kaisha Nihon Denki Bunka (CS-NH-1998-00140-010) Full text; all drawings.

Kouhei Hayakawa "SNMP to Network Kanri Soft; Senyou Software wo Riyou shita Network Kanri", Software Design, No. 87, pp. 26-33, Kabushiki Kaisha Gijutsu Hyoronsha, Jan. 18, 1998 (CS-ND-1997-00812-002) Full text; all drawings.

Shougo Ayame et al., "Hikari Ring Kanshi System", Toshiba Review, vol. 55, No. 4, pp. 45-48, Toshiba Corporation, Apr. 4, 2000 Full text; all drawings.

* cited by examiner

Item Selection (Row)

Event Type
- ☑ Communications Alarm
- ☑ Environmental Alarm
- ☐ Equipment Alarm
- ☐ Object Creation
- ☐ Object Deletion
- ☐ Protection Switch Reporting
- ☐ Quality of Service Alarm
- ☑ Security Alarm
- ☐ State Change Shelf
- ☐ COM
- ☐ FAN
- ☐ FUSE1
- ☐ FUSE2
- ☑ HS
- ☑ LS#1
- ☑ LS#2
- ☑ LS#3
- ☑ LS#4

Card

All Set   All Clear

OK   Cancel

FIG. 12

Scroll (Vertically)

FIG. 45

APS Control

Node/Channel : [　　]

Wait-to-Restore Time : [　　] ○ Minute ○ Hour ○ Day ○ Infinite

Wait-to-Response Time : [　　] X10msec

Request Guard Time : [　　] ○ X10msec ○ Sec

Console

[ Set ]　[ Quit ]

F I G. 50

Node/Channel Selection

Node : #1

Channel : [　▶　]

[ Read ]　[ Cancel ]

F I G. 51

User Control

| User Name | Password Valid Date | Access Level |
|---|---|---|
| | | |

[Add User] [Delete User]
[Change Password] [Change Access Level]
[Password Validity]
[Quit]

FIG. 56

Add User

User Name : _____
Password : _____
Confirm Password : _____

Access Level
○ Level-A  ○ Level-B  ○ Level-C

[OK] [Cancel]

FIG. 57

| Ring Topology Map Configuration | | | | | |
|---|---|---|---|---|---|
| Node | | Ring Node ID | | Self Node ID | |
| A | [ ] | | [ ] | | |
| B | [ ] | | [ ] | | |
| C | [ ] | | [ ] | | |
| D | [ ] | | [ ] | | |
| E | [ ] | | [ ] | | |
| F | [ ] | | [ ] | | |
| G | [ ] | | [ ] | | |
| H | [ ] | | [ ] | | |
| I | [ ] | | [ ] | | |
| J | [ ] | | [ ] | | |
| K | [ ] | | [ ] | | |
| L | [ ] | | [ ] | | |
| M | [ ] | | [ ] | | |
| N | [ ] | | [ ] | | |
| O | [ ] | | [ ] | | OK |
| P | [ ] | | [ ] | | Cancel |

FIG. 68

TERMINAL APPARATUS FOR OPERATOR AND COMMUNICATION PATH SETTING METHOD

CROSS-REFERENCE TO RELATED APPLICATIONS

This is a Continuation Application of PCT Application No. PCT/JP01/01270, filed Feb. 21, 2001, which was not published under PCT Article 21(2) in English.

This application is based upon and claims the benefit of priority from the prior Japanese Patent Application No. 2000-043277, filed Feb. 21, 2000, the entire contents of which are incorporated herein by reference.

BACKGROUND OF THE INVENTION

1. Field of the Invention

The present invention relates to a terminal apparatus for an operator for managing a system in an information transmission system, for example, an information transmission system such as an optical undersea cable system and to a communication path setting method using this terminal apparatus for an operator.

2. Description of the Related Art

In general, to a transmission system are provided a node for transmitting communication data and a supervisory control apparatus for providing OAM (Operations, Administration and Maintenance) services to a communication network. In addition to this, in recent years, it is often the case that a terminal apparatus (which will be referred to as a terminal apparatus for an operator hereinafter) which is portable and can readily perform processing such as simple setting maintenance of the node and the like.

Meanwhile, the recent global spread of networks increases a number of devices constituting each network, and a number of supervisory control targets (for example, nodes) is thereby increasing. Therefore, the operation in the supervisory control apparatus as well as the terminal apparatus for an operator becomes considerably troublesome and advanced, and the burden of operators is getting large.

As described above, in the recent transmission system, the operation in the supervisory control apparatus or the terminal apparatus for an operator becomes troublesome and advanced, and provision of any countermeasure is demanded.

In order to solve the above-described problem, it is an object of the present invention to provide a terminal apparatus for an operator and a communication path setting method which can improve the human-machine interface and enhance the convenience in the operation.

BRIEF SUMMARY OF THE INVENTION

To achieve this aim, the present invention provides the following means.

According to the present invention, there is provided a terminal apparatus for an operator used when connected to an arbitrary node in a network system including a plurality of ring networks each of which includes a plurality of nodes connected to each other through a communication line, the terminal apparatus for an operator comprising: a display unit; operating means for accepting click operations from a user; information acquiring means for acquiring from a connected node notification information concerning the ring network to which the node belongs; information processing means for managing statuses of occurrence of a failure in the network based on the notification information acquired by this information acquiring means; and display controlling means for displaying information processed by this information processing means on the display unit, wherein the display controlling means displays on the display unit a node icon associated with each node belonging to a ring network to which a node connected with its own apparatus belongs, and displays on the display unit a line associated with the communication line between these node icons so that display modes of the node icon and the line differ from each other depending on presence/absence of a failure in a corresponding node or communication line.

By doing so, a node or a communication line in which a failure is generated can be recognized at a glance, and the human-machine interface can be improved.

According to the present invention, there is provided a terminal apparatus for an operator used when connected to an arbitrary node in a network system including a plurality of ring networks each of which includes a plurality of nodes, the terminal apparatus for an operator comprising: a display unit; operating means for accepting click operations by a user; information acquiring means for acquiring from a connected node notification information concerning a ring network to which that node belongs; information processing means for managing statuses of the network system based on the notification information acquired by this information acquiring means; and display controlling means for displaying on the display unit information processed by this information processing means, wherein the display controlling means displays a third window on a screen of the display unit, and displays in the third window a list of notification information acquired by the information acquiring means in a text format together with a plurality of attributes characterizing each set of the notification information.

As a result, a list of the notification information acquired from the node can be grasped at glance.

According to the present invention, there is provided a terminal apparatus used when connected to an arbitrary noted in a network system including a plurality of ring networks each of which includes a plurality of nodes, each node including storing means for accumulating a history of notification information concerning network management, the terminal apparatus for an operator comprising: a display unit; operating means for accepting click operations by a user; information acquiring means for acquiring from a connected node notification information concerning a ring network to which that node belongs; information processing means for managing statuses of the network system based on the notification information acquired by this information acquiring means; and display controlling means for displaying information processed by this information processing means on the display unit, wherein the display controlling means displays an eighth window on a screen of the display unit, and displays on the eighth window a retrieval condition specification section for specifying retrieval conditions for retrieving desired notification information from a history accumulated in the storing means;

wherein the information processing means retrieves notification information satisfying the retrieval conditions specified in the eighth window from the history accumulated in the storing means; and the display controlling means displays a ninth window on the screen of the display unit, and displays in the ninth window the notification information retrieved by the information processing means in a text format together with a plurality of attributes characterizing the retrieved notification information.

Consequently, it is possible to display a list of notification information satisfying desired conditions from a history of the notification information accumulated in a data base on its own apparatus by the node, and the procedure for displaying this list can be facilitated.

According to the present invention, there is provided a terminal apparatus for an operator used when connected to an arbitrary node in a network system including a plurality of ring networks each of which includes a plurality of nodes, each node including storing means for accumulating a history of notification information including at least quality information relating to communication quality in the network system, the terminal apparatus for an operator comprising: a display unit; operating means for accepting click operations by a user; information acquiring means for acquiring from a connected node notification information concerning a ring network to which that node belongs; information processing means for managing statuses of the network system based on the notification information acquired by this information acquiring means; and display controlling means for displaying on the display unit information processed by this information processing means, wherein the display controlling means displays a seventh button on a screen of the display unit, displays a 12th window on the screen of the display unit when the seventh button is clicked by the operating means, and displays in the 12th window a retrieval condition specification section for specifying retrieval conditions for retrieving desired notification information from a history accumulated in the storing means;

wherein the information processing means retrieves the notification information satisfying the retrieval conditions specified in the 12th window from the history accumulated in the storing means; and the display controlling means displays in the 12th window notification information retrieved by the information processing means in a text format together with a plurality of attributes characterizing the retrieved notification information.

By doing so, a result of retrieving quality information can be grasped at a glance, which is convenient.

According to the present invention, there is provided a terminal apparatus for an operator used when connected to an arbitrary node in a network system including a plurality of ring networks each of which includes a plurality of nodes, the terminal apparatus for an operator comprising: a display unit; information acquiring means for acquiring notification information respectively transmitted from a plurality of the nodes; information processing means for managing occurrence statuses of an alarm in the network system based on the notification information acquired by this information acquiring means; and display controlling means for displaying on the display unit information processed by this information processing means, wherein the display controlling means displays a ninth button on a screen of the display unit, displays on the screen of the display unit a 14th window when the ninth button is clicked by the operating means, displays in the 14th window a first section for specifying an operation target which is on an urgency level of the alarm, displays a second section for selecting a cause of occurrence of the alarm with respect to the operation target specified in the first section, reads a current set status of the urgency level of the cause of occurrence of the alarm specified with respect to a node including the operation target when the operation target and the cause of occurrence of the alarm are specified in the 14th window, and displays a list of read results in accordance with each occurrence cause; and wherein the information processing means sets each urgency level with respect to an operator of its own apparatus in accordance with each occurrence cause of each alarm displayed in a list in the 14th window, and sets the urgency level for each set alarm occurrence cause with respect to the node of the operation target.

As a result, it is possible to easily set an urgency level for each of a plurality of alarm occurrence causes with respect to an arbitrary node (limited to a node that a user is permitted to access) from the terminal apparatus for an operator.

According to the present invention, there is provided a terminal apparatus for an operator used when connected to an arbitrary node in a network system including a plurality of ring networks, each ring networks including a plurality of nodes and a traffic bypass function, a plurality of the nodes being connected to each other in a ring-like form through a communication line in which a plurality of paths are multiplexed, the communication line including a working system line and a preliminary system line, the traffic bypass function causing service traffic transmitted through the working system line to make a detour to the preliminary system line, the terminal apparatus for an operator comprising: a display unit; information acquiring means for acquiring from a connected node notification information concerning a ring network to which that node belongs; information processing means for managing statuses of the traffic bypass function in the network system based on the notification information acquired by this information acquiring means; and display controlling means for displaying information processed by this information processing means on the display unit, wherein the display controlling means displays a 12th button on a screen of the display unit, displays a 17th window on the screen of the display unit when the 12th button is clicked by the operating means, and displays in the 17th window each arrow associated with each path in a ring network as a target.

Consequently, a set state of each path in the ring network can be grasped at a glance.

According to the present invention, there is provided a communication path setting method in a terminal apparatus for an operator including a display unit, the terminal apparatus for an operator being provided in a network system including a plurality of ring networks each of which includes a plurality of nodes connected to each other in a ring-like form through a communication line in which a plurality of communication paths are multiplexed, the communication path setting method comprising: a step of dividing a screen of the display unit into a plurality of areas in association with intervals between the respective nodes in a ring network to which a node connected with its own apparatus belongs, and displaying in the divided areas arrows associated with respective communication paths existing in the intervals; a first step of specifying a low-speed side channel of a node as a start point of a communication path to be set; a second step of specifying a low-speed side channel of a node as an end point of the communication path to be set; a third step of displaying an arrow associated with the communication path to be set in a display area corresponding to a node interval specified in the first and second steps; a fourth step of repeating the first to third steps when there is any other communication path to be set; a fifth step of transmitting a request for setting a communication path corresponding to the arrow associated with the communication path to be set to a node concerning formation of that communication path; and a sixth step of causing the node having accepted the request for setting a communication path to form a new communication path based on the request.

By doing so, the operation for setting a path can be further intuitively carried out, which is convenient.

According to the present invention, there is provided a terminal apparatus for an operator used when connected to an arbitrary node in a network system including a plurality of nodes each of which is provided with a plurality of boards, the terminal apparatus for an operator comprising: a display unit; operating means for accepting click operations by a user; information acquiring means from a connected node notification information concerning the network system; and display controlling means for displaying information processed by this information processing means on the display unit, wherein the display controlling means displays a 14th button on a screen of the display unit, displays a 19th window on the screen of the display unit when the 14th button is clicked by the operating means, and displays a section for causing an operator of its own apparatus to select one of the nodes existing in the network system and specify a board of the selected node in the 19th window; and wherein the information processing means deletes the board selected in the 19th window from supervisory control targets of its own apparatus.

As a result, the procedure for deleting a low-speed side board from supervisory targets can be facilitated.

According to the present invention, there is provided a terminal apparatus for an operator used when connected to an arbitrary node in a network system including a plurality of nodes, the terminal apparatus for an operator comprising: a display unit; information acquiring means for acquiring from a connected node notification information concerning the network system; information processing means for managing the network system based on the notification information acquired by this information acquiring means; and display controlling means for displaying information processed by this information processing means on the display unit, wherein the display controlling means displays a 16th button on a screen of the display unit, displays a 21st window on the screen of the display unit when the 16th button is clicked by the operating means, and displays in the 21st window a list of operators who are permitted to login to its own apparatus in such a manner that an expiration date of a password and an access level of each operator are associated with a name of each operator.

Consequently, it is possible to grasp users which can login at a glance.

According to the present invention, there is provided a terminal apparatus for an operator used when connected to an arbitrary node in a network system including a plurality of nodes, the terminal apparatus for an operator comprising: a display unit; information acquiring means for acquiring from a connected node notification information concerning the network system; information processing means for managing the network system based on the notification information acquired by this information acquiring means; and display controlling means for displaying information processed by this information processing means on the display unit, wherein the display controlling means displays a 20th button on a screen of the display unit, displays a 25th window on the screen of the display unit when the 20th button is clicked by the operating means, and displays in the 25th window: a section for causing an operator of its own apparatus to select an arbitrary node in the network system; a list of current set statuses of an operation reference time for each node selected in this section; and a section for causing a user to select an arbitrary device from this list and individually set an operation reference time with respect to this selected device; and wherein the information processing means sets the operation reference time set in the 25th window with respect to the selected node.

Consequently, the operation for setting the operation reference time with respect to each node can be facilitated.

According to the present invention, there is provided a terminal apparatus for an operator used when connected to an arbitrary node in a network system including a plurality of nodes, the terminal apparatus for an operator comprising: a display unit; information acquiring means from a connected node notification information concerning the network system; information processing means for managing the network system based on the notification information acquired by this information acquiring means; and display controlling means for displaying information processed by this information processing means on the display unit, wherein display controlling means displays a 21st button on a screen of the display unit, displays a 26th window on the screen of the display unit when the 21st button is clicked by the operating means, displays in the 26th window color specification buttons in accordance with each sate that an object displayed on the screen of the display unit can enter, displays a color pallet when an arbitrary one of the color specification buttons is clicked so that an operator of its own apparatus can set a display color of a state corresponding to the color specification button, and displays the object displayed on the screen of the display unit in a display color set in the color pallet.

As a result, color coding can be carried out in accordance with, e.g., a degree of a failure in case of display on a display unit and the like, and the state of the network system can be visually grasped at a glance.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 12 is a view showing an Item Selection (Row) window;

FIG. 45 is a view showing a Path Configuration Control window;

FIG. 50 is a view showing an APS Control window;

FIG. 51 is a view showing a Node/Channel Selection window;

FIG. 56 is a view showing a User Control window;

FIG. 57 is a view showing an Add User window;

FIG. 68 is a view showing a Ring Topology Map Configuration window;

DETAILED DESCRIPTION OF THE INVENTION

An embodiment according to the present invention will now be described hereinafter in detail with reference to the accompanying drawings.

Figure 1:
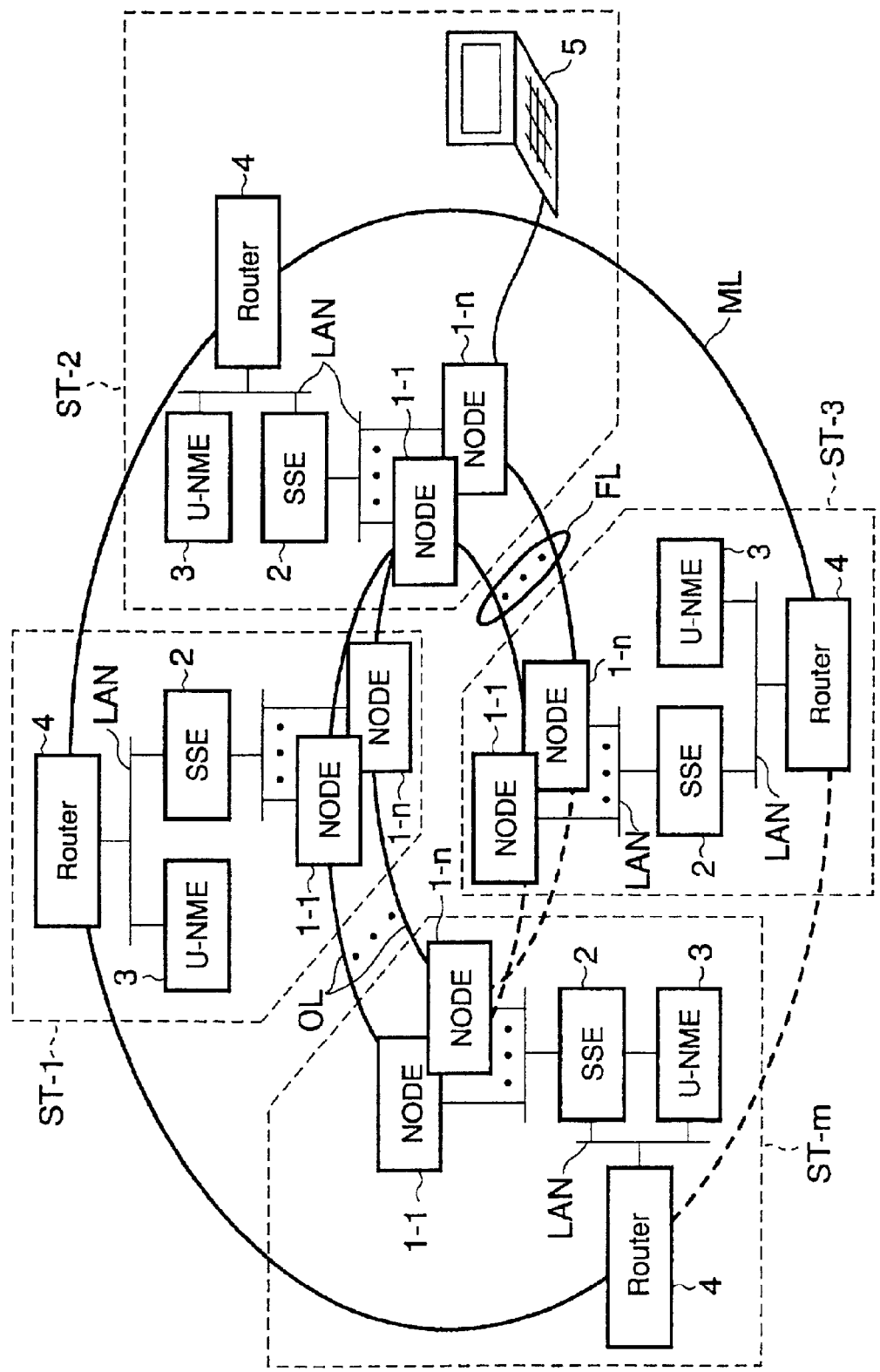
FIG. 1 is a system drawing showing the structure of a transmission system in which a terminal apparatus for an operator (Terminal) according to the present invention is installed.

FIG. 1 is a system configuration drawing of a transmission system in which a terminal apparatus for an operator according to an embodiment of the present invention is installed. In FIG. 1, a plurality of nodes (NODEs) 1-1 to 1-*n* are respectively set to a plurality of stations (Stations) ST-1 to ST-m. The nodes 1-1 to 1-*n* are connected to each other in the ring form through a high-speed line OL, thereby forming a plurality of ring networks. That is, n ring networks exist, and each ring network provided with m nodes 1-1, 1-2, . . . , 1-*n* is formed.

The high-speed line OL is realized as a synchronous multiplex line having, e.g., an STM-64 (Synchronous Transfer Module-level 64: corresponding to 10 Gbps) class transmission capacity. The high-speed line OL forming each ring network transmits optical signals. A wavelength of this optical signal differs in accordance with each ring network, and the optical signals having such wavelengths are wavelength-multiplexed, thus forming a wavelength multiplex line FL.

The nodes 1-1 to 1-*n* in the respective stations ST-1 to ST-m are respectively connected to an in-station supervisory control apparatus (SSE) 2 in each station. The SSE 2 is further connected to a supervisory control apparatus (U-NME) 3 which is in charge of supervisory control across the network through a LAN. Furthermore, a router 4 is connected to the LAN, and a supervisory control line ML for connecting the U-NMEs 3 of the respective stations is formed through the router 4. It is to be noted that the supervisory control line ML depicted in FIG. 1 is shown for the sake of convenience and logically realized as a DCC (Data Communication Channel) and the like provided in an SOH (Section Over Head) of an SDH frame transmitted through the wavelength multiplex line FL.

Besides, the above-described system is provided with a terminal apparatus for an operator (which will be referred to as a Terminal hereinafter) 5 according to the present invention. The Terminal 5 is used when connected to an arbitrary one of the nodes 1-1 to 1-*n*. In FIG. 1, it is connected to the NODE 1-*n* in the ST-2. The Terminal 5 is often used for, e.g., assisting start-up of each NODE, and it may be removed after accomplishing its aim. Further, the Terminal 5 may be attached according to needs, for example, various kinds of setting or acquisition of information, and the operation for attaching the Terminal 5 is simple. In short, the Terminal 5 is ranked as a simplified or recent supervisory control apparatus.

It is to be noted that a ring network to which a connected node belongs is a supervisory control target of the Terminal 5. In FIG. 1, the ring network constituted by the NODEs 1-*n* is a control target. In this regard, the Terminal 5 is distinguished from the U-NME 3 having the entire network system as a target.

Figure 2:
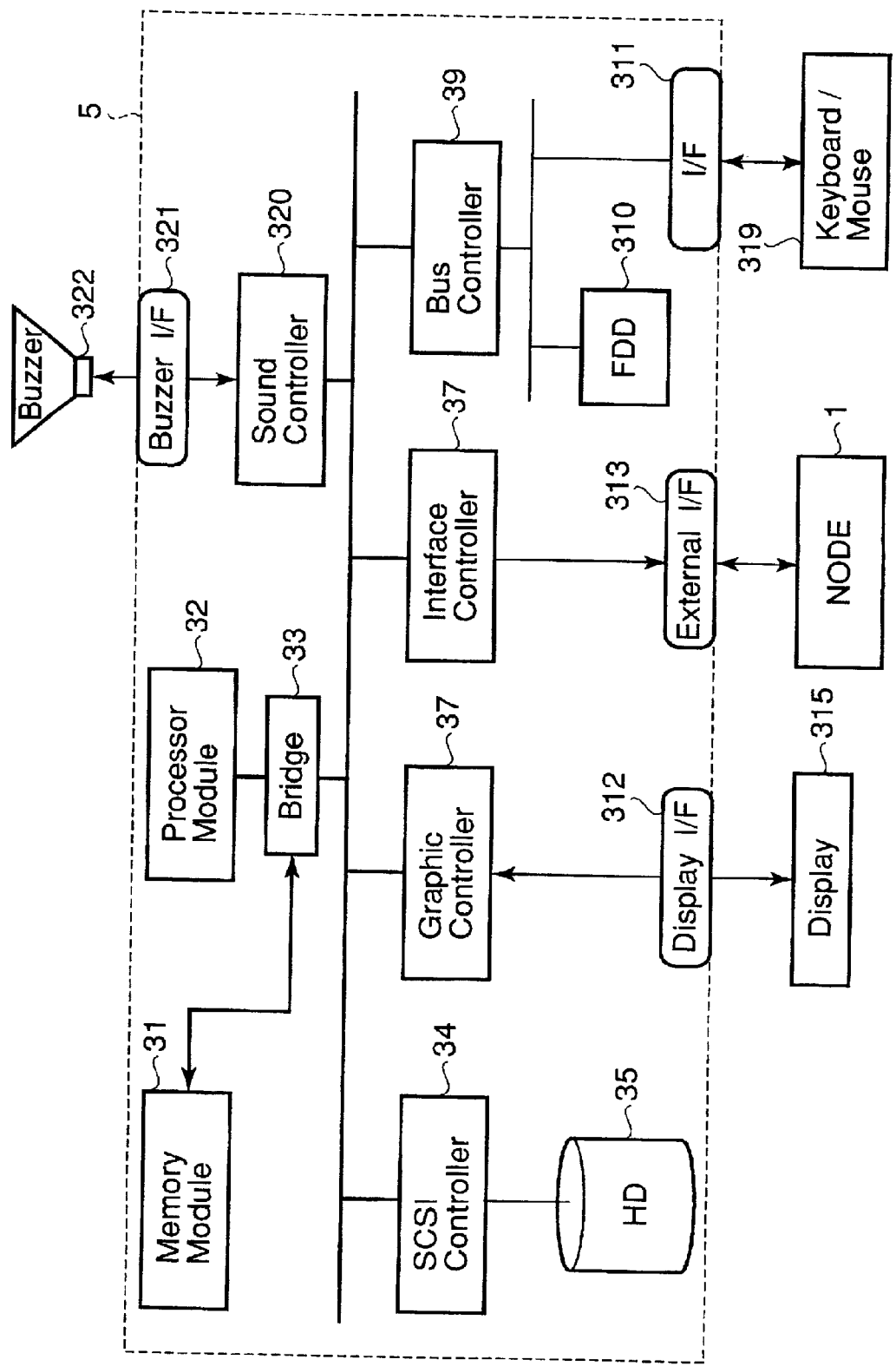
FIG. 2 is a block diagram showing the structure of a terminal apparatus for an operator (Terminal) 5 according to the present invention.

FIG. 2 is a block diagram showing the structure of the Terminal 5 according to the present invention. The Terminal 5 includes: a memory module 31; a processor module 32; a bridge 33; an SCSI controller 34; an HD (hard disk drive) 35; a graphic controller 37; an interface controller 38; a bus controller 39; an FDD (floppy disk drive) 310; an interface (I/F) 311; a disk play interface (I/F) 312; an external interface (I/F) 313 as a connection interface with the NODEs 1 (1-1 to 1-*n*); a display 315; an input device 319 such as a keyboard and a mouse; a sound controller 320; a buzzer interface (I/F) 321; and a buzzer 322.

Among these members, one greatly concerning the idea of the present invention is a human-machine interface unit consisting of, e.g., the display 315, the keyboard/mouse 319 and the buzzer 322.

Each function which will be described below is newly implemented by applying, for example, patches to a control program mainly executed by the processor module 32. This control program is written in a special-purpose language and stored in the memory module 31, the HD 35 and the like.

Incidentally, in the following description, it is assumed that the entire system is provided with 32 ring networks and each ring network includes seven NODEs. That is, this corresponds to n=32 and m=7 in FIG. 1.

[Network Alarm Summary Display]

Figure 3:
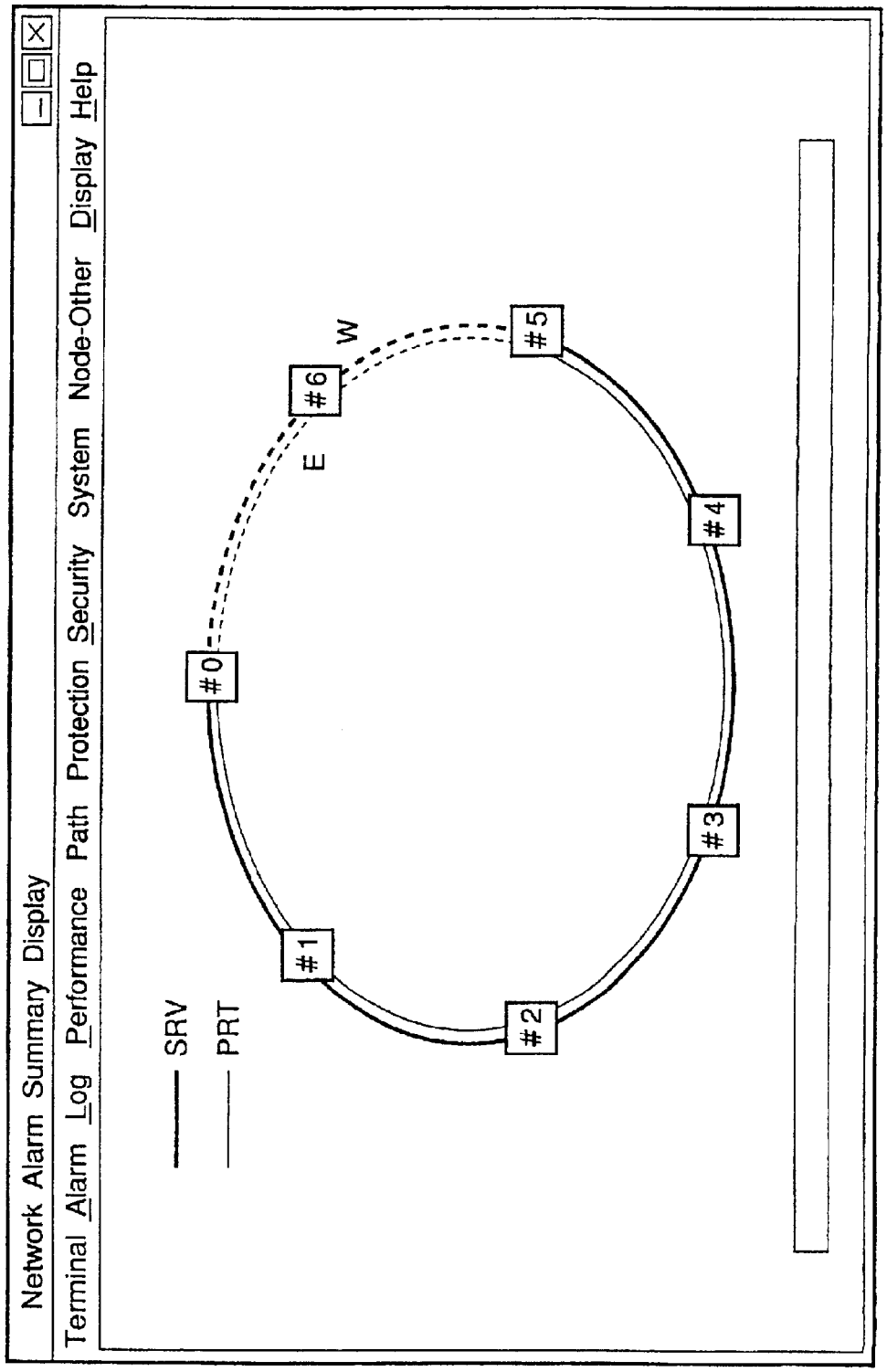
FIG. 3 is a view showing a main screen of a display of the Terminal 5.

FIG. 3 is a view showing a main screen of the display 315 of the Terminal 5. This screen is a window which is displayed when the Terminal 5 is activated and is called the "Network Alarm Summary Display". Besides, various windows are displayed in the display 315, but the window shown in FIG. 3 is displayed on the background of various windows.

In the window depicted in FIG. 3, a type drawing of a ring network which is a target of the Terminal 5 is graphically displayed. In the drawing, reference numerals #0 to #6 denote station icons corresponding to other NODEs 1-*n* belonging to the same ring network as the NODE 1-*n* to which the Terminal 5 is connected. Here, the system including seven NODEs is displayed. A double line connecting the stations #0 to #6 is a transmission path icon indicating high-speed lines having the same wavelength. A heavy line indicates a working system transmission path (SRV) and a thin line represents a preliminary system transmission path (PRT).

Here, it is assumed that a failure is generated in the transmission paths on the both sides (East (W) and West (W)) of the station #6. The Terminal 5 acquires predetermined management information from the NODE 1-*n* connected thereto and obtains the cause of the failure. At this moment, the transmission path icon corresponding to the transmission path in which the failure is generated is displayed in a display color different from other display colors in accordance with a level of that failure. For example, it is displayed in red in case of a serious (critical) failure and displayed in yellow in case of a moderate (Major) failure. Furthermore, the transmission path having no failure and the stations #0 to #6 are displayed in, e.g., green.

Figure 4:
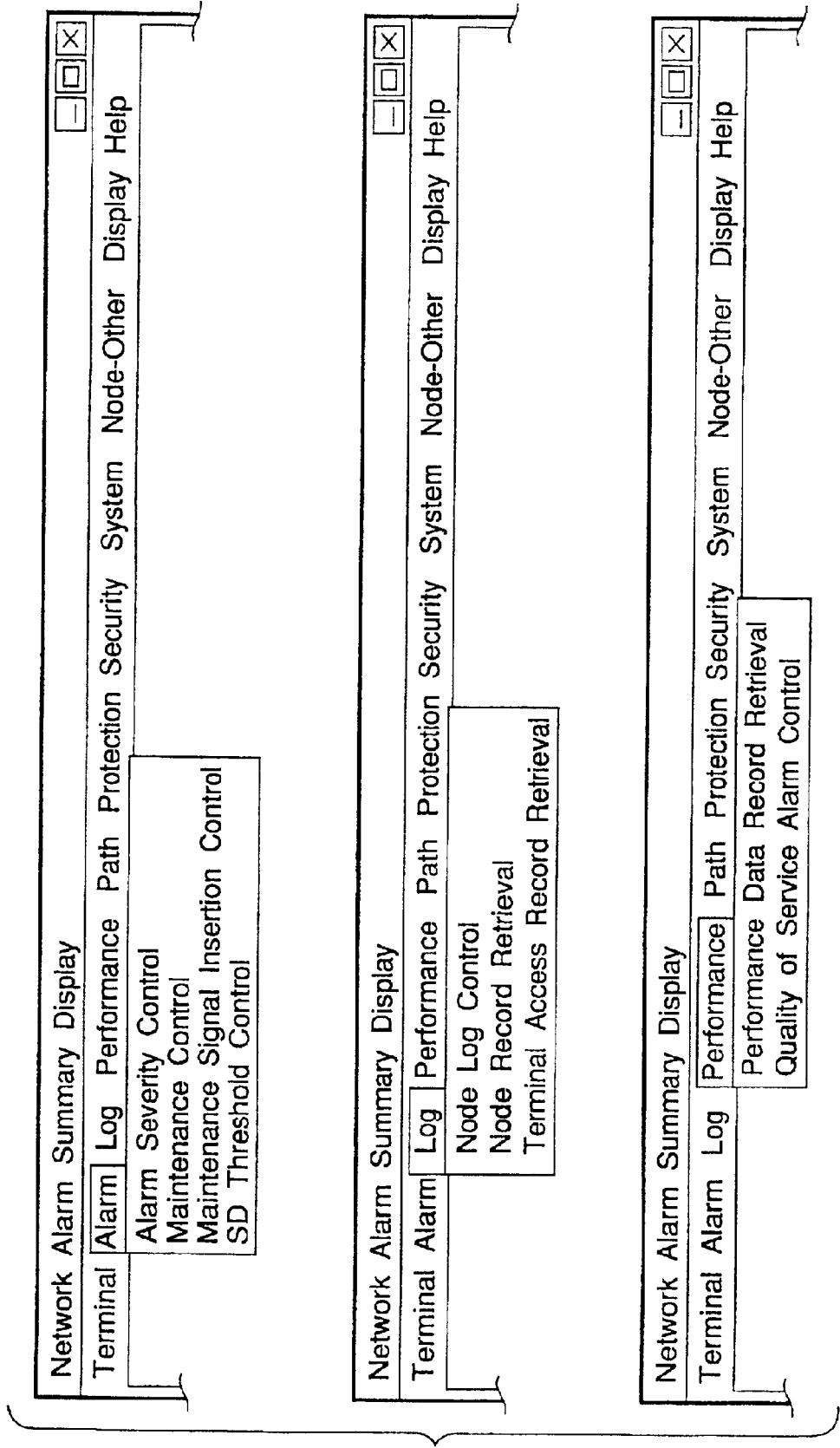
FIG. 4 is a view showing how a sub menu is displayed in FIG. 3.
Figure 5:
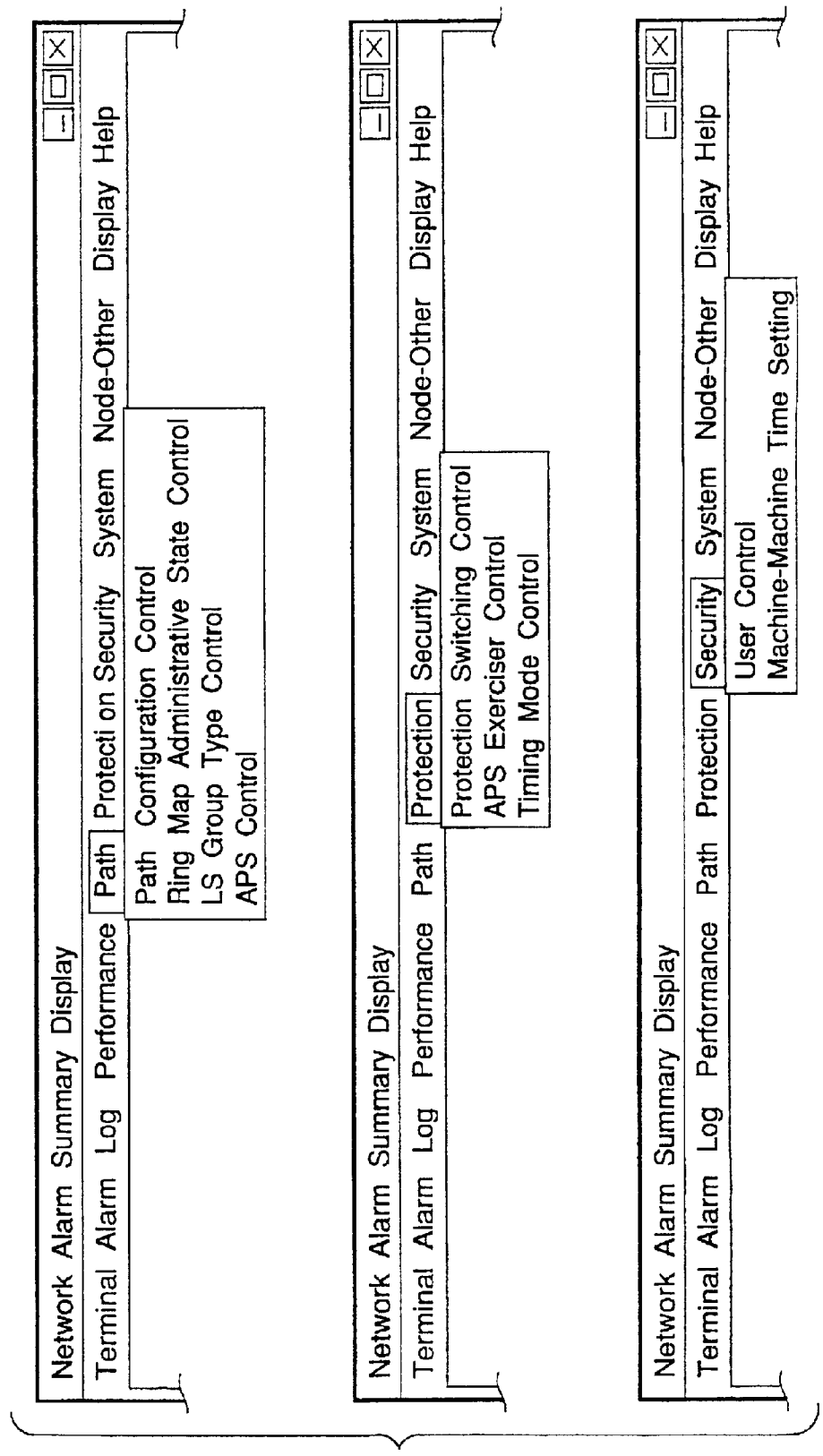
FIG. 5 is a view showing how the sub menu is displayed in FIG. 3.
Figure 6:
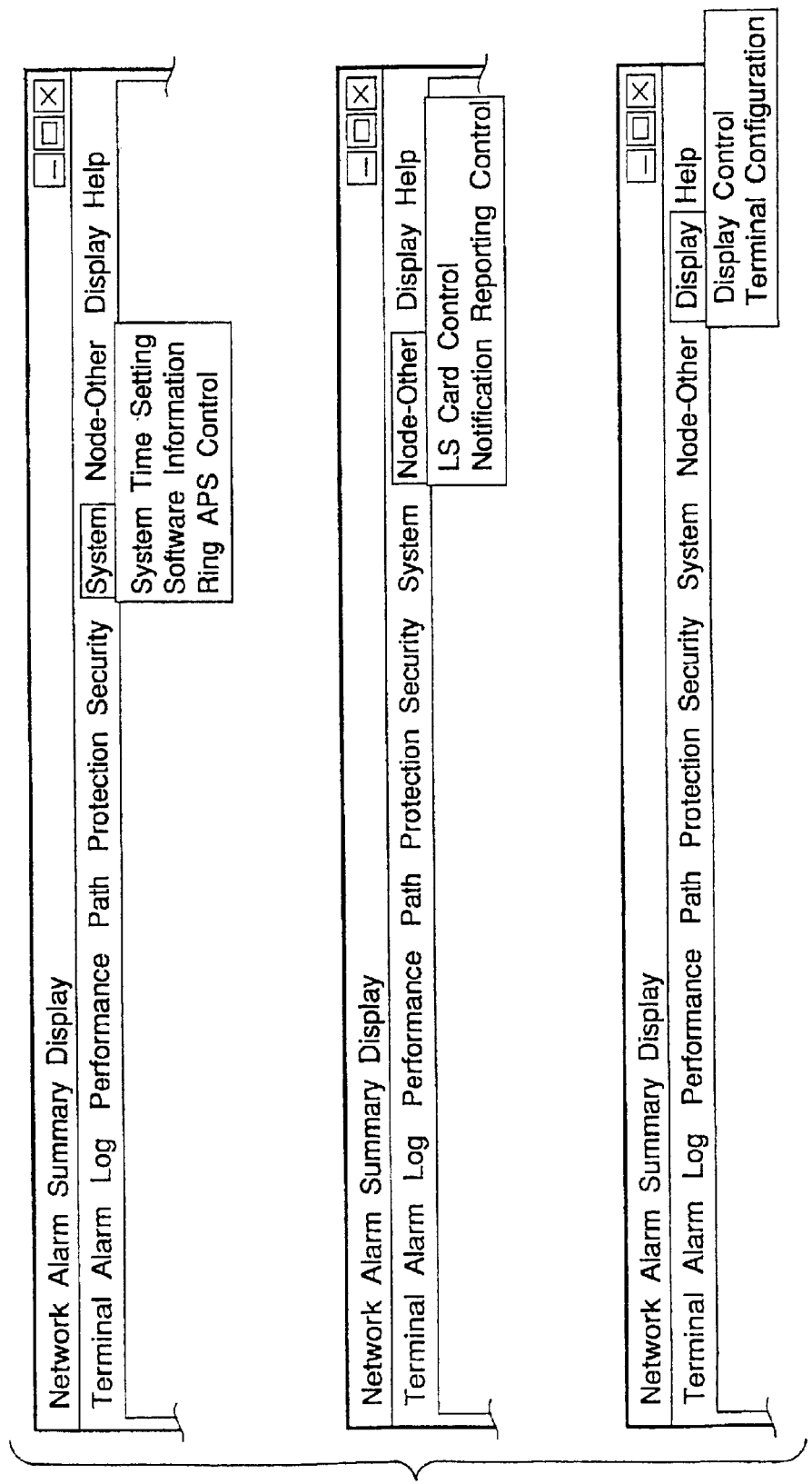
FIG. 6 is a view showing how the sub menu is displayed in FIG. 3.

Various clickable function buttons are provided on a menu bar on the upper part of the screen. There are a Terminal button, an Alarm button, a Log button, a Performance button, a Path button, a Protection button, a Security button, a System button, a Node-Other button, a Display button and a Help button from the left. When these buttons are clicked, sub menus such as shown in FIGS. 4 to 6 are displayed, and various function windows are opened from these menus.

The effect in the above-described structure will now be described. In the following description, there are provided nine sections, i.e., <Node Alarm Summary>, <Notification>, <Alarm>, <Log>, <Protection>, <Security>, <System>, <Node-Other> and <Display> for the sake of convenience.

<Node Alarm Summary>

Figure 7:
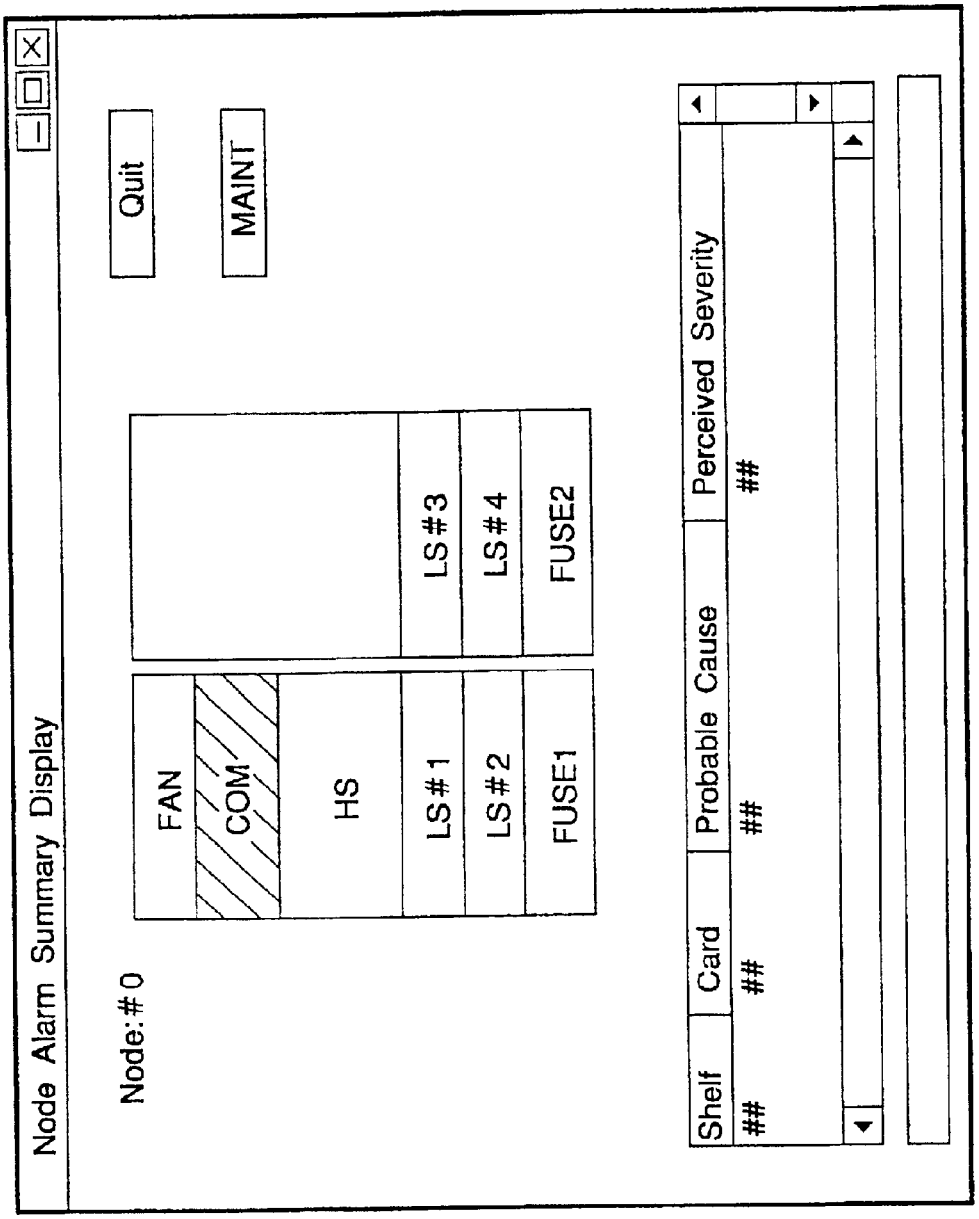
FIG. 7 is a view showing a Node Alarm Summary Display window.
Figure 8:
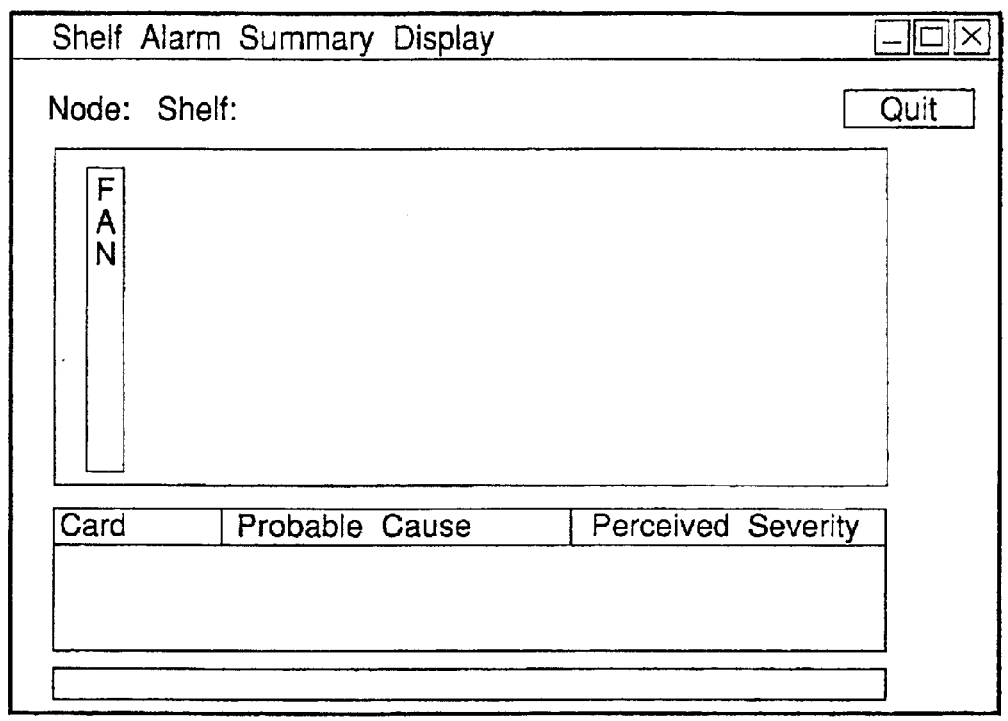
FIG. 8 is a view showing a Shelf Alarm Summary Display window.

When any station icon is clicked in the screen shown in FIG. 3, a Node Alarm Summary Display window in FIG. 7 showing statuses of occurrence of a failure in the NODE is opened. The FIG. 7 window typically shows a shelf structure of the NODE selected in FIG. 3. In this drawing, the structure of the NODE #0 is shown. A rectangle indicative of each shelf is clickable. For example, when FAN is clicked, a window depicted in FIG. 8 is opened. The window shown in FIG. 8 is referred to as a Shelf Alarm Summary Display window, and a card (board) structure of the clicked shelf is displayed in this window.

Figure 9:
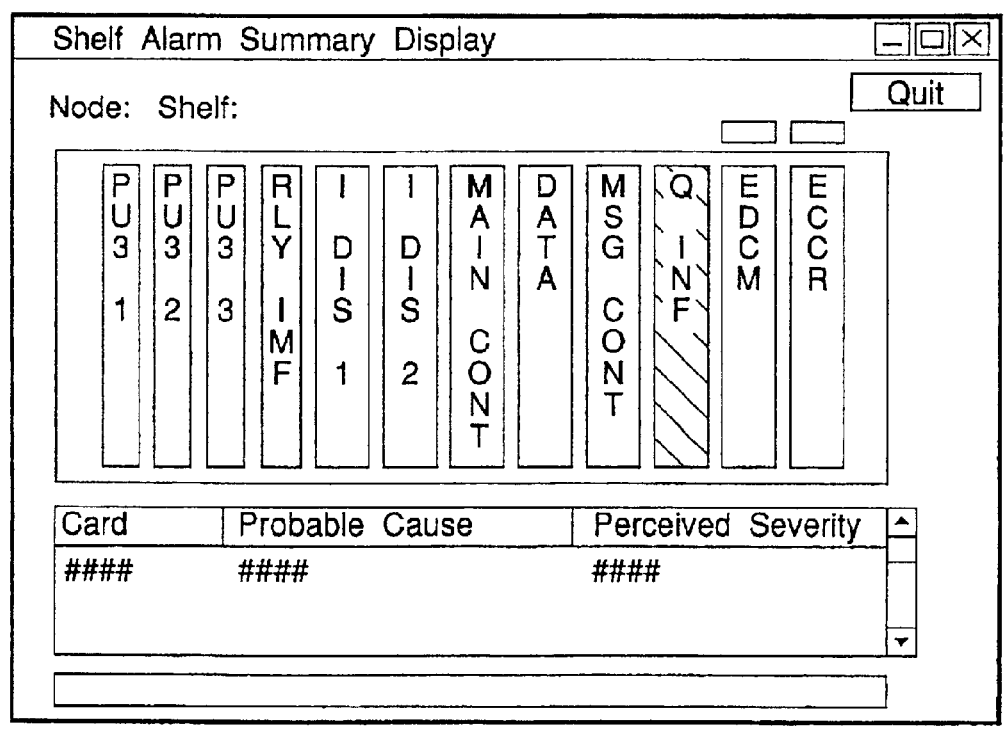
FIG. 9 is a view showing a Shelf Alarm Summary Display window.

Meanwhile, a display color of a COM shelf is different (oblique lines in the drawing: it is actually displayed in, e.g., red) from other display colors in FIG. 7, this indicates that a failure is generated in this shelf. Then, when the COM shelf in FIG. 7 is clicked, a Shelf Alarm Summary Display window depicted in FIG. 9 is displayed. In the FIG. 9 window, a card having a failure in the COM shelf is displayed in a color different from those of other cards. In this example, it can be understood that there is a failure in a Q INF card.

Moreover, the FIG. 7 window displays a rectangle referred to as MAINT (Maintenance). This is not a clickable button but shows the maintenance state of the displayed node by using different colors. If the NODE is not in the maintenance process, it is displayed in, e.g., gray. However, if this NODE is in the maintenance process, it is displayed in, e.g., light blue. Then, a shelf which is in the maintenance process (e.g., replacement of a card) is distinguished from other shelves by using different colors, and the details of the operation are displayed in a lower section of the window.

The Terminal 5 grasps whether the NODE is in the maintenance process from notification from each NODE. Based on such a display mode as shown in FIG. 7, a user can be aware of the maintenance state of the NODE in detail.

In addition, a section showing a list of statuses of occurrence of Alarm in a text format is provided in any window illustrated in FIGS. 7 to 9. An operator can obtain detailed information concerning the alarm by making reference to this section. In FIGS. 7 to 9, in accordance with each section such as Card (board), Probable Cause (expected cause), Perceived Severity (level of failures) and others, their states are displayed in a scroll window.

<Notification>

A Notification Display window illustrated in FIG. 10 will now be described.

This Notification Display window is opened when the Terminal 5 is activated. In the default setting, this Notification Display window may be minimized when opened. Additionally, the Notification Display window is opened overlapping the Network Alarm Summary Display as a main screen when the maximization operation is carried out with respect to this window. By the later-described operation, the Notification Display window can be automatically displayed (popped up) when notification information arrives from the NODE.

The Notification Display window displays in a text format a list of a history of notification information or quality information such as performance data acquired from the NODE to which the Terminal 5 is connected (in this example, the NODE 1-*n* in the ST-2).

Figure 10:
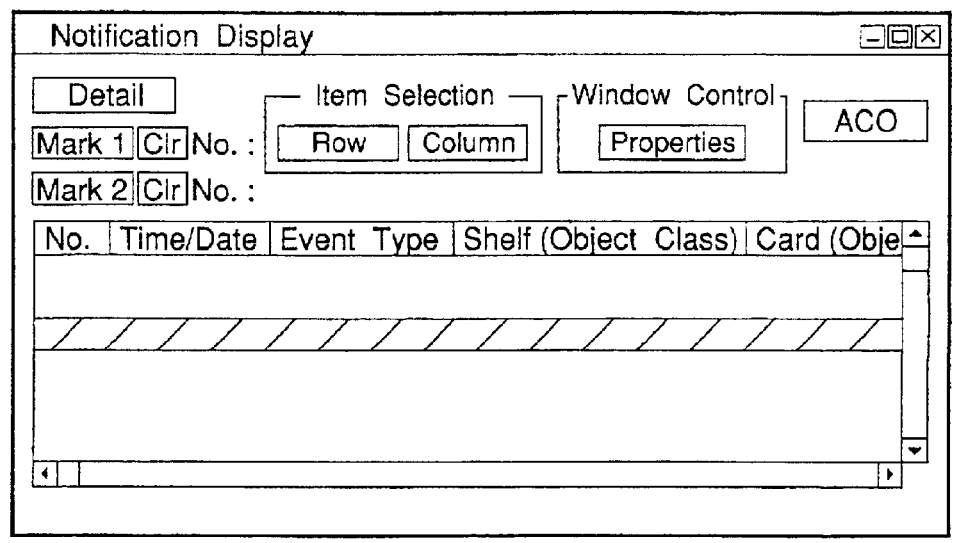
FIG. 10 is a view showing a Notification Display window.

In the Notification Display window illustrated in FIG. 10 are provided a Detail button, Mark 1/Mark 2 buttons, a Row button and a Column button as Item Selection, a Properties button as Window Control, an ACO (Alarm Cut Off) button, and a scroll window.

Scroll Window

The scroll window displays acquired notification information from the top in time series, e.g., in the order of occurrence. Further, the scroll window displays attributes of notification information such as Time/Date, Event Type, Self (Object Class), Card (Object Class) and others. Besides, although not shown in FIG. 10, there are more attribute items on the right side of the Card (Object Class). They can be displayed in the window by operating the horizontal scroll button. The Time/Date section displays date and time of occurrence of an event. The Event Type section displays a type of an event. The Shelf (Object Class)section and the Card (Object Class) section display a shelf and a card having an event generated, respectively.

Figure 16:
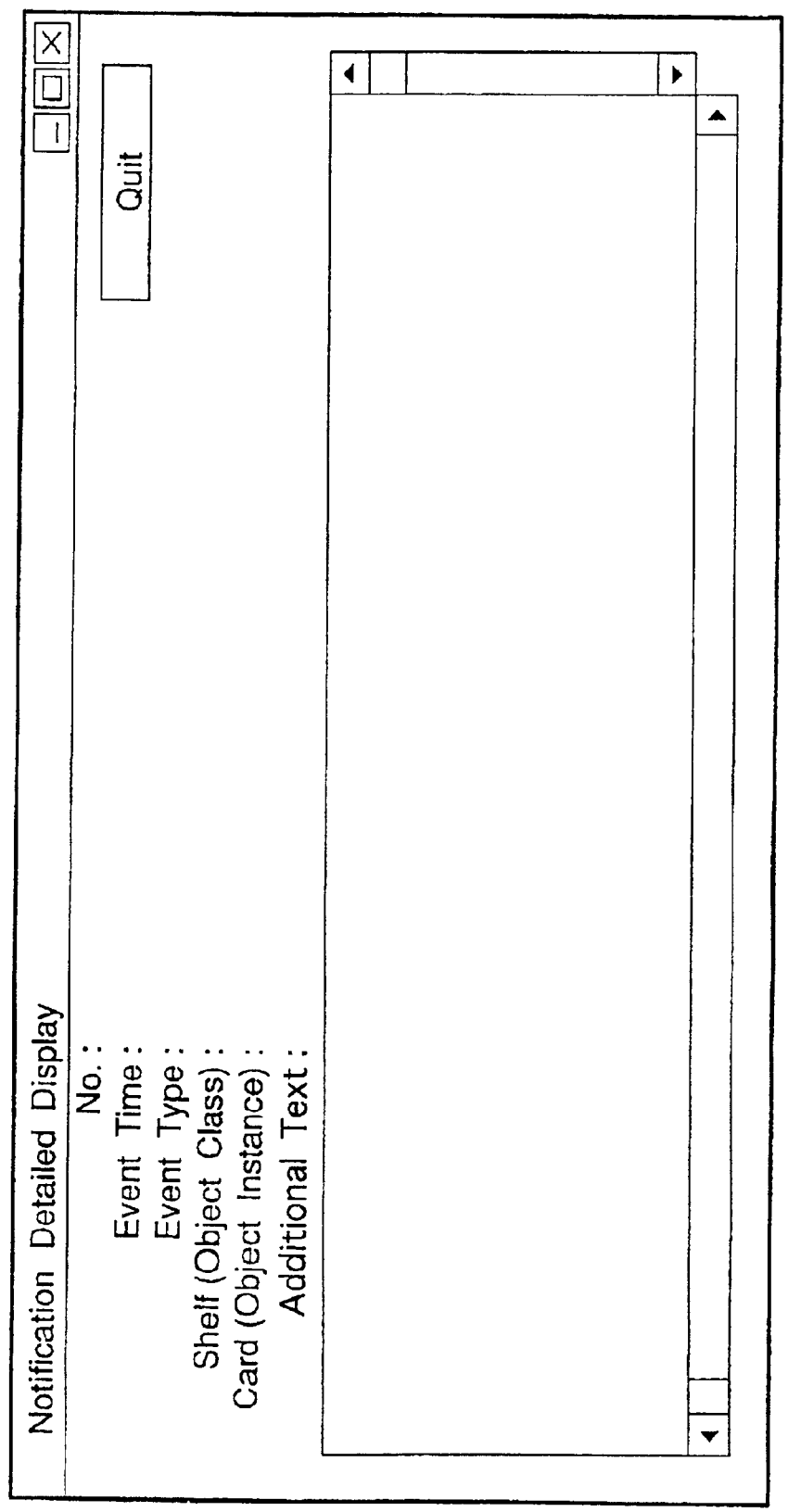
FIG. 16 is a view showing a Notification Detailed Display window.
Figure 17:
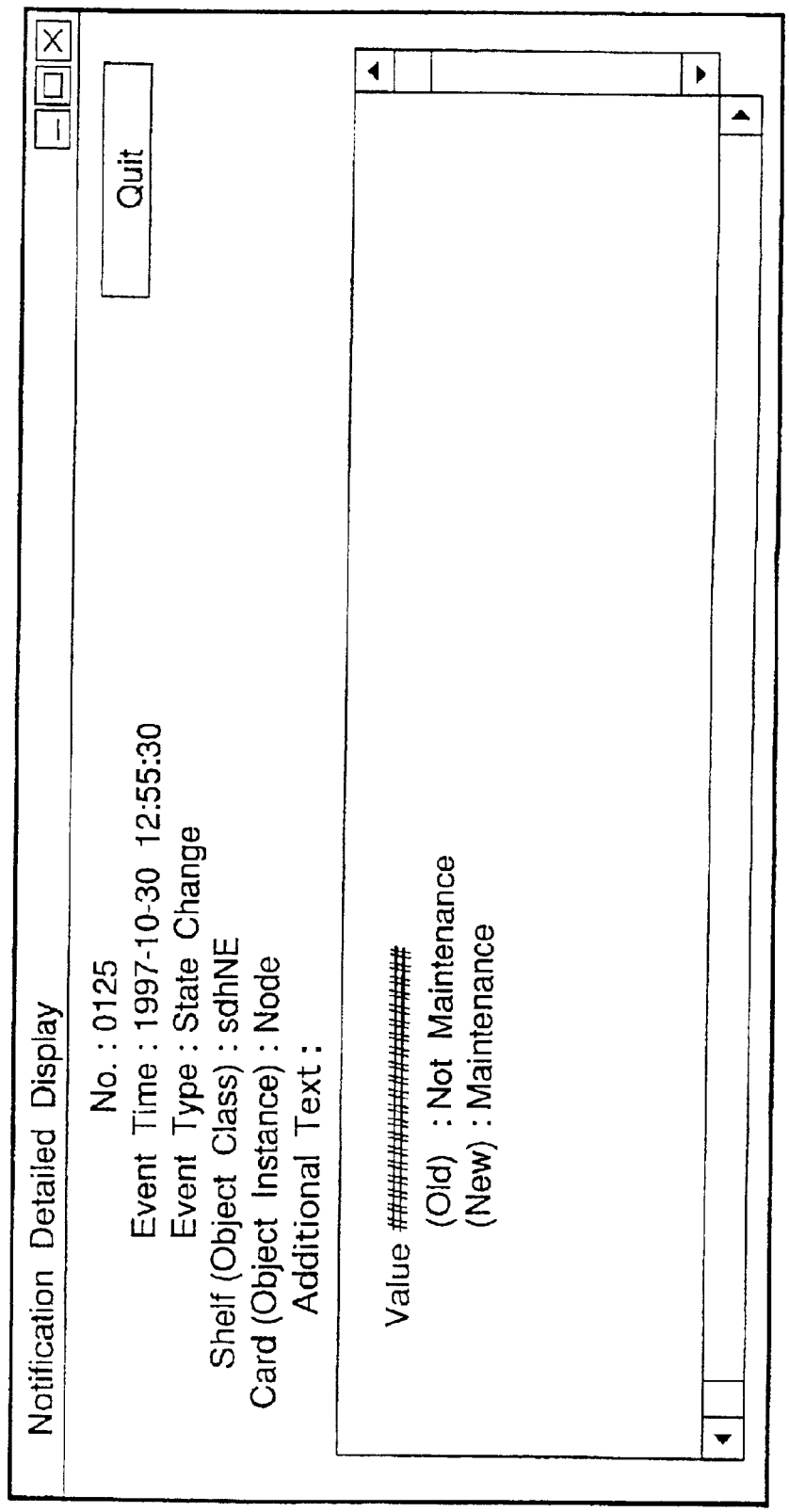
FIG. 17 is a view showing a Notification Detailed Display window.
Figure 18:
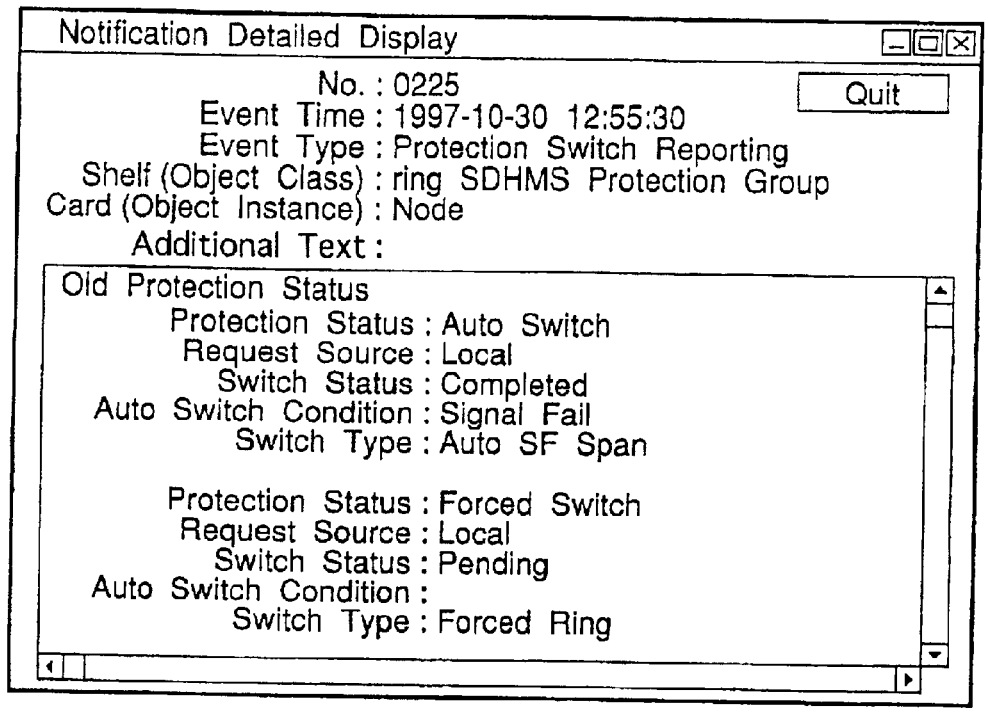
FIG. 18 is a view showing a Notification Detailed Display window.
Figure 18:
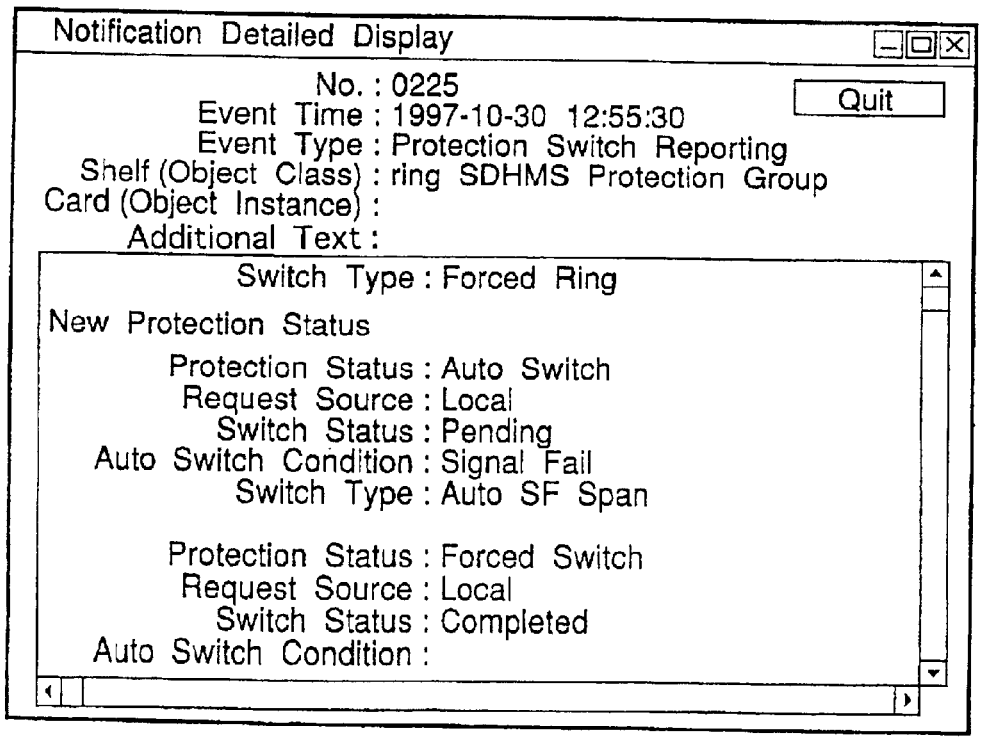

After arbitrary information displayed in the FIG. 10 scroll window is selected (highlighted when selected: it is indicated by oblique lines in the drawing), when a Detail button in the upper left part in the window is clicked, Notification Detailed Display windows such as shown in FIGS. 16 to 18 are displayed. These windows display detailed contents of the selected information.

A quantity of information may be large depending on an event, and some information can not be displayed in a row in the FIG. 10 scroll window. Thus, in this embodiment, windows such as shown in FIGS. 16 to 18 are provided so that the detail of information can be displayed comprehensibly. FIG. 17 shows information concerning State Change, and FIG. 18 shows information concerning Protection Switch Reporting. They are all events each having a large quantity of information. As shown in FIG. 18, these windows can be vertically scrolled.

Mark 1/Mark 2 Buttons

When arbitrary information displayed in the FIG. 10 scroll window is selected and the Mark 1/Mark 2 buttons are then clicked, a mark can be put to the selected information. Furthermore, even though the window is scroll in every way, display can return to the marked information when the Mark 1/Mark 2 buttons are again clicked.

By doing so, the search operation of the operator can be facilitated when a number of sets of notified information is especially large. Providing two mark buttons can cope with two types of information, and the mark can be cleared by providing a clear (Clr) button.

ACO Button

Figure 11:
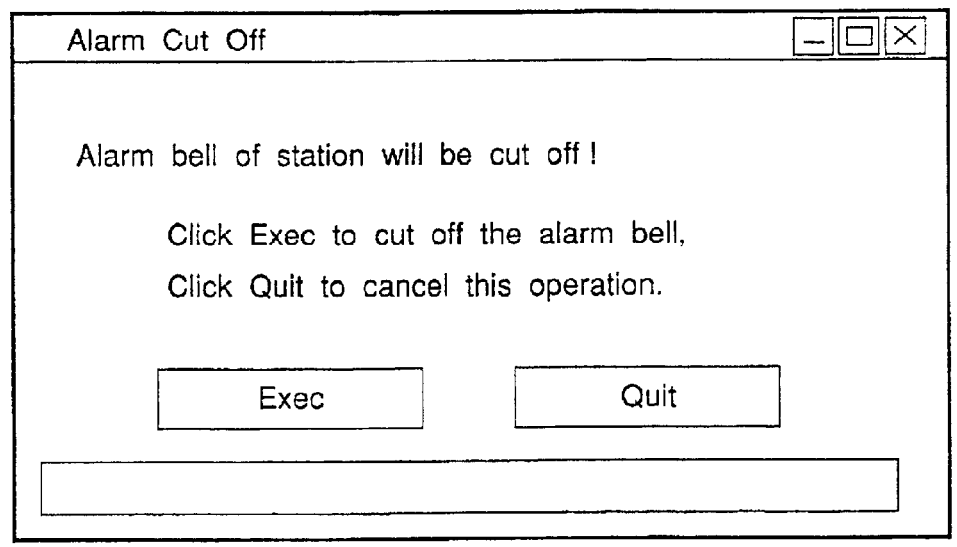
FIG. 11 is a view showing an Alarm Cut Off window.

When the ACO (Alarm Cut Off) button is clicked in the FIG. 10 window, an Alarm Cut Off window shown in FIG. 11 is displayed. The FIG. 11 window is used for aborting the operation of the in-station alarm given in the form of, e.g., a lamp or a bell sound.

In the system according to this embodiment, when a failure is detected in the NODE, an alarm unit (not shown) provided in the station is operated in order to inform an operator of the failure. However, when Exec (execution) is clicked in the FIG. 11 window, the operation of the alarm unit can be stopped.

Item Selection

There are buttons indicated as Item Selection in the window shown in FIG. 10. That is, they are a Row button and a Column button. Of these buttons, when the Row button is clicked, an Item Selection (Row) window illustrated in FIG. 12 is displayed. The FIG. 12 window is used for performing filtering retrieval (filtering) in the scroll window shown in FIG. 10. When an OK button is clicked after arbitrarily checking check boxes for respective items, display returns to the FIG. 10 window, and only the filtered contents are displayed. When a Cancel button is clicked, setting is aborted.

Figure 13:
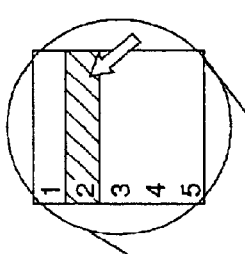
FIG. 13 is a view showing an Item Selection (Column) window.

When the Column button is clicked in FIG. 10, an Item Selection (Column) window shown in FIG. 13 is displayed. This window is used for changing (sorting) the display order in the scroll window depicted in FIG. 10, and there are roughly (Common Item), (Alarm), (State Change), (Protection Switch Rep), (Security Alarm) and others as setting items. There is a button for setting the priority as Location above each item. When this button is clicked, the display order can be set as shown in the drawing. The items displayed in the FIG. 10 scroll window are sequentially displayed from the left in accordance with the set priority.

Window Control

Figure 14:
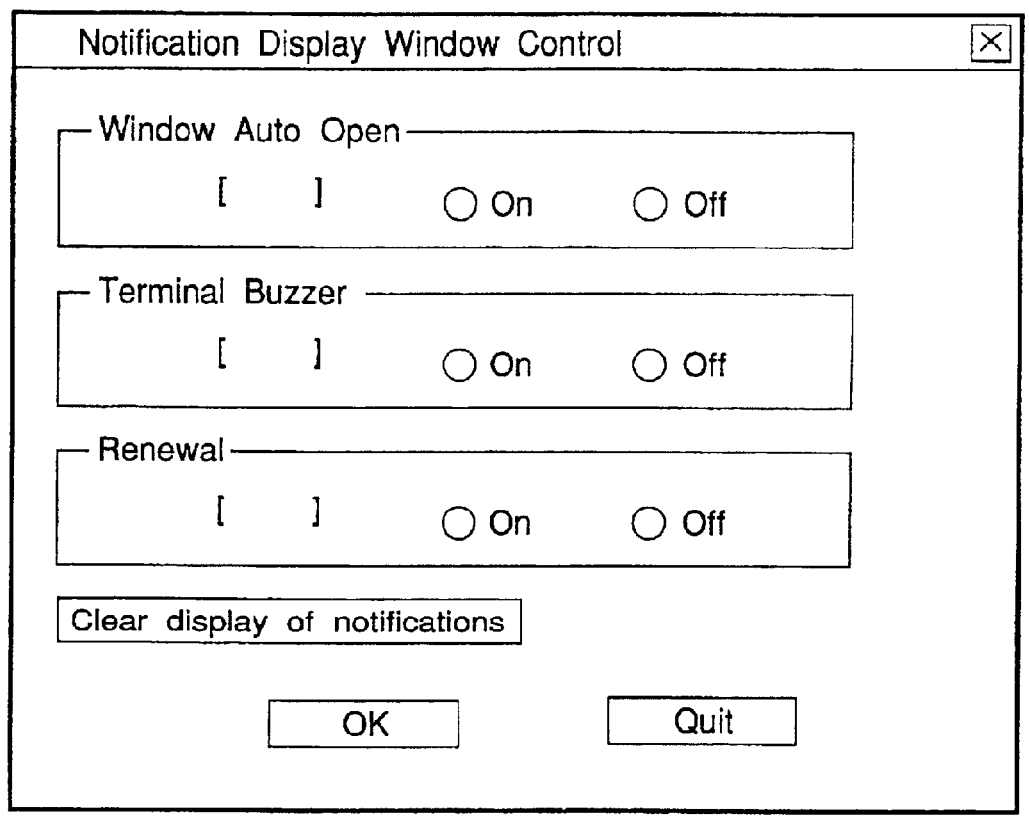
FIG. 14 is a Notification Display Window Control window.

When the Properties button is clicked in FIG. 10, a Notification Display Window Control window depicted in FIG. 14 is displayed. This window is used for setting processing carried out upon receiving new notification information. Either radio button, i.e., On or Off is checked in accordance with each item.

When On of Window Auto Open is checked in the FIG. 14 window, the FIG. 10 window is automatically displayed (popped up) upon receiving new notification information. When On of Terminal is checked, the buzzer 332 (FIG. 2) is sounded in order to draw an operator's attention when new notification information is received. When On of Renewal is checked, the screen is automatically scrolled in order to display latest notification information in the FIG. 10 scroll window when this new notification information is received. If Off of Renewal is checked, the scroll state remains unchanged even if new notification information is received.

Figure 15:
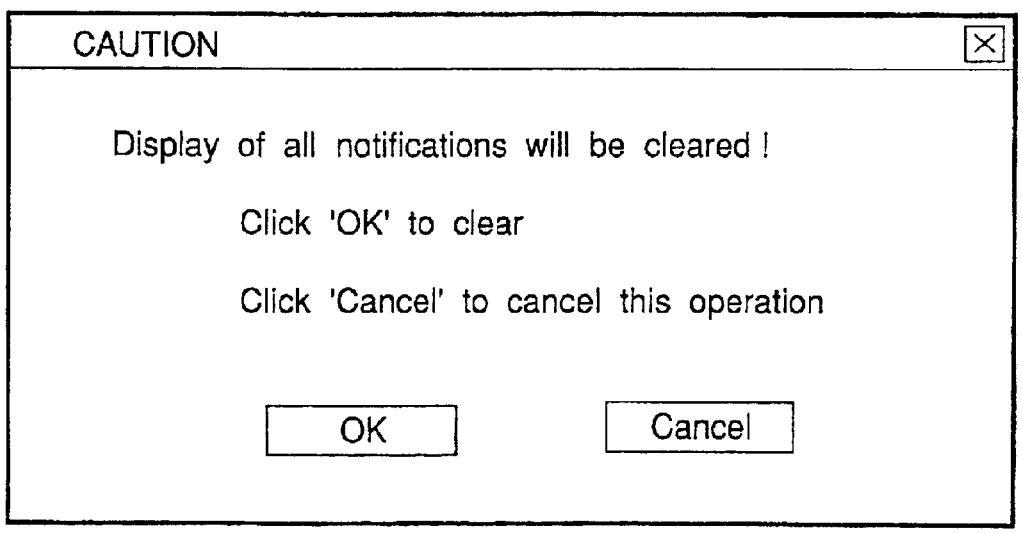
FIG. 15 is a view showing an example of a CAUTION window.

When Clear Display of notifications is clicked in the window illustrated in FIG. 14, display of the FIG. 10 scroll window is cleared. Moreover, in advance of this, a CAUTION (warning) window shown in FIG. 15 is opened and a message indicating that the window is cleared is displayed in order to call an operator's attention. It is to be noted that data stored in a data base of the Terminal 5 is saved even if display is cleared.

It is to be noted that the window shown in FIG. 10 serves as the backbone for the processing using the Terminal 5, and setting this window in such a manner that it is displayed according to the default setting comes in handy. For example, the FIG. 10 window may be switched to/from the FIG. 3 main window by the one-touch operation, or a dedicated icon (not shown) may be provided in the main screen so that the FIG. 10 window can be opened by clicking this icon.

<Alarm>

The operation concerning Alarm will now be described. In regard to Alarm, as shown in FIG. 4, there are prepared sub menus, i.e., Alarm Severity Control, Maintenance Control, and SD Threshold Control.

(Alarm Severity Control)

Description will now be given as to the Alarm Severity Control window shown in FIG. 19. This window is opened when Alarm Severity Control is clicked in the sub menu (shown in FIG. 4) which is displayed when Alarm is clicked in the main screen illustrated in FIG. 3.

Figure 19:
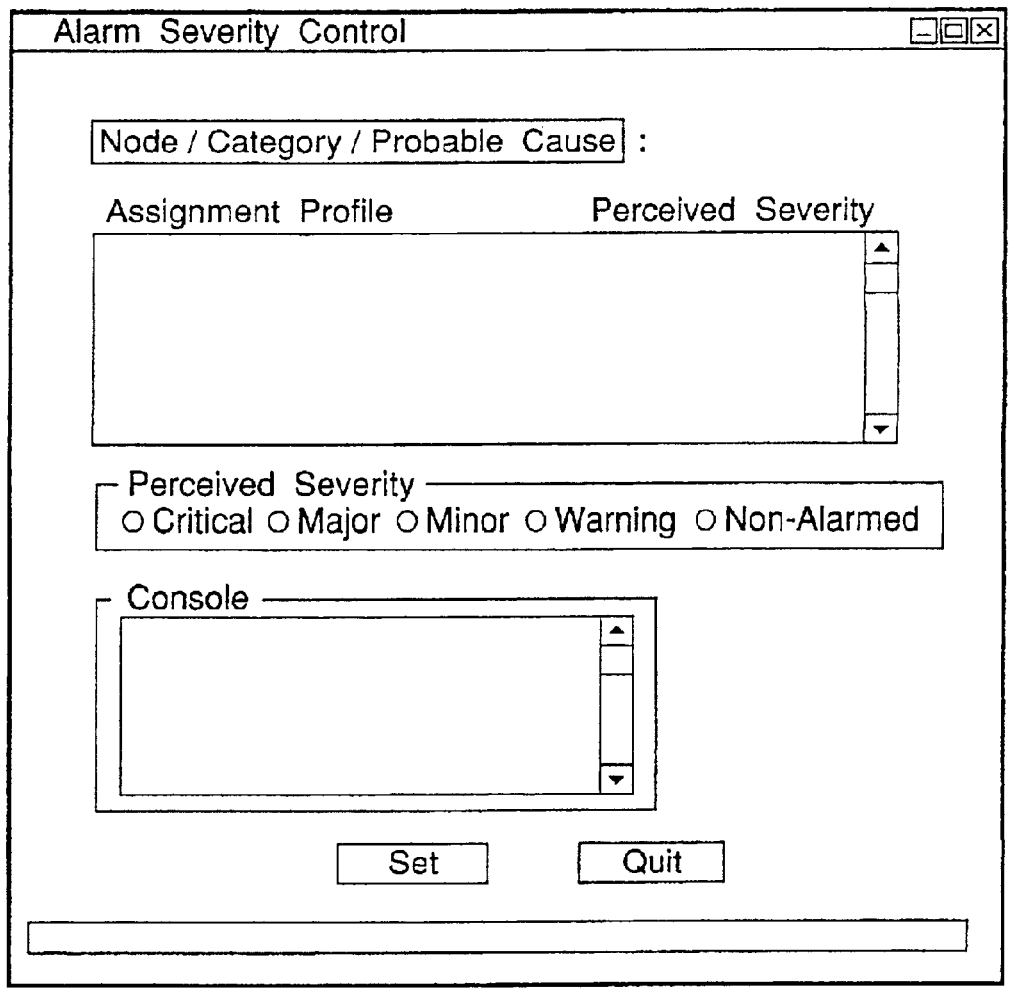
FIG. 19 is a view showing an Alarm Severity Control window.
Figure 20:
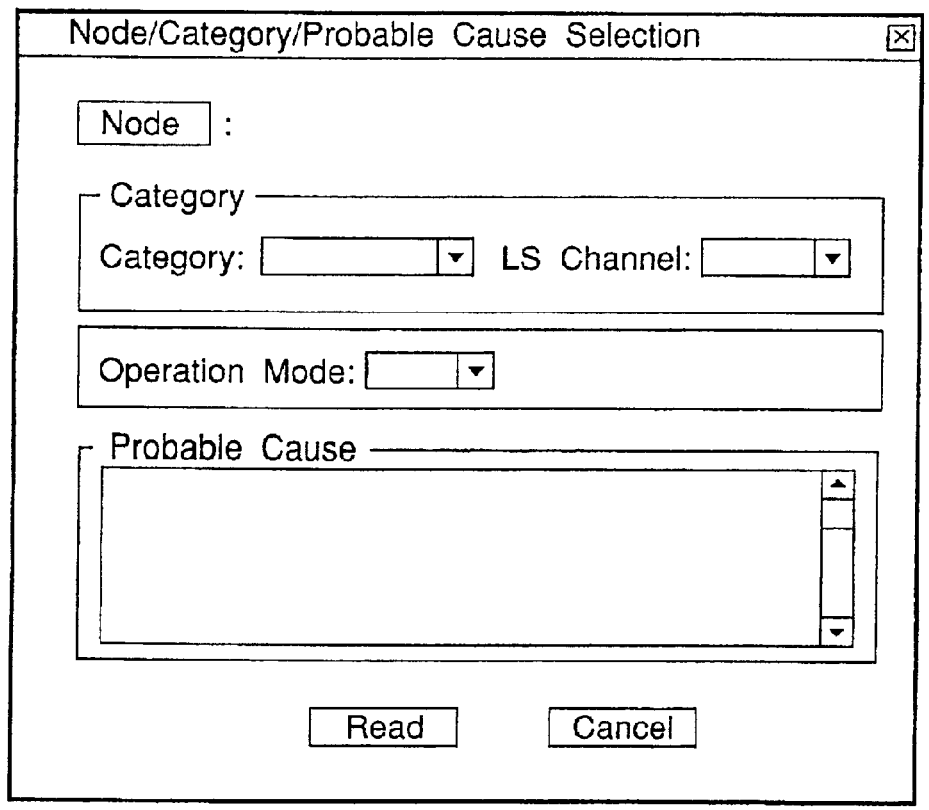
FIG. 20 is a view showing a Node/Category/Probable Cause Selection window.

When a Node/Category/Probable Cause button is clicked in the FIG. 19 window, a Node/Category/Probable Cause Selection window shown in FIG. 20 is displayed. In this window, an arbitrary NODE is selected (in the ring network to which the connected NODE belongs) and the level of importance or urgency of alarm information notified from that NODE to the Terminal 5 (its own apparatus) is set in accordance with each alarm type.

Figure 21:
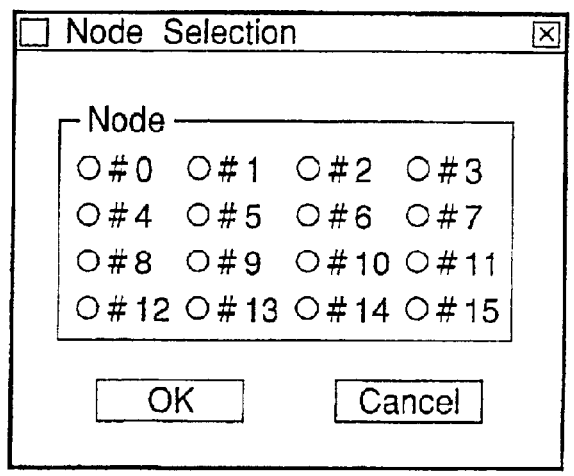
FIG. 21 is a view showing a Node Selection window.

When a Node button is clicked in FIG. 20, a Node Selection window shown in FIG. 21 is opened. In this window, a NODE as an operation target is selected. In this embodiment, since seven NODEs exist in one ring network as illustrated in FIG. 3, a NODE desired by a user is selected from these seven NODEs. When any NODE is selected, display of the screen returns to FIG. 20.

Incidentally, although up to 16 NODEs can be displayed in the example shown in FIG. 21, more NODEs may be displayed if there is no problem in restrictions of the system or performance of the Terminal 5.

When each item (Category, LS channel Operation Mode) as an operation target is selected and a Read button is then clicked in the FIG. 20 window, the current set status of the selected NODE is read. Subsequently, display of the screen returns to FIG. 19, and the item selected in FIG. 20 is reflected to the display content in FIG. 19. A result of reading is displayed in the scroll window indicated as (Assignment Profile Perceived Severity) in FIG. 19 every one line.

When one line is selected, a level of alarm (Critical Major Minor Warning Non-Alarmed: the level becomes higher toward to the left) is set in a Perceived Severity section and a Set button is then clicked in FIG. 19, the set content in FIG. 19 is set with respect to the NODE as an operation target. A Console section displays information indicating whether setting has been normally completed (OK) or not normally completed (NG).

As described above, a level of urgency of the alarm transmitted from each node can be arbitrarily set from the Terminal 5 side. As a result, the following operations are enabled. For example, when the operation test of the NODE, the installation operation, or the card replacement are performed, various kinds of alarms are generated in large quantities on the NODE side. If these alarms are notified to the U-NME 3, a communication resource is consumed in order to notify the alarms, and the system operation may be adversely affected. In particular, this fact is prominent to the AIS (Alarm Indication Signal).

Thus, if a level of urgency can be arbitrarily set in accordance with each alarm type by using the above-described function, it is possible to perform setting such as generation of required minimum alarms at the time of test. As a result, it is possible to provide facilities to the system operation. Further, by arbitrarily set a level of urgency of each alarm, distinction by using different colors can be performed in the screen in accordance with each level of urgency.

Maintenance Control

Figure 22:
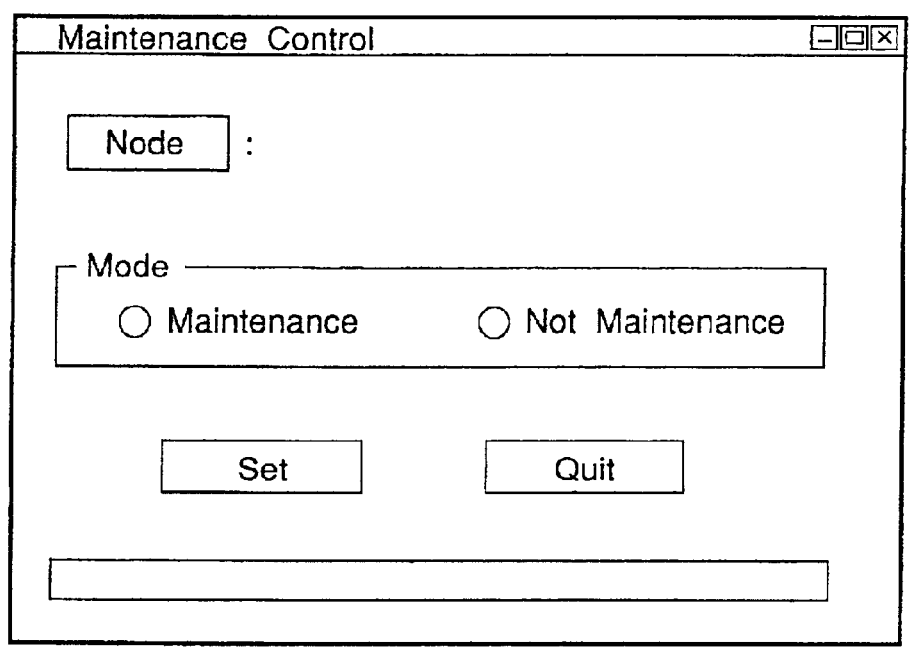
FIG. 22 is a view showing a Maintenance Control window.

A Maintenance Control window shown in FIG. 22 will now be described. This window is opened when the Maintenance Control is clicked from the sub menu depicted in FIG. 4. The FIG. 22 window is used for changing an operation mode of the NODE as a target. There are two operation modes, i.e., Maintenance (maintenance mode) or Not Maintenance (non-maintenance mode) for the NODE. In the window illustrated in FIG. 22, a NODE as a target is selected by the procedure similar to, e.g., that in FIG. 20. Then, when either Maintenance or Not maintenance is checked and thereafter an Exec button is clicked, the target NODE is informed of the set content.

Maintenance Signal Insertion Control

Description will now be given as to a Maintenance Signal Insertion Control window shown in FIG. 23. This window is opened when Maintenance Signal Insertion Control is clicked from the sub menu illustrated in FIG. 4.

Figure 23:
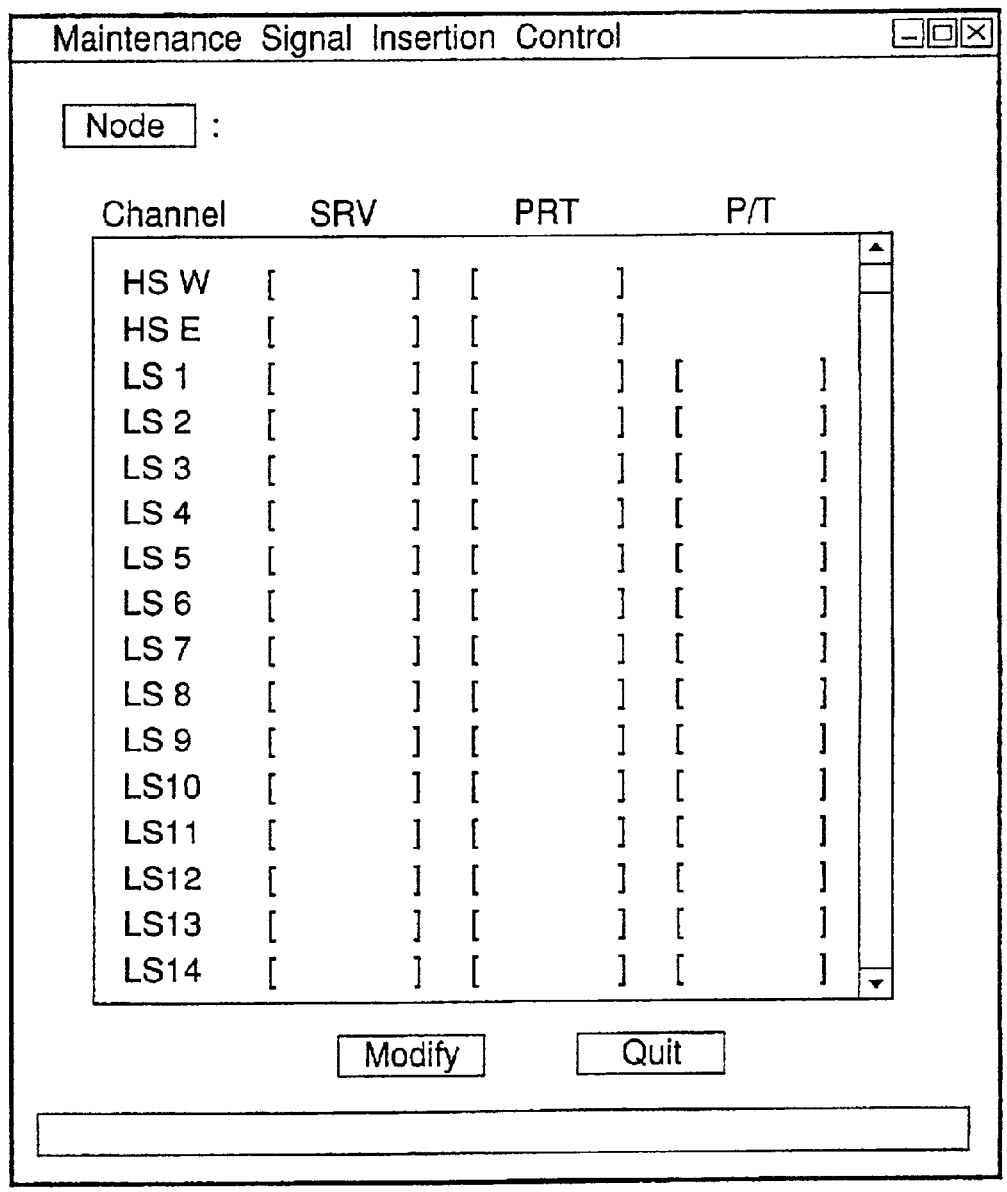
FIG. 23 is a view showing a Maintenance Signal Insertion Control window.

In the FIG. 23 window, an arbitrary node is specified, and allowance or inhibition of transmission of an alarm signal (Maintenance Signal: a signal used for maintenance) concerning maintenance is set for this specified node. As a signal used for maintenance, there are the above-described AIS and others.

Figure 24:
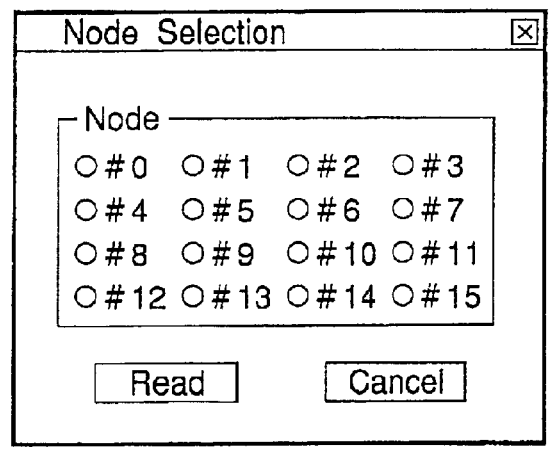
FIG. 24 is a view showing a Selection window.

When the Node button is clicked in the FIG. 23 window, a NODE Selection window depicted in FIG. 24 is opened. A node as a target is selected and the Read button is thereafter clicked in the FIG. 24 window. Then, the current set content of the selected node is read and displayed in the scroll window shown in FIG. 23.

Figure 25:
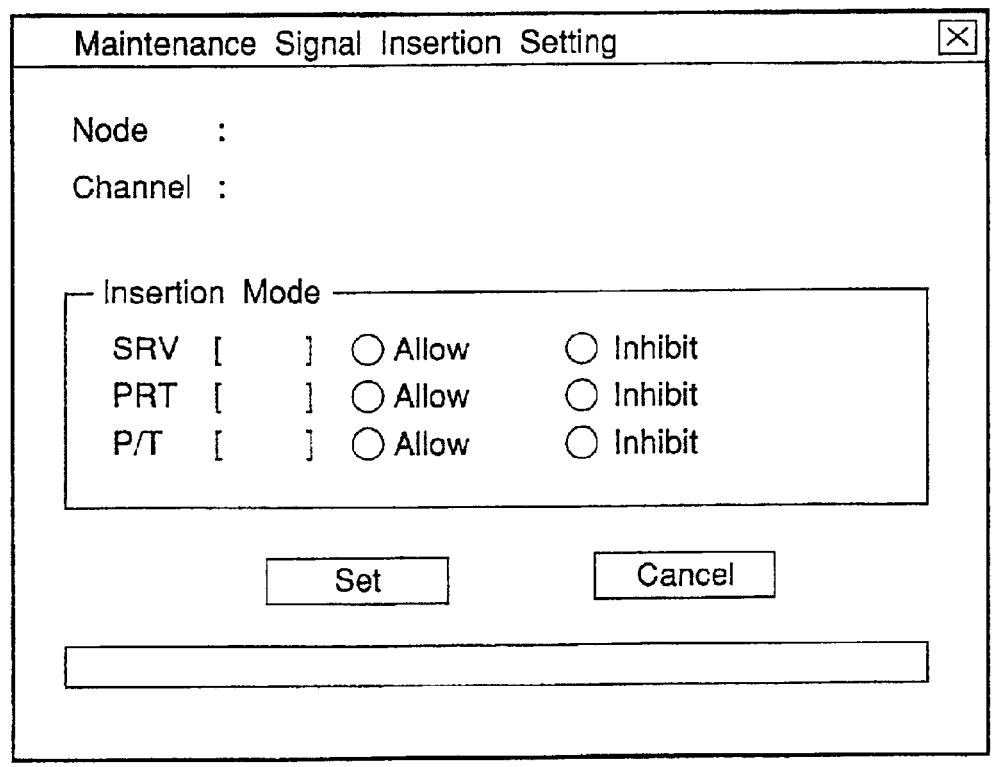
FIG. 25 is a view showing a Maintenance Signal Insertion Setting window.

An arbitrary item (channel) is clicked and selected in the scroll window. Then, a Maintenance Signal Insertion Setting window illustrated in FIG. 25 is opened, and either Allow (allowance) or Inhibit (inhibition) is selected with respect to each Operation Mode (SRV, PRT, P/T). Thereafter, when the set button is clicked, display of the screen returns to the FIG. 23 window. As described above, setting of each Channel is carried out.

When Modify is clicked upon completing setting of each item in the FIG. 23 window, the node is informed of the set content, and the set content is set. The node informed of the content transmits the maintenance signal in accordance with the set content.

(SD Threshold Control)

Description will now be given as to an SD Threshold Control window shown in FIG. 26. This window is opened when SD Threshold Control is clicked from the sub menu illustrated in FIG. 4. The FIG. 26 window is used for setting a threshold value for generating alarm information, particularly an SD (Signal Degrade) alarm.

Figure 26:
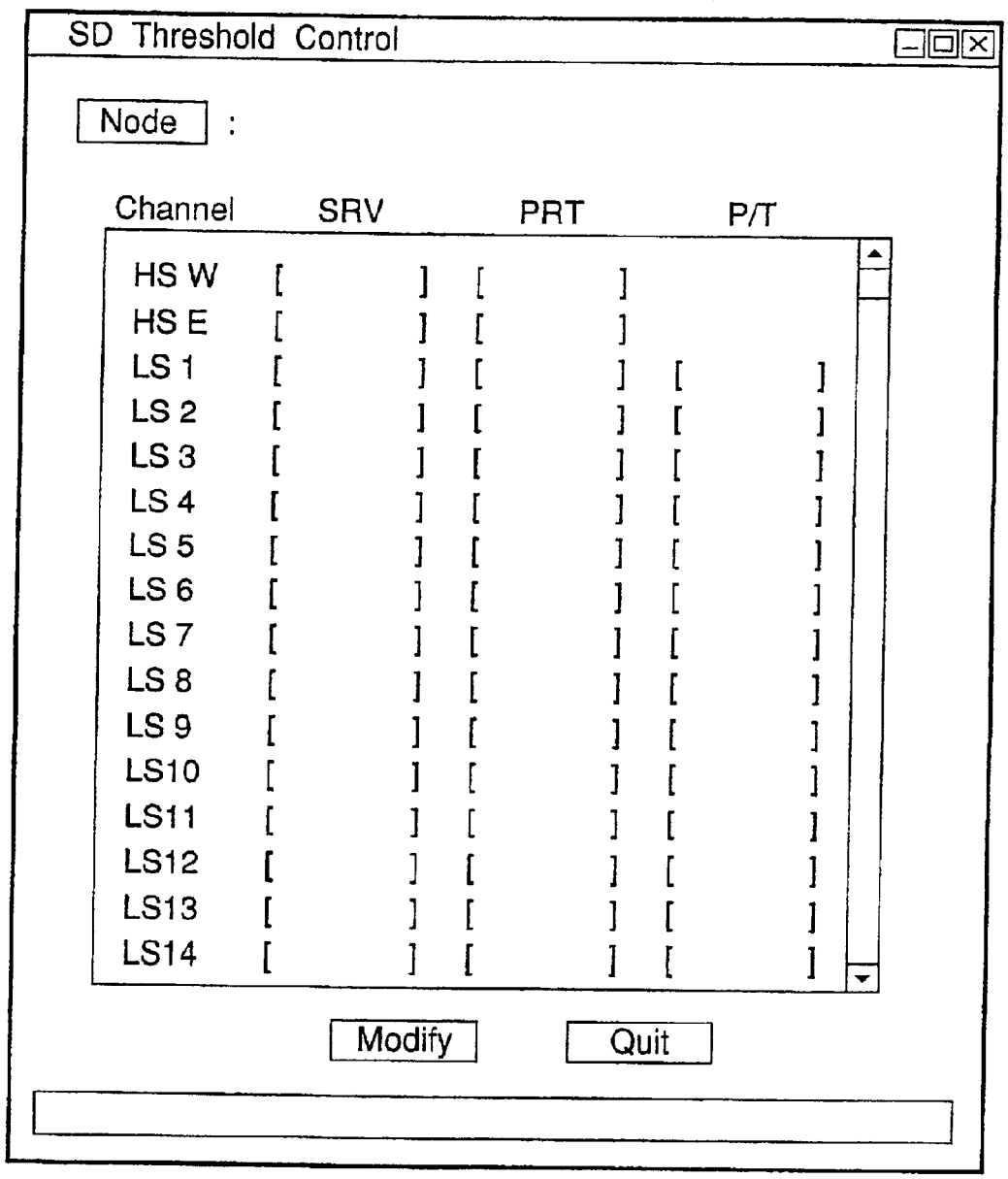
FIG. 26 is a view showing an SD Threshold Control window.

When Node is clicked in the FIG. 26 window, a NODE Selection window illustrated in FIG. 24 is opened. A node as a target is selected and Read is clicked in the FIG. 24 window so that the current set content is read. This content is displayed in the scroll window shown in FIG. 26.

Figure 27:
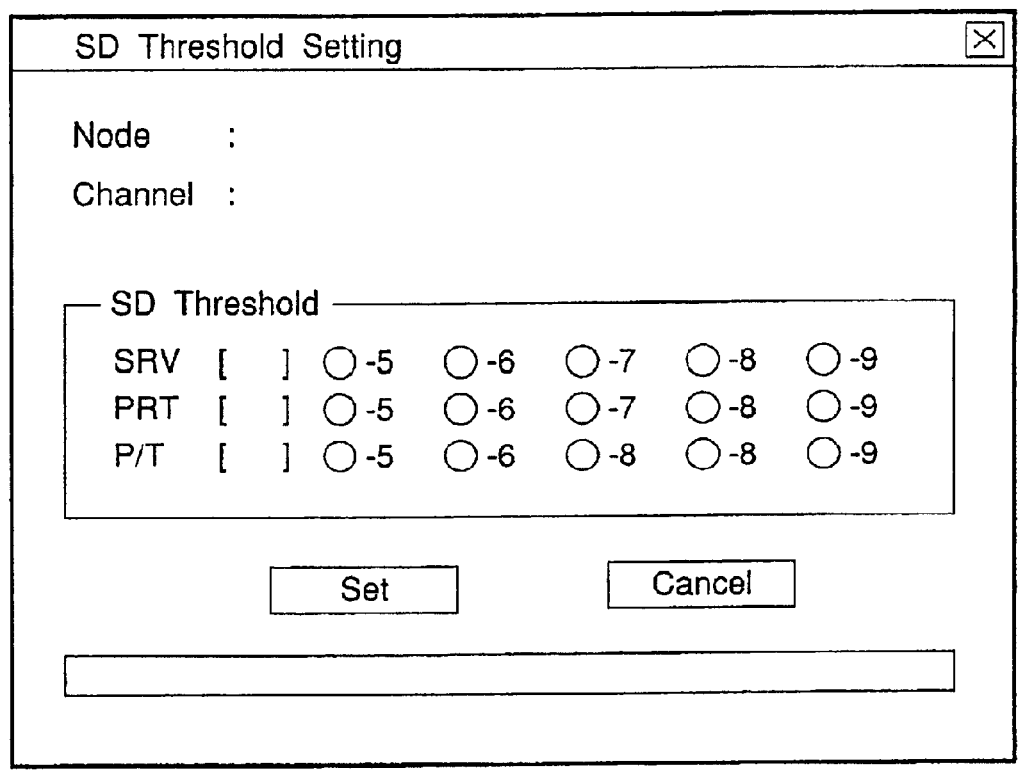
FIG. 27 is a view showing an SD Threshold Setting window.

When an arbitrary Channel is clicked in the scroll window illustrated in FIG. 26, an SD Threshold Setting window shown in FIG. 27 is opened. Furthermore, a threshold value is selected for each Operation Mode (SRV, PRT, P/T). When Modify shown in FIG. 26 is clicked upon completion of setting of each item, the node as a target is informed of each set content, and the set content is set to the node which has received information.

<Log>

The operation concerning Log will now be described. In regard to log, as shown in FIG. 4, there are prepared sub menus, i.e., NODE Log Control, NODE Record Retrieval, and Terminal Access Record Retrieval.

(NODE Log Control)

Description will now be given as to a NODE Log Control window shown in FIG. 28. This window is opened when NODE Log Control is clicked in a sub menu (shown in FIG. 4) which is opened when Log is clicked in the FIG. 3 main menu. The FIG. 28 window concerns the operation of a log stored in a data base of a NODE to which the Terminal 5 is connected.

Figure 28:
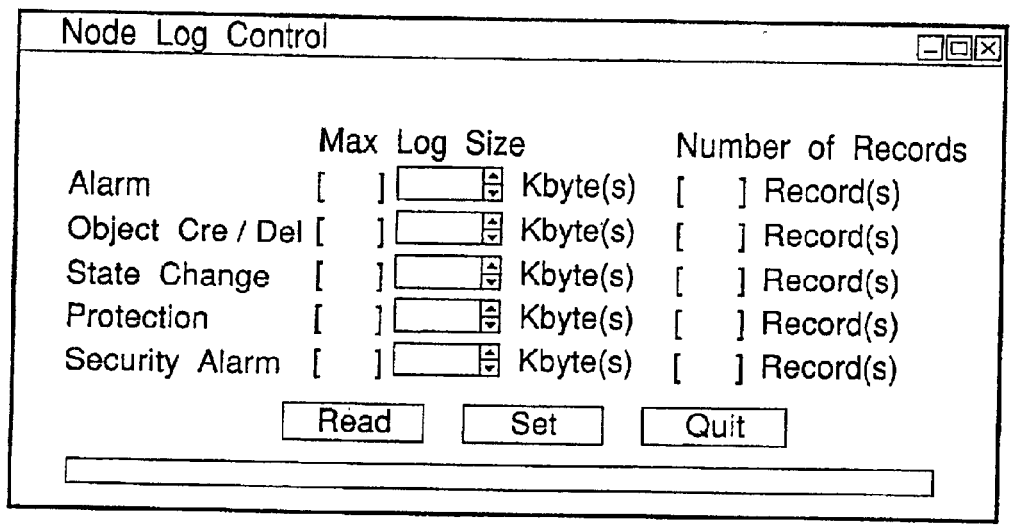
FIG. 28 is a view showing a NODE Log Control window.

As shown in FIG. 28, in the data base of the NODE is stored a log having items Alarm, Object Creation/Deletion, State Change, Protection Control, and Security Alarm. These items are all events which are detected on the NODE side. Their histories are stored by each NODE itself, and form a data base as histories (the same content is transmitted to the SSE 2 or the U-NME 3 as notification information and also accumulated in the data base of the SSE 2 or the U-NME 3 as a log).

A maximum log size concerning each of the above-described items is set in the FIG. 28 window. In the window shown in FIG. 28, when the Read button is clicked, the current set content is read from the connected NODE and shown in FIG. 28. As set items in the FIG. 28 window, there are Max Log Size (maximum size of a log in a storage resource: unit of Kbyte) and Number of Records (maximum number of logs in the storage resource). When setting using numeric figures is performed for these items and the Set button is then clicked, the set content is set to the connected NODE.

It is to be noted that an equal log size is allocated to each of, e.g., Alarm to Security Alarm by the default. On the other hand, a maximum log size can be allocated in accordance with a frequency of occurrence of each item by performing the above-described operation. For example, since a number of times of occurrence of an event Creation/Deletion is smaller than that of any other event, a log size to be allocated is set small. Instead, a larger size can be assured for the event Alarm having a high frequency of occurrence. By doing so, it is possible to obtain an advantage that the storage resource in the NODE can be effectively exploited.

Figure 29:
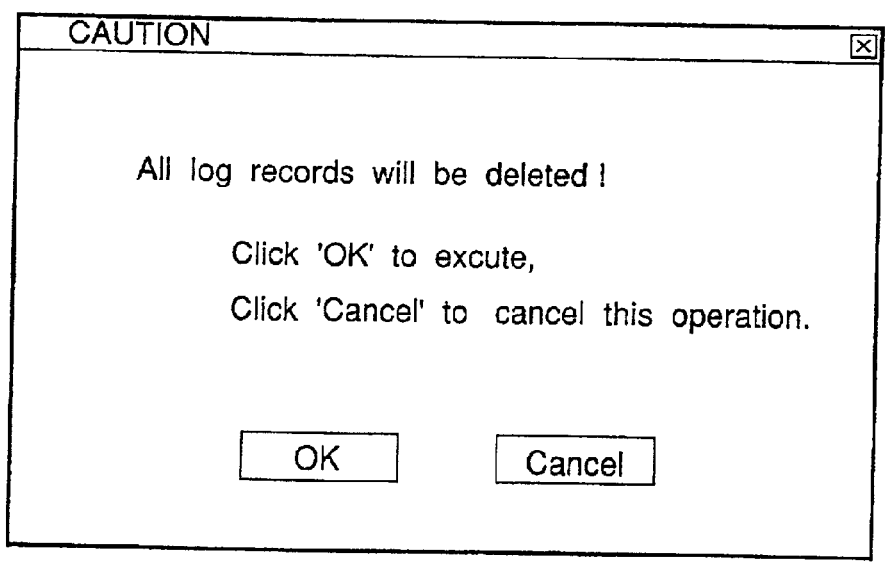
FIG. 29 is a view showing an example of a CAUTION window.

Incidentally, as the logs are accumulated, new information is rewritten on data which has overflowed the maximum log size (Wrap mode) by default, and data are deleted starting from the oldest one. Since new data is cyclically overwritten in the logs with passage of time, the accumulated logs are all deleted when changing the log size. Therefore, when the Set button shown in FIG. 28 is clicked, the alarm window is displayed. FIG. 29 shows an example of the alarm window. This window displays a message "All log records are deleted. Click the OK button if you want to delete, or click the Cancel button if you abort deletion".

(NODE Record Retrieval)

A NODE Record Retrieval window shown in FIG. 30 will now be described. This window is opened when NODE Record Retrieval is clicked from the sub menu illustrated in FIG. 4. This window is used for setting conditions for retrieving desired data from the log stored in the data base.

Figure 30:
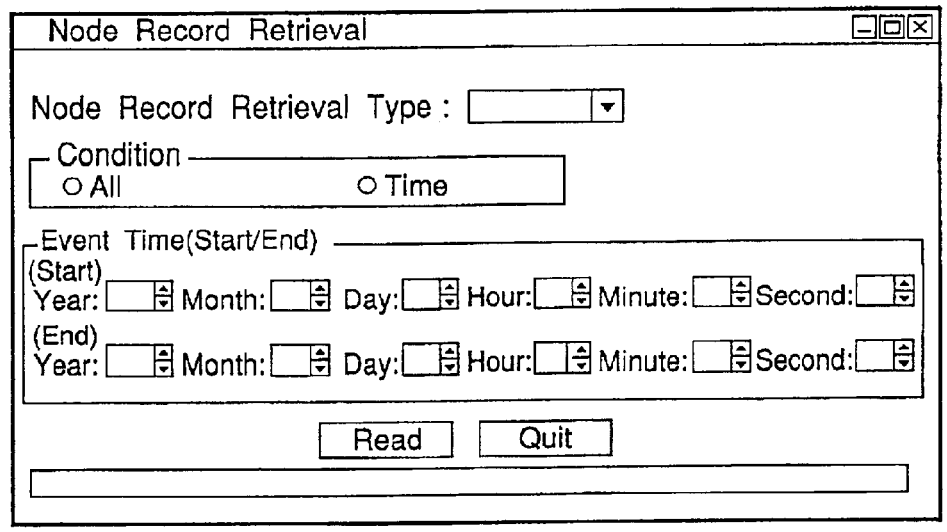
FIG. 30 is a view showing a NODE Record Retrieval window.

In the FIG. 30 window, one item is selected as Node Record Retrieval Type from Alarm, Object Creation/Deletion, State Change, Protection Control, and Security Alarm (not shown). Either All (time is not specified) or Time (time is specified) is specified in a section Condition. When Time is specified, a time is specified in a range of (Start) to (End) by Event Time (Start/End). When the Read button is clicked after each item is selected in the FIG. 30 window, a result of retrieval is displayed in a (Alarm) Record Retrieval Report window shown in FIG. 31.

Figure 31:
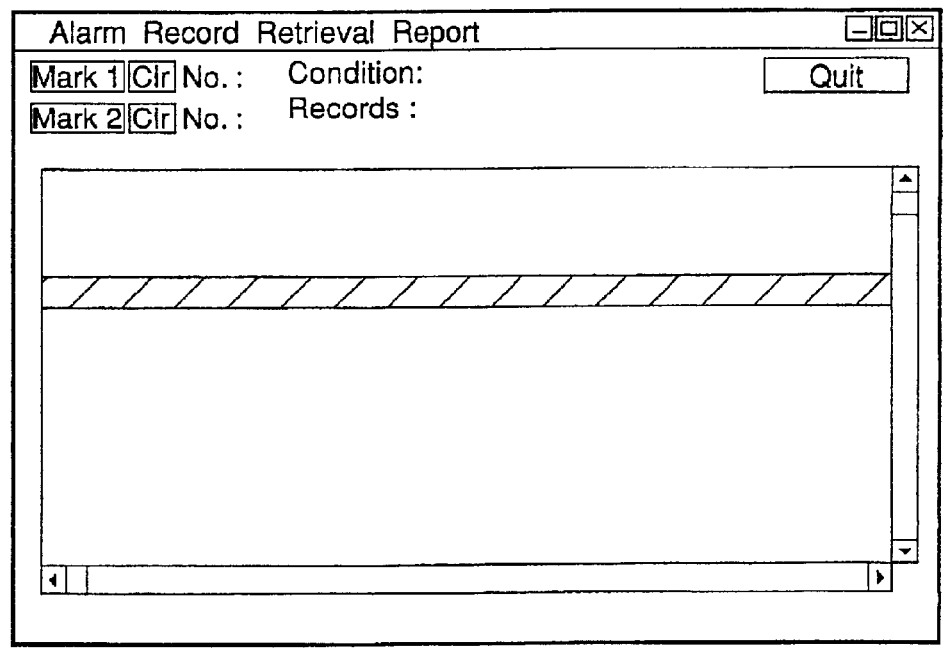
FIG. 31 is a view showing an Alarm Record Retrieval Report window.

The FIG. 31 window displays in the scroll window a list of notification information retrieved from the history in connection with the selected Record Type (Alarm is shown as a window title in FIG. 31. This title varies depending on each selected Record Type) in a text format. The FIG. 31 window is different from the FIG. 10 window in that a result of retrieval of notification information accumulated in the data base as a history is displayed. The window illustrated in FIG. 10 displays acquired notification information in real time, whereas the window depicted in FIG. 31 displays a result of retrieval from the data log.

In the FIG. 31 window, a mark can be also put to arbitrary information displayed in the scroll window by using the Mark 1/Mark 2 buttons as similar to FIG. 10. Moreover, when the Mark 1/Mark 2 buttons are clicked anywhere in the scroll window, display can return to the marked information.

Figure 32:
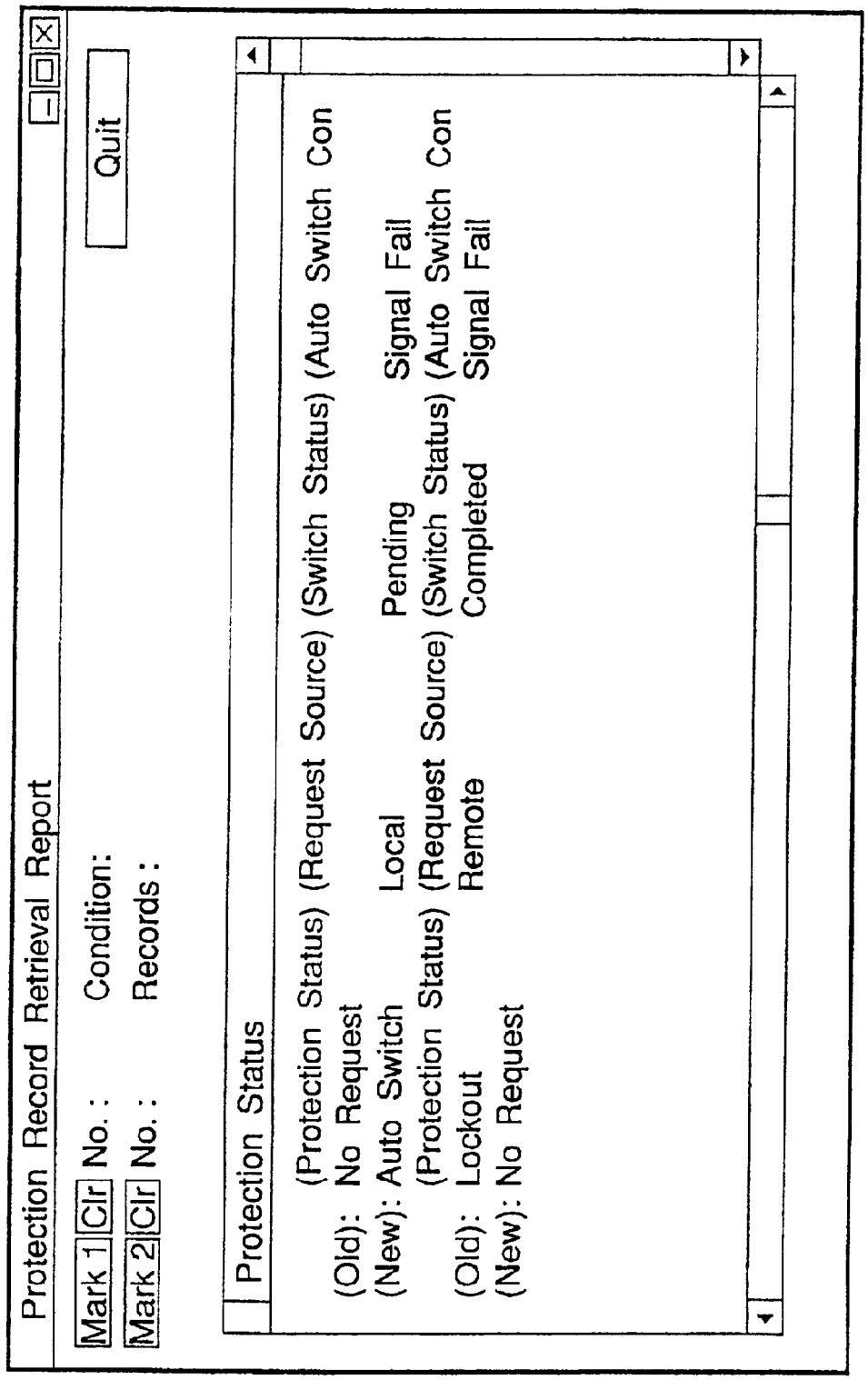
FIG. 32 is a view showing a Protection Record Retrieval Report window.

The clear (Clr) button is also similar to that shown in FIG. 10. FIG. 32 shows a display example of a retrieval result concerning Protection Control.

(Terminal Access Record Retrieval)

A Terminal Access Record Retrieval window shown in FIG. 33 will now be described. This window is opened when Terminal Access Record Retrieval is clicked from the sub menu shown in FIG. 4. This window is used for setting conditions for retrieving data concerning logs stored in the NODE, particularly an access log from the Terminal 5.

Figure 33:
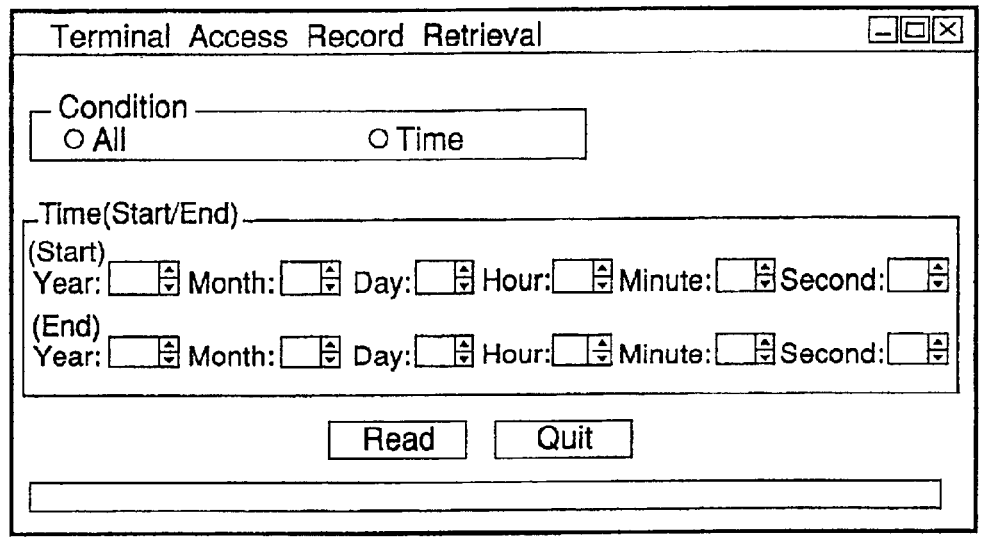
FIG. 33 is a view showing a Terminal Access Record Retrieval window.
Figure 34:
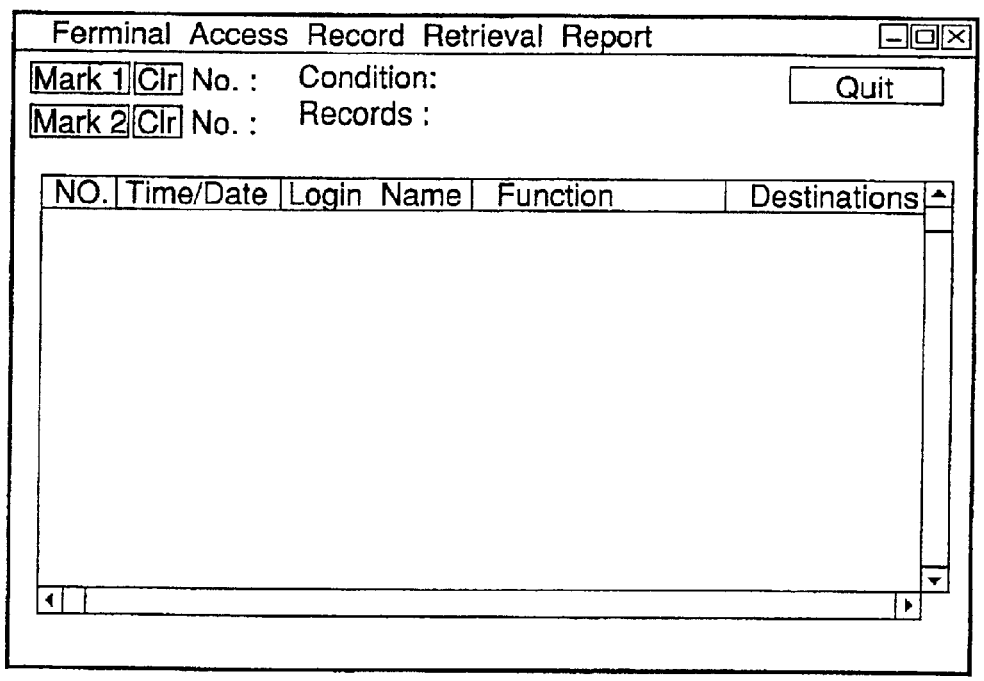
FIG. 34 is a view showing a Terminal Access Record Retrieval window.

In the FIG. 33 window, when the retrieval conditions are specified and the Read button is clicked as similar to, e.g., FIG. 30, a result of retrieval is displayed in a Terminal Access Record Retrieval Report window shown in FIG. 34. A name of a login user is displayed in a section Login Name in the scroll window, and the operation content of that login user is displayed in a section Function of the same.

<Performance>

The operation concerning Performance will now be described. In regard to Performance, as shown in FIG. 4, there are prepared sub menus, i.e., Performance Data Record Retrieval and Quality of Service Alarm Control.

Performance Data Record Retrieval

A Performance Data Record Retrieval window illustrated in FIG. 35 will now be described. This window is opened when Performance Data Record Retrieval is clicked in the sub menu (shown in FIG. 4) which is opened when Performance is clicked in the FIG. 3 main menu. This window is used for retrieving a quality log from the data base of the connected NODE.

Figure 35:
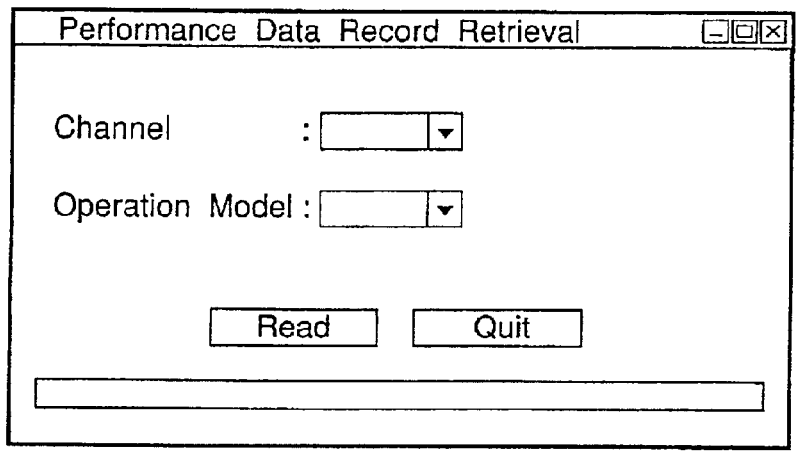
FIG. 35 is a view showing a Performance Data Record Retrieval window.

In the FIG. 35 window, items Channel and Operation Mode of a connected NODE are specified. In the Channel item, a channel of a high-speed side line (HS W (West), HS E (East)) accommodated in the NODE and a channel of a low-speed side line (LS1 to LS32) accommodated in the same are respectively specified. In an Operation Mode item, a type of a transmission path, i.e., SRV (service channel: working system), PRT (protection channel: preliminary system), or P/T (part time system) is specified. These items are selected in a drop-down list.

Figure 36:
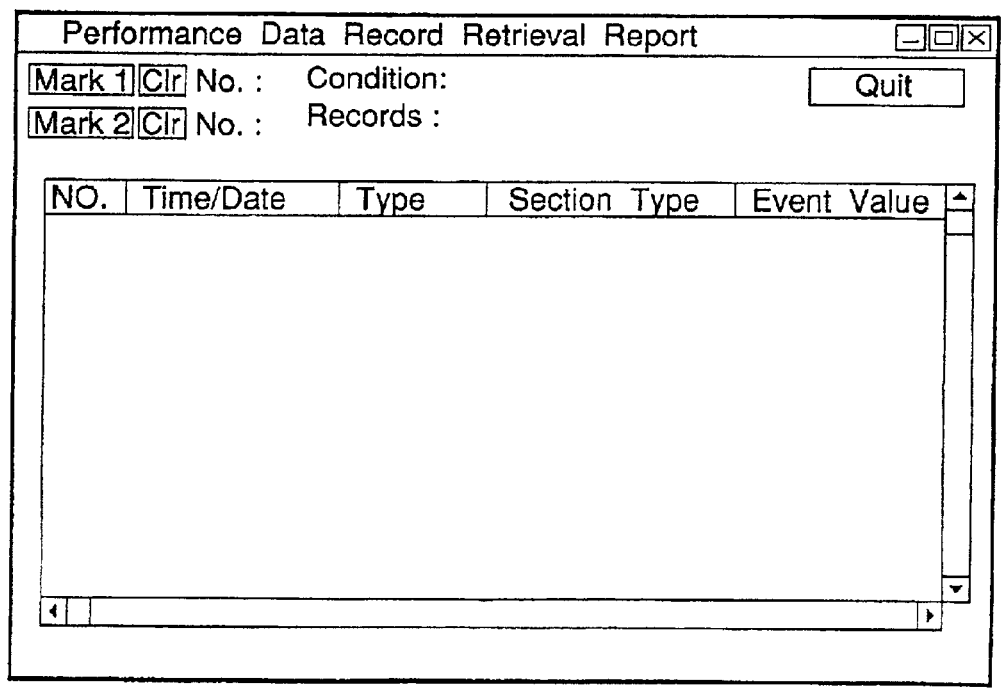
FIG. 36 is a view showing a Performance Data Record Retrieval Report window.

When the Read is clicked in the FIG. 35 window, the current state of the selected target is retrieved from the data base of the NODE, and a list of that result is displayed in a Performance Data Record Retrieval Report (Graph) window shown in FIG. 36. Likewise, functions of the Mark 1/Mark 2 buttons and the clear (Clr) button can be used in this window.

(Quality of Service Alarm Control)

A Quality of Service Alarm Control window depicted in FIG. 37 will now be described. This window is opened when Quality of Service Alarm Control is clicked from the sub menu shown in FIG. 4. In the system according to this embodiment, when quality information measured in each NODE demonstrates excessive quality degradation, the supervisory control apparatus 3 is informed of this degradation as an alarm. The FIG. 37 window is used for setting conditions under which the alarm is transmitted. The selected NODE is notified of the conditions set in the FIG. 37 window, and the NODE having received this notification operates under the conditions.

As the quality information, there are TCCV (Total Count of Code Violation), BBE (Background Block Error), ES (Errored Second), SES (Severely Errored Second), UAS (Unavailable Seconds), OFS (Out of Frame Second) and others.

Figure 37:
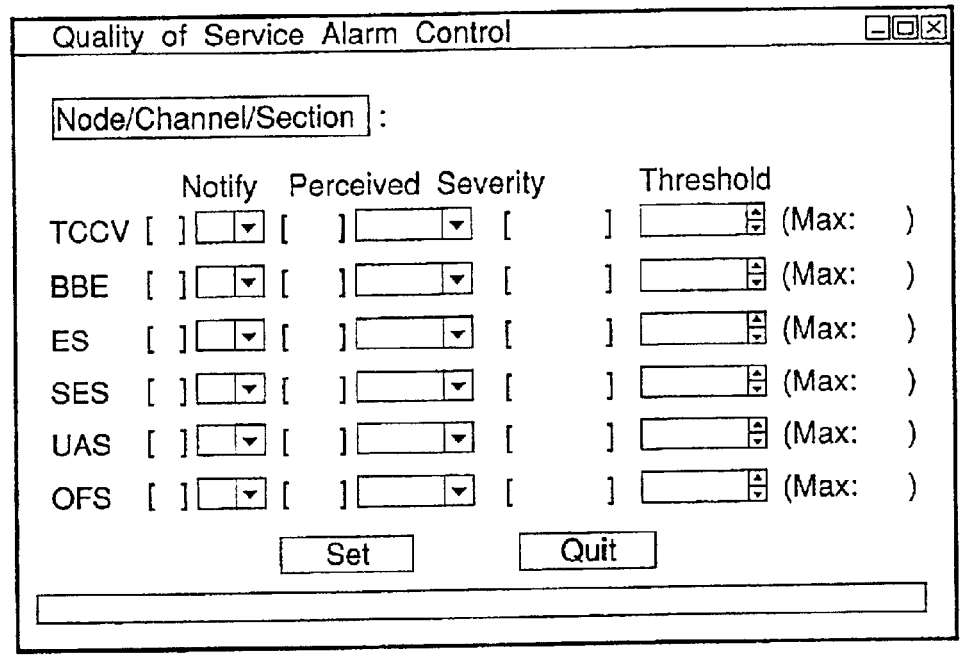
FIG. 37 is a view showing a Quality of Service Alarm Control window.
Figure 38:
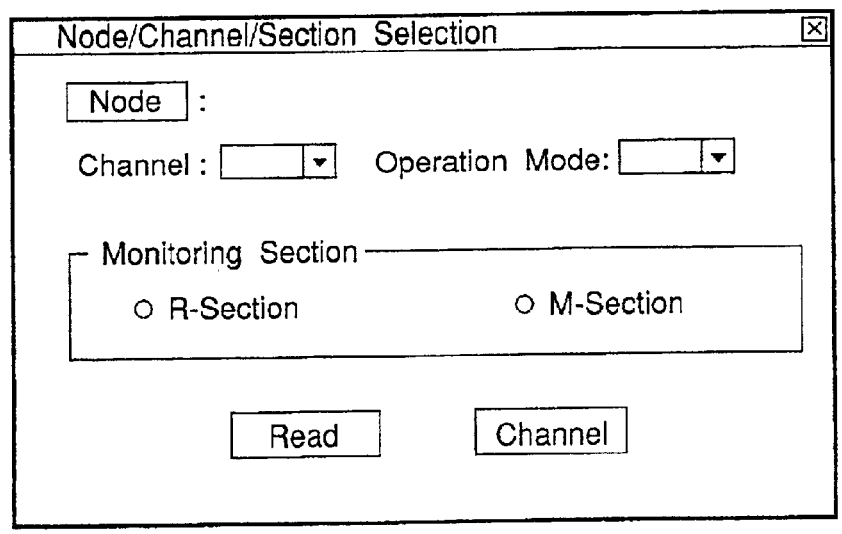
FIG. 38 is a view showing a NODE Selection window.

When a NODE/Channel/Selection button is clicked in FIG. 37, a NODE/Channel/Section Selection window depicted in FIG. 38 is displayed. In the FIG. 38 window, which section in which channel in which node in which ring network that the quality information is determined as a target is set. That is, in the FIG. 38 window, it is possible to set as targets the connected NODE as well as all NODEs belonging to a ring network including the connected NODE.

When the Read button is clicked in the FIG. 38 window, the current set content is read from the target NODE, and this is displayed in the window depicted in FIG. 37. An operator of the Terminal 5 changes or modifies conditions under which the alarm is transmitted for each set of the quality information based on the content displayed in the FIG. 37 window.

In the window shown in FIG. 37, On or Off is selected in a section Notify, and notification or non-notification of the alarm is set. In a Perceived Severity section, any one of Critical, Major, Minor and Warning is selected and rating of the notified alarm is set. In a Threshold section, a threshold value concerning notification/non-notification of the alarm is set by inputting a numeric figure.

When the Set button is clicked after the above-described setting is carried out for each set of quality information, the target NODE is informed of the set content. The NODE having received notification notifies the supervisory control apparatus 3 of the alarm in accordance with the informed set content. With the above-mentioned functions, management of the communication quality can be facilitated.

<Path>

The operation concerning Path will now be described. In regard to Path, as shown in FIG. 5, there are prepared sub menus, i.e., Path Configuration Control, Ring Map Administrative Control, Ls Group Type Control, and APS Control.

(Path Configuration Control)

A Path Configuration Control window shown in FIG. 39 will now be described. This window is opened when Path Configuration Control is clicked from the sub menu (shown in FIG. 4) which is opened when Path is clicked in the FIG. 3 main menu. The FIG. 39 window is used for setting a path to the network.

Figure 39:
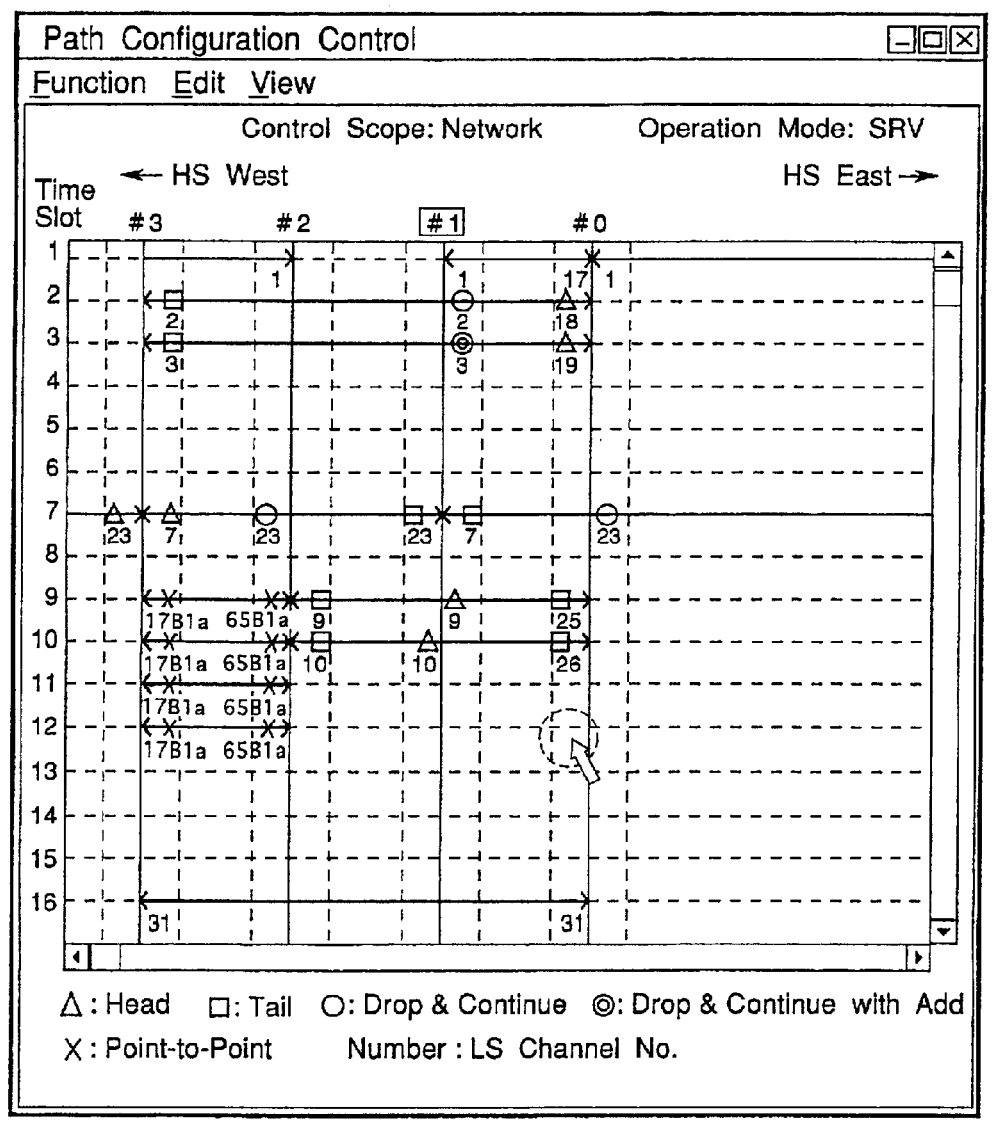
FIG. 39 is a view showing a Path Configuration Control window.

The Path Configuration Control window shown in FIG. 39 has menus Function, Edit and View. In Function, there are prepared Read Path, Update Path and Invalid as sub menus (not shown).

In order to set a path, an operator must be aware of the set status of the current path. Thus, when Function in the upper left part in FIG. 39 is clicked and a Read Path button in the sub menu is clicked, a Read Path window shown in FIG. 40 is displayed.

Figure 40:
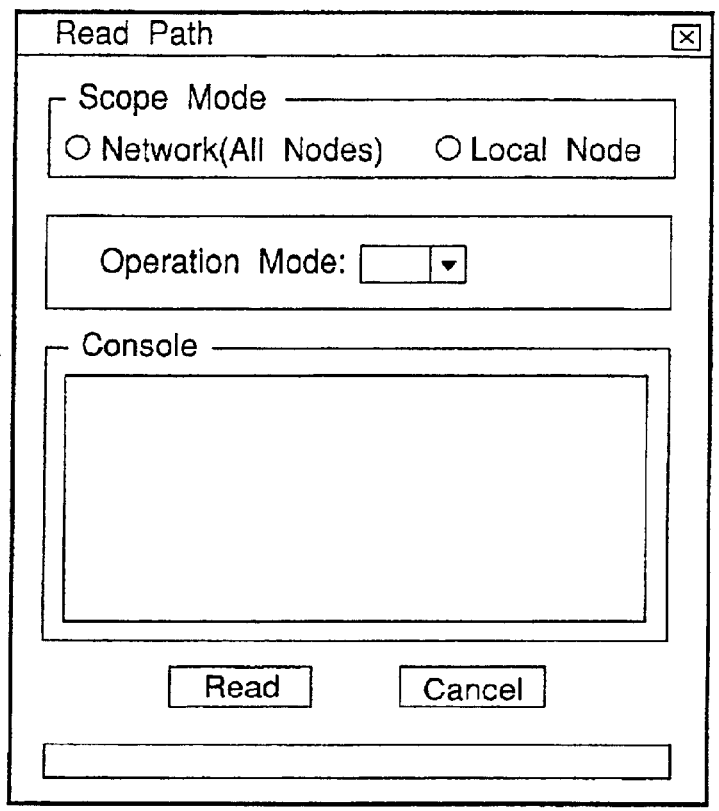
FIG. 40 is a view showing a Read Path window.

The FIG. 40 window is used for specifying the NODE for acquiring the set status of the path. In the FIG. 40 window, a mode used when obtaining the set status is specified. In a Scope Mode section in FIG. 40, either all the NODEs (All Nodes) in the ring network or a NODE to which its own apparatus (Terminal 5) is connected (Local Node) is selected as a target for obtaining the set status of the path. In addition, when the Read button is clicked after either or both of SRV and P/T Operation Modes are specified, the current path set content is read from the selected target. This read content is reflected to display (scroll window) in FIG. 39.

0 to #3 displayed in the scroll window shown in FIG. 39 correspond to respective NODEs displayed in the FIG. 3 main screen. FIG. 39 shows an example in which one ring network is provided with four nodes. Reference numeral #1 in a square in FIG. 39 denotes a NODE to which its own apparatus (Terminal 5) is currently connected. A high-speed side West line is displayed on the left side and an East line is displayed on the right side of the scroll window. Time slots which are time-division-multiplexed to the high-speed side line are displayed by numbers on the left side of the scroll window, and one time slot corresponds to one path.

For example, one double arrow is displayed at a position of each of the time slots 2 and 3 between the NODE #3 and the NODE #0. Each arrow corresponds to one path, and it is indicated that the path is dropped to the LS side in the node shown by an end of the arrow.

A mark indicative of a drop type of the path is displayed at an end of each arrow. For example, in the time slot 2, a triangle mark (head) is given to the NODE #0; a square mark (Tail), to the NODE #3; and a white circle mark (Drop & Continue), to the NODE #0 side of the NODE #1. This indicates that the path added from the LS side in the NODE #0 is dropped to the LS side in the NODE #3 and also dropped to the LS side in the midway NODE #1. Such a path is referred to as a dual homing (Dual Homing) path. Besides, a Drop & Continue with Add path is indicated by a double circle mark.

Figure 45:
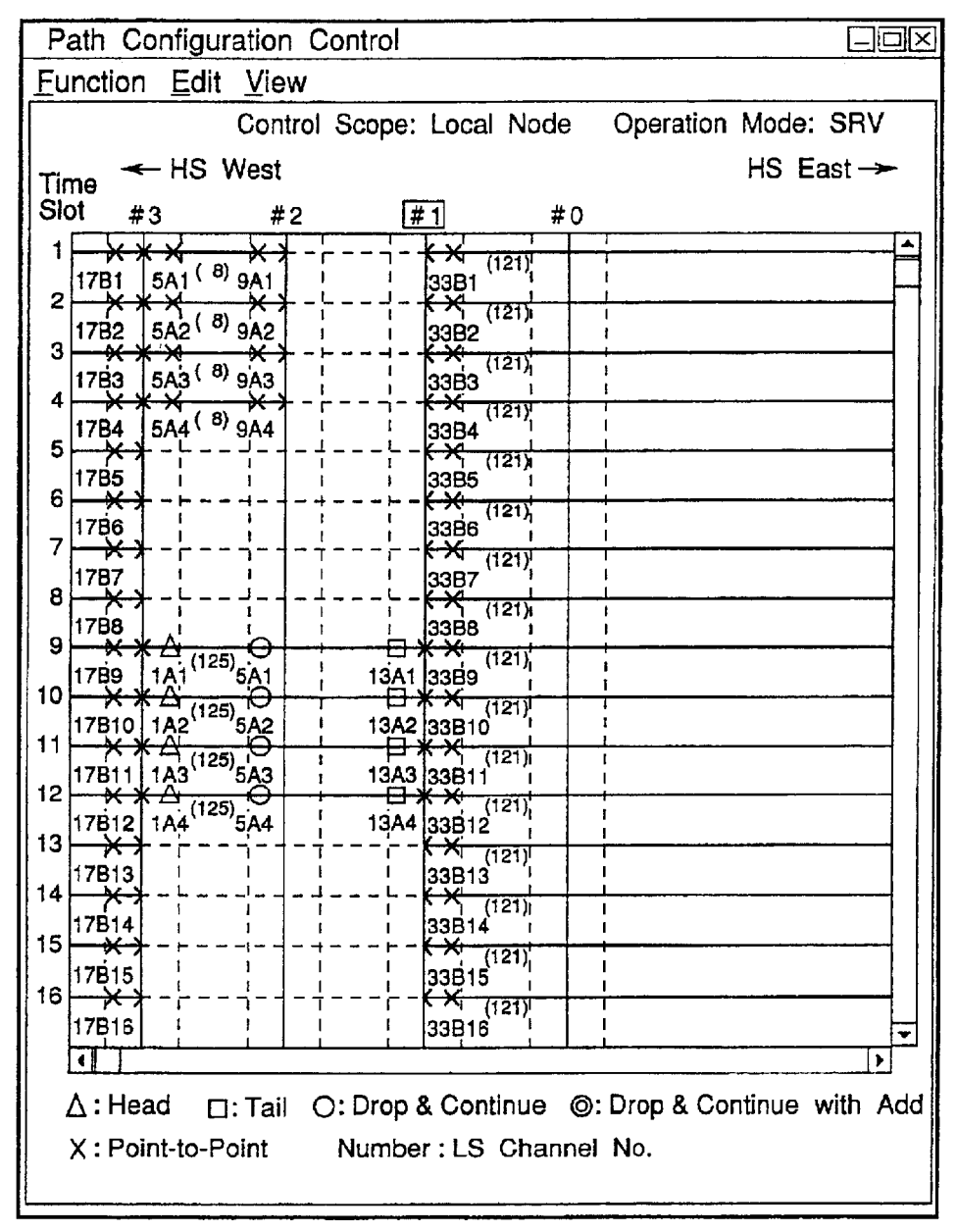

A numeric figure given at an end portion of each arrow in FIG. 39 indicates a channel number on the low-speed side to which the path is dropped. A destination to which the path is dropped can be displayed in detail as shown in, e.g., FIG. 45. In FIG. 45, as to a notation "17B1", the first number 17 indicates a channel number; the subsequent B, a type of a board (A indicates an STM-4 board, and B indicates an STM-16 board); and the subsequent 1, a time slot number of LS (low-speed side channel).

In FIG. 39, an arrow is shown at a position of each of the time slots 9 to 12 in an interval SRV between the NODE #03 and the NODE #02. These arrows indicates that they are one concatenation (Concatenation) path as a whole. That is, four time slots form one path. The notation "17B1a" or "65B1a" indicates the drop state of the path. For example, if there is the notation "17B1a", the first number 17 indicates a channel number on the low-speed side to which the path is dropped. The subsequent "B" indicates a board type to which the path is dropped. "B" means an STM-16 board, and "A" means an STM-4 board. The subsequent "1" indicates a time slot number in the low-speed side channel. The last "a" indicates a type of concatenation and means that a concatenation signal represented by this arrow is an AU-4-4c signal corresponding to the STM-4.

Description will now be given as to how to set a path by using the window illustrated in FIG. 39.

Figure 41:
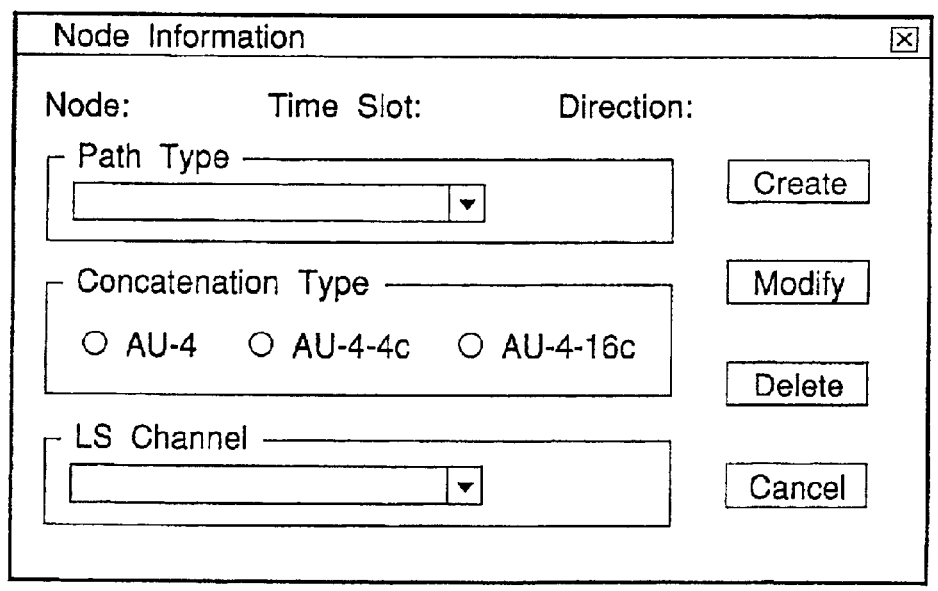
FIG. 41 is a view showing a Node Information window.

A start point and an end point of a path to be set are specified. For example, when the circumference of a part surrounded by a dotted line (time slot 12, NODE #0: this is not actually displayed) in FIG. 39 is clicked, a Node Information window shown in FIG. 41 is opened. FIG. 41 displays the current path status concerning a NODE corresponding to the clicked part.

In the FIG. 41 window, a path type (Head, Tail and others) is specified in the pull-down menu in a Path Type section, and a type of concatenation of a path to be set is specified in a Concatenation Type section. In FIG. 41, AU-4 corresponding to STM-1, AU-4-4c corresponding to STM-4, and AU-4-16c corresponding to STM-16 can be selected. In this section, AU-4-64c corresponding to STM-64 may be provided. In an LS Channel section, a channel which can be a start point or an end point of the path is selected in the pull-down menu. After selecting each item, a Create button or a Modify button is clicked.

Figure 43:
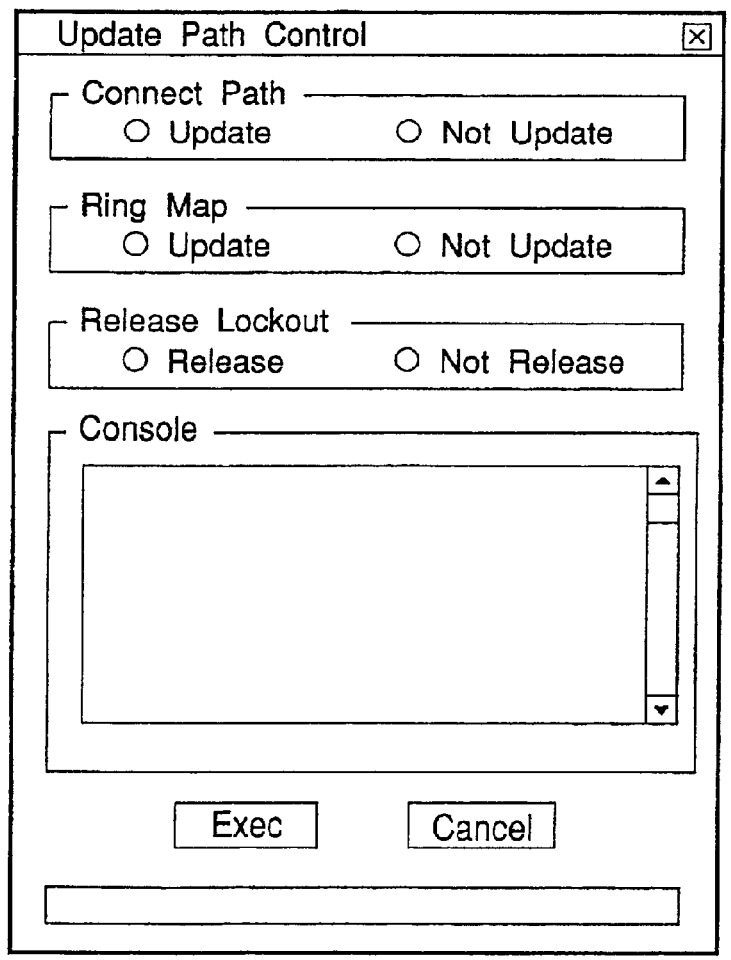
FIG. 43 is a view showing a Path Update window.

Then, when Update Path (not shown) is clicked in the sub menu of Function in FIG. 39, an Update Path Control window shown in FIG. 43 is displayed. The FIG. 43 window is used for directing updating of data including the path setting. When each item is checked and the Exec button is clicked in the FIG. 43 window, the set content is enabled, and the new path is set in the network.

Incidentally, when APS functions during the operation for setting a path, erroneous connection of traffic may occur. In order to avoid erroneous connection, the APS function in the ring network is locked before the path setting operation in this system according to this embodiment. When the APS is locked, redundancy switching is not executed even if a failure is generated. In order to unlock the APS, Release is checked in a Release Lockout section in the FIG. 43 window.

Figure 42:
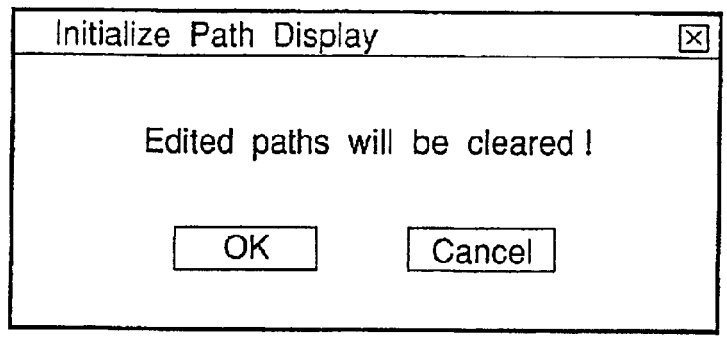
FIG. 42 is a view showing an Initialize Path Display window.

It is to be noted that an Initialize Path Display window shown in FIG. 42 is an alarm window which is displayed when clearing the operation for editing a path. When OK is clicked in this window, the edit content is cleared.

Figure 44:
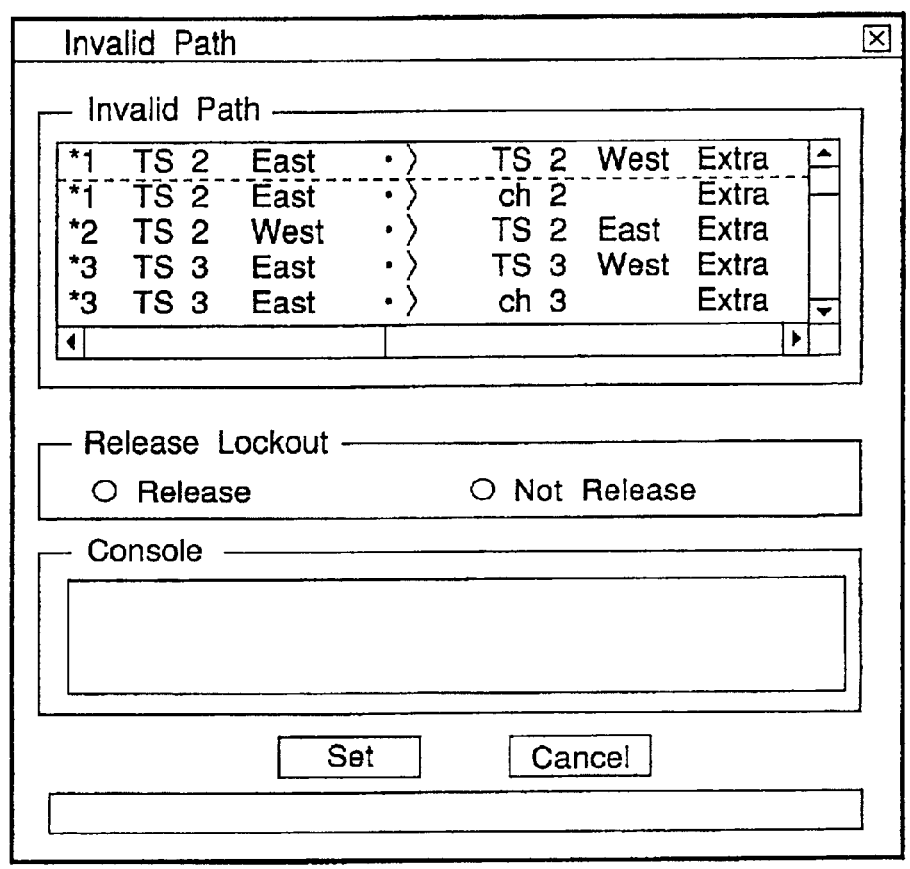
FIG. 44 is a view showing an Invalid Path window.

An Invalid Path window shown in FIG. 44 will now be described. This window is displayed when Invalid (not shown) is clicked in the sub menu of Function shown in FIG. 39. The FIG. 44 window is used for confirming whether there is an invalid path exists in paths shown in FIG. 39. "Extra" displayed in the scroll window in the FIG. 44 window indicates an excessive path which does not exist by nature. Besides, a missing path is indicated as "Shortage".

(Ring Map Administrative Control)

A Ring Map Administrative Control window shown in FIG. 46 will now be described. This window is opened when a Ring Map Administrative Control button is clicked from the sub menu shown in FIG. 4. The FIG. 46 window is used for setting locking (Locked)/unlocking (Unlocked) of the APS function in accordance with each node. For example, if the APS function which is locked (Lock) when setting a path is not released for some reason, this window is used for manually releasing the APS function.

Figure 46:
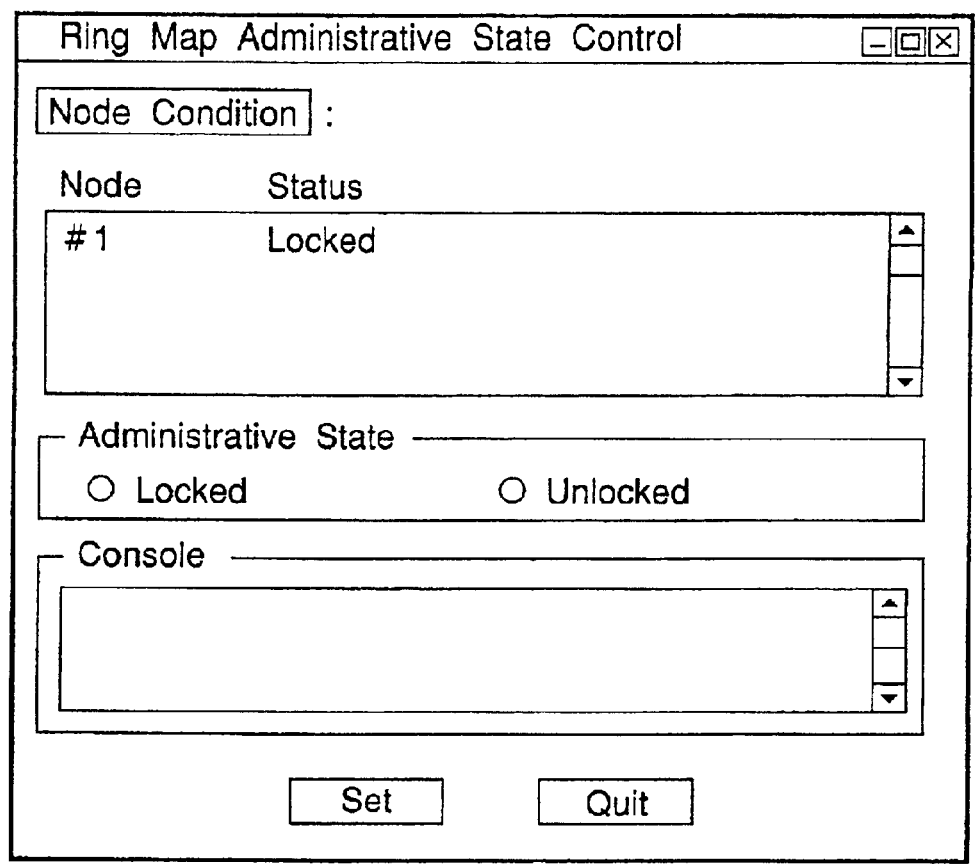
FIG. 46 is a view showing a Ring Map Administrative Control window.
Figure 47:
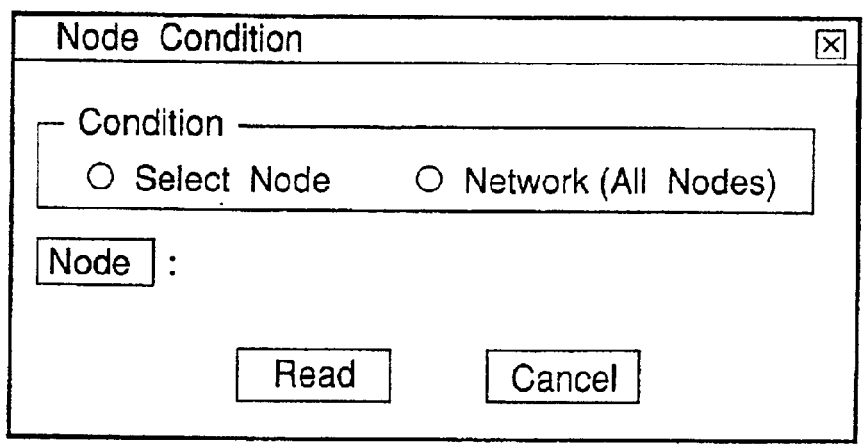
FIG. 47 is a view showing a Node Condition window.

When a Node Condition button is clicked in FIG. 46, a Node Condition window illustrated in FIG. 47 is opened. Specification of one NODE or specification of all NODEs in the ring network is selected in the FIG. 47 window. Then, when the Read button is clicked, the current status of a target NODE is acquired, and the acquired content is shown in FIG. 46. From this state, either Locked (locking) or Unlocked (releasing) is selected in FIG. 46. Subsequently, when the Set button is clicked, a message is transmitted to a target NODE, and the status of the APS is set to Locked or Unlocked.

(Ls Group Type Control)

Figure 48:
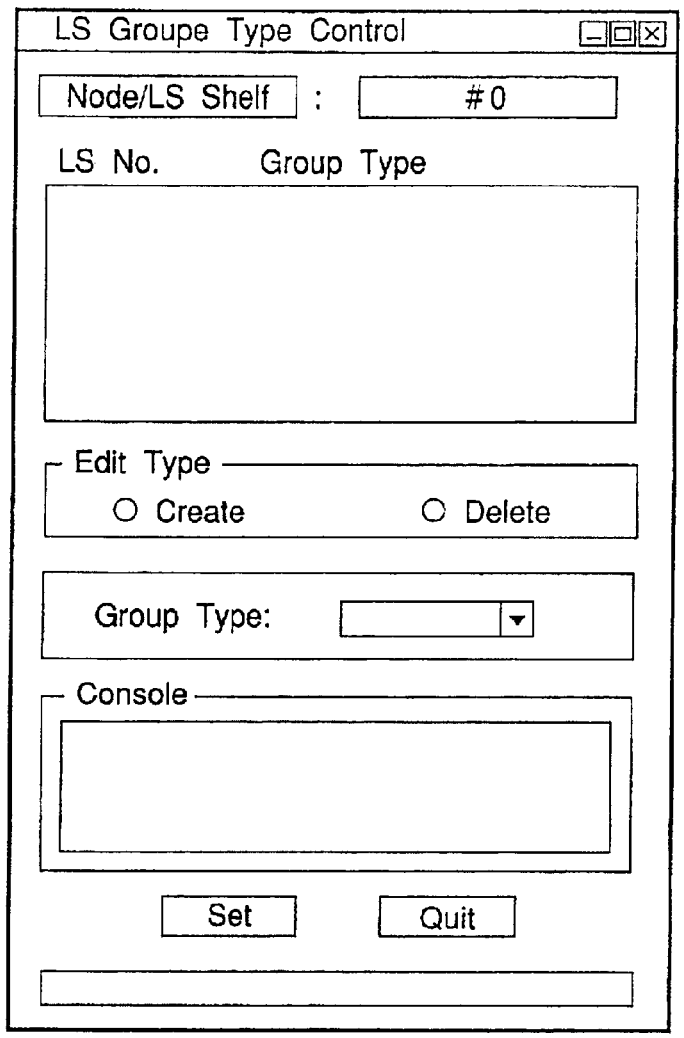
FIG. 48 is a view showing an LS Group Type Control window.
Figure 49:
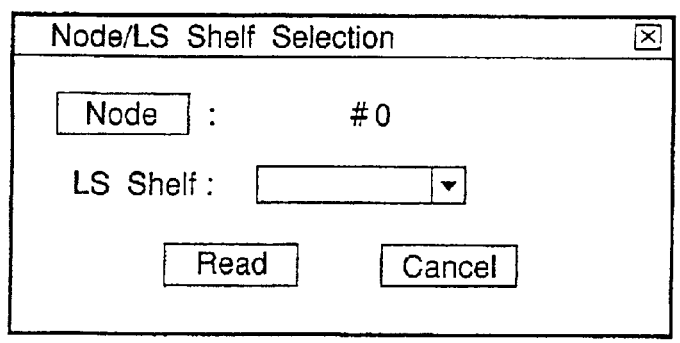
FIG. 49 is a view showing a NODE/LS Shelf Selection window.

An Ls Group Type Control window shown in FIG. 48 will now be described. The FIG. 48 window is used for setting a mode of redundancy switching concerning the low-speed (LS) system. In FIG. 48, when Node/LS Shelf is clicked, a Node/Shelf Selection window illustrated in FIG. 49 is opened. A NODE and a low-speed shelf as targets are selected in the FIG. 49 window, and the Read button is clicked. Then, the set content of the current LS group type is read and displayed in an LS No. and Group Type section shown in FIG. 48.

When a desired line is selected in this section, types of switching modes are displayed in the pull-down menu in the Group Type section. As the types of the switching modes, there are "0:1" corresponding to in-device redundancy switching, "1+1cP/T" including a part time system and the like. Besides, there are "1+1c", "1:1", "1:1P/T" and others. Here, an arbitrary switching mode is selected, and either Create (creating a group type) or Delete (deleting a group type) is selected in an Edit Type section. Thereafter, the Set button is clicked. Then, the selected NODE is informed of the set content.

Incidentally, although this is also applied to other windows, a result of communication with the NODE is displayed as, e.g., OK/NG in a Console section. Further, current access contents are sequentially displayed in a footer portion (rectangle) at a lower part in the window.

(APS Control)

An APS Control window shown in FIG. 50 will now be described. The FIG. 50 window is displayed when APS Control is clicked in the sub menu illustrated in FIG. 4, and used for setting various kinds of parameters of the APS function. When a Node/Channel button is clicked in the FIG. 50 window, the FIG. 51 window is opened. When a NODE and a Channel as operation targets are selected and the Read button is clicked in the FIG. 51 window, the current set content is read from the target NODE, and the content is shown in FIG. 50.

In FIG. 50, there are items Wait-to-Restore Time, Wait-to-Response Time, Request Guard Time. These items are temporal parameters concerning the APS. Each current set value is displayed in a section [ ]. When an arbitrary numeric figure is set in this section and the Set button is then clicked, the selected NODE is informed of the set content and this setting is determined.

<Protection>

The operation concerning Protection will now be described. In regard to Protection, as shown in FIG. 5, there are prepared sub menus Protection Switching Control, APS Exerciser Control, and Timing mode Control.

(Protection Switching Control)

Description will now be given as to a Protection Switching Control window illustrated in FIG. 52. This window is opened when Protection Switching Control is clicked from the sub menu (shown in FIG. 4) which is opened when Protection is clicked in the main screen in FIG. 3. This window is used for manually performing switching using the APS.

Figure 52:
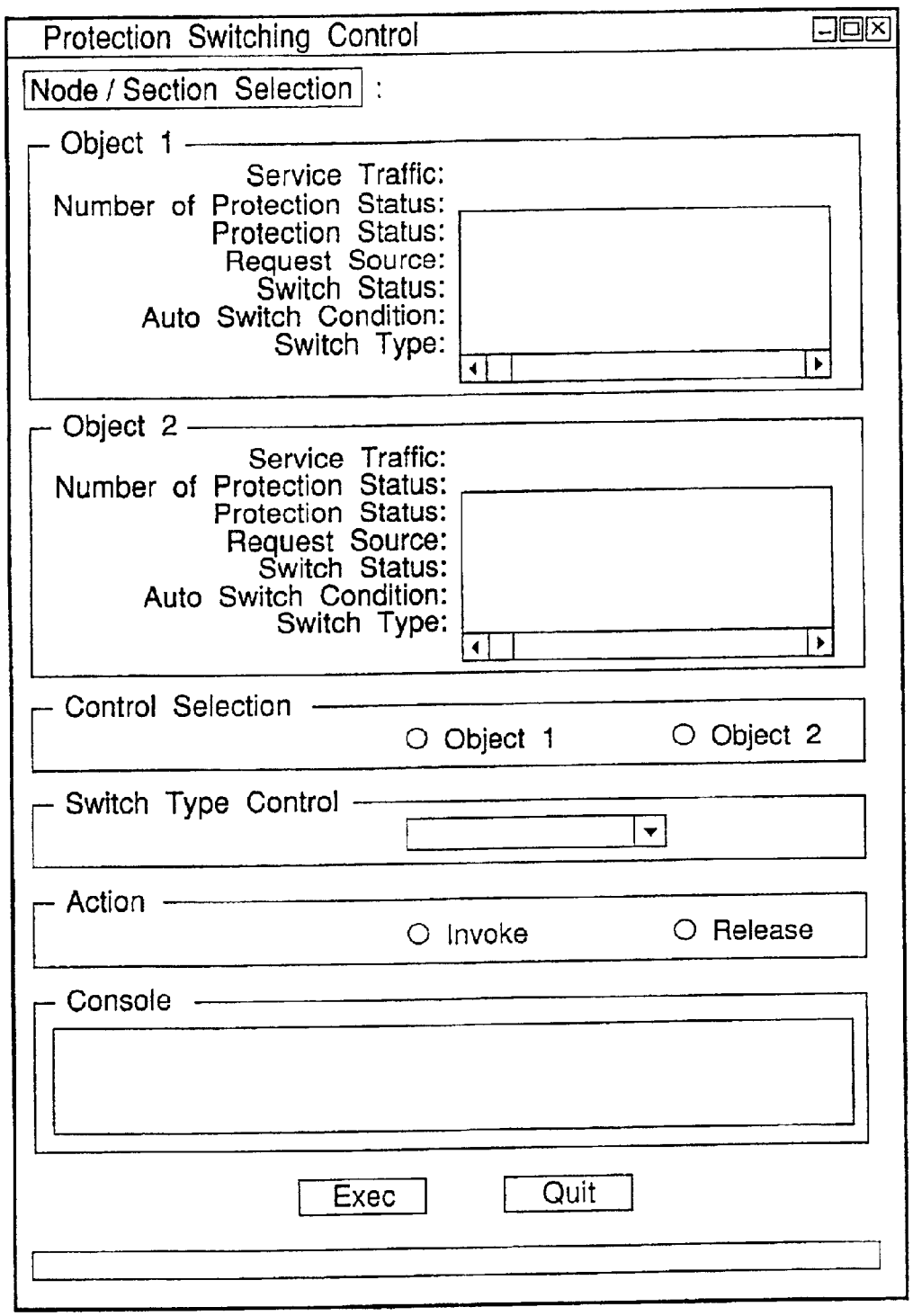
FIG. 52 is a view showing a Protection Switching Control window.
Figure 53:
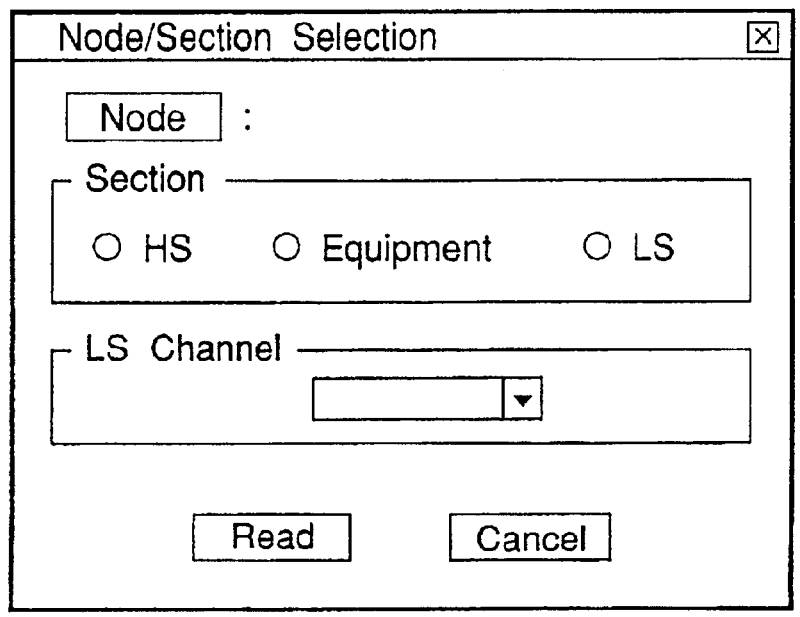
FIG. 53 is a view showing a Node/Section Selection window.

Here, likewise, a Node/Section Selection is first clicked, and a Node Section Selection window shown in FIG. 53 is displayed. In the FIG. 53 window, a target NODE is selected, and HS, Equipment and LS are selected in Section. Equipment is an item concerning in-device switching. In particular, when LS is selected, LS Channel (low-speed side channel) is also specified. When the Read is clicked after each item is specified, the current set content is read and shown in FIG. 52. A display form in FIG. 52 also varies in accordance with the selection content illustrated in FIG. 53.

The FIG. 52 scroll window displays the current statuses of parameters such as Protection Status, Request Source, Switch Status, Auto Switch Condition, Switch Type and the like. For example, when Equipment is specified in the Section section, the two scroll windows are opened, and setting can be performed in the respective windows. This corresponds to the fact that there is switching of two directions, i.e., East and West in connection with Equipment and HS switching. Therefore, when LS is specified, only one scroll window is opened.

Incidentally, when HS is specified in Section, sections in which LS1–LS64 and LS65–LS128 are displayed as shown in FIG. 52 display EAST and WEST (display order is no object).

In Control Section, a section to be set is specified and a scroll window is selected. Furthermore, a type of switching (Forced Switch, Manual Switch and the like) is selected in Switch Type Control. When either Invoke (executing switching) or Release (returning from the switched state) is specified in an Action section and the Exec button is then clicked, the selected node is informed of the set content, and the new switching state is set to this node. As described above, it is possible to control the switching state of an arbitrary node from the Terminal 5 side.

(APS Exerciser Control)

Figure 54:
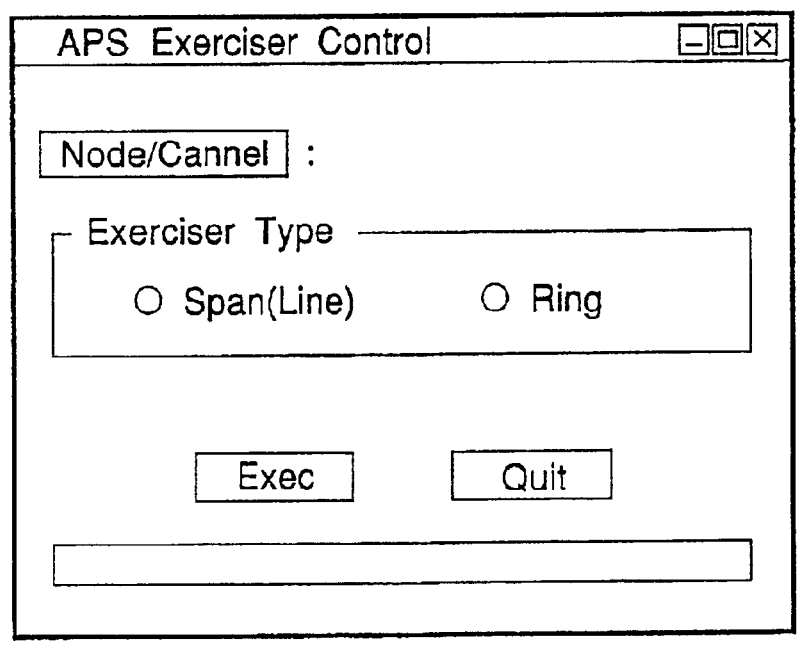
FIG. 54 is a view showing an APS Exerciser Control window.

An APS Exerciser Control window shown in FIG. 54 will now be described. This window is opened when APS Exerciser Control is clicked from the sub menu shown in FIG. 4, and used for performing the test concerning transmission/reception of signals relating to the APS function. In the FIG. 54 window, Node/Channel is clicked, and a NODE and a channel as operation targets are selected. Then, when either Span (Line) or Ring is selected in an Exercise Type section and the Exec button is thereafter clicked, the operation test of the APS concerning the selected NODE is executed. It is to be noted that actual switching is not executed here but only the test confirming whether transmission/reception of K bytes can be normally carried out is performed.

(Timing mode Control)

A NODE Timing mode Control window shown in FIG. 55 will now be described. This window is opened when Timing mode Control is clicked in the sub menu shown in FIG. 4, and used for manually setting how to take the operation clock (Timing Mode) with respect to each node.

Figure 55:
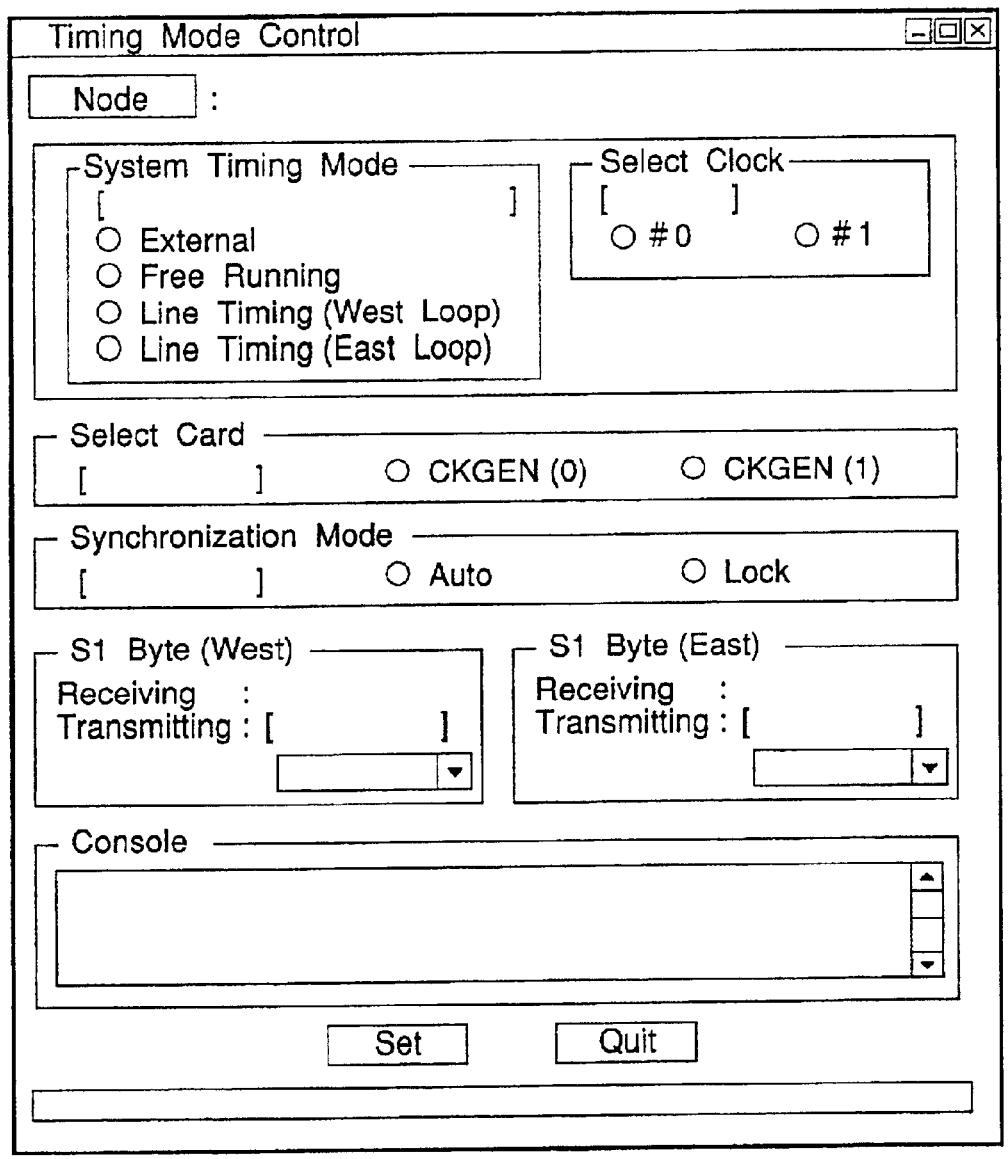
FIG. 55 is a view showing a NODE Timing mode Control window.

In the FIG. 55 window, a Node button is clicked, and a NODE as a target is selected. Then, a list of the current clock supply statuses is displayed as shown in FIG. 55. In FIG. 55, when the Set button is clicked after respective items System Timing Mode, Select Clock, Select Card, Synchronization Mode, Transmission S1 (WEST and EAST) are specified, a message is transmitted to the target NODE, and the synchronization status of the clock is set.

<Security>

The operation concerning Security will now be described. In regard to Security, as shown in FIG. 5, there are prepared sub menus User Control and Machine-Machine Control.

User Control

A User Control window illustrated in FIG. 56 will now be described. This window is opened when a User Control button is clicked from the sub menu which is opened by clicking Security in the FIG. 3 main screen.

The FIG. 56 window displays a list of user names (operator names) which are currently registered to the Terminal 5. Each user has his/her own password, and this password is utilized when, e.g., logging in to the Terminal 5. In the above-described window, an expiration date of the password is displayed in a "Password Valid Date" section. Additionally, as Access Level, a rank indicating "how far the operation is possible" to the various functions in the system is set to each user, and there is a rank ranging from Level-A to Level-C.

When an Add User button is clicked in FIG. 56, an Add User window shown in FIG. 57 is displayed. This window is used for newly registering a user who can access the Terminal 5. The FIG. 57 window includes a user name input section, a password input section, a section for reconfirming a password, and a section for setting an access level.

On the contrary, when an arbitrary user is clicked and selected in the FIG. 56 window and a Delete User button is then clicked, registration of the selected user is deleted. At this moment, the CAUTION window for confirming execution/cancel of deletion may be displayed.

Figure 58:
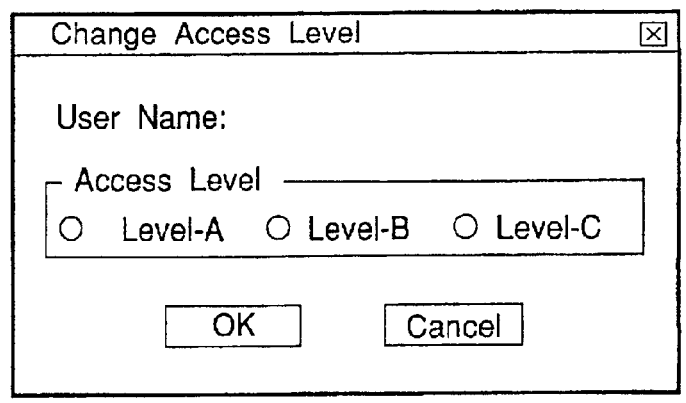
FIG. 58 is a view showing a Change Access Level window.

When an arbitrary user is clicked and selected and a Change Access Level button is then clicked in the FIG. 56 window, a Change Access Level window illustrated in FIG. 58 is displayed. The FIG. 58 window is used for changing an access level of the selected user. Any radio button is checked, and the access level is set.

Figure 59:
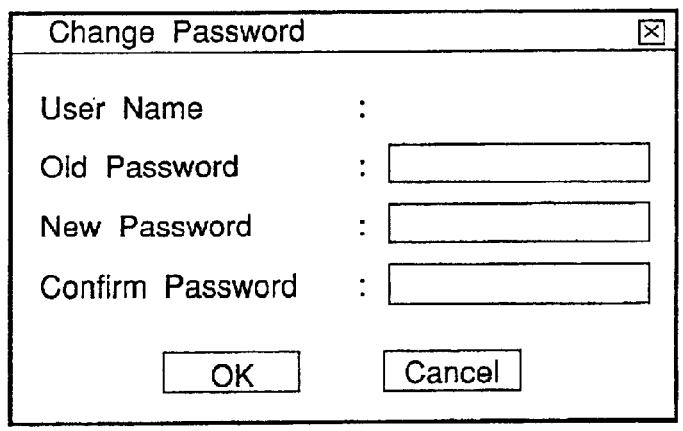
FIG. 59 is a view showing a Change Password window.

When a Change Password button is clicked after an arbitrary user is clicked and selected in the FIG. 56 window, a Change password window depicted in FIG. 59 is opened. The FIG. 59 window is used for changing a password of the selected user. This window includes a section in which a name of the selected user is displayed, a section in which an old password of the user, namely, a current password is inputted, a section in which a newly set password is inputted, and a section for reconfirming this password.

Figure 60:
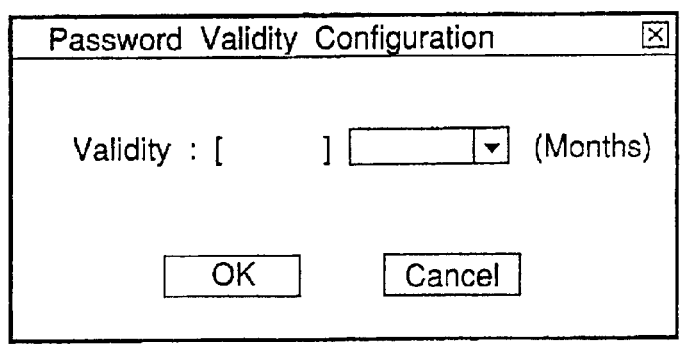
FIG. 60 is a view showing a Change Valid Date window.

When a Password Validity button is clicked after an arbitrary user is clicked and selected in the FIG. 56 window, a Password Validity Configuration window shown in FIG. 60 is displayed. This window is used for setting an expiration date of a password of the selected user, and an expiration date can be specified on the monthly basis in the pull-down menu form.

(Machine-Machine Control)

Description will now be given as to a Machine-Machine Control window depicted in FIG. 61. The FIG. 61 window is opened when a Machine-Machine Control button is clicked from the sub menu shown in FIG. 4. This window is used for managing an access level from the supervisory control apparatus in the system to a device to be monitored. That is, in the windows shown in FIGS. 56 to 60, the access authority of a human to a device is managed. On the contrary, in the window depicted in FIG. 61, the access authority of a device to another device is managed. It is to be noted that the supervisory apparatus includes the U-NME 3 and the SSE 2 as wells the Terminal 5.

Figure 61:
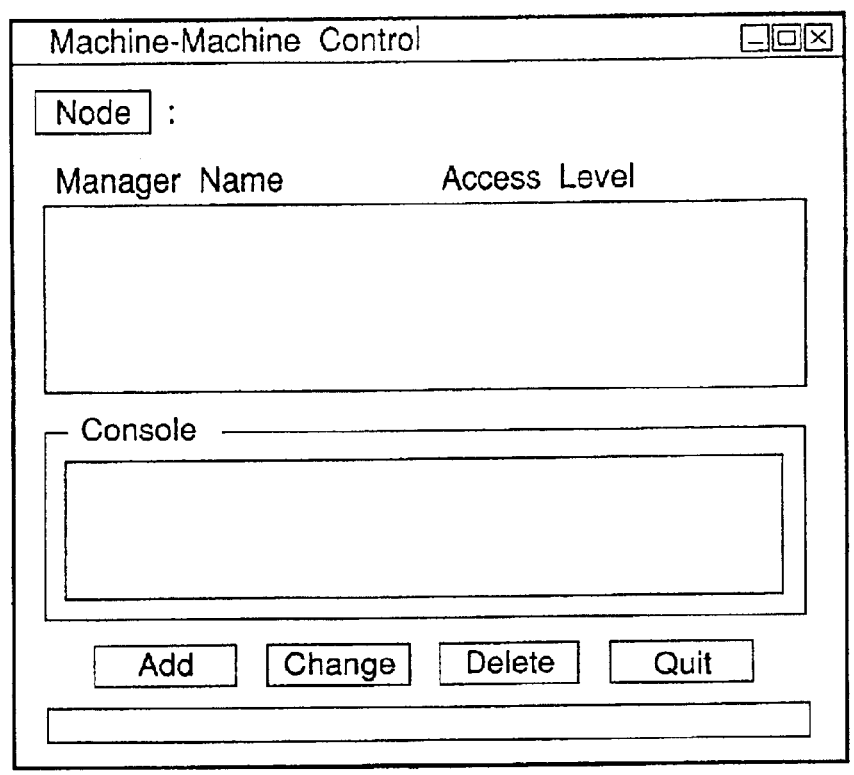
FIG. 61 is a view showing a Machine-Machine Security window.

In the FIG. 61 window, a Node button is clicked and a NODE as an operation target is selected. Then, the current set content of the selected NODE is displayed in sections Manager Name and Access Level.

Figure 62:
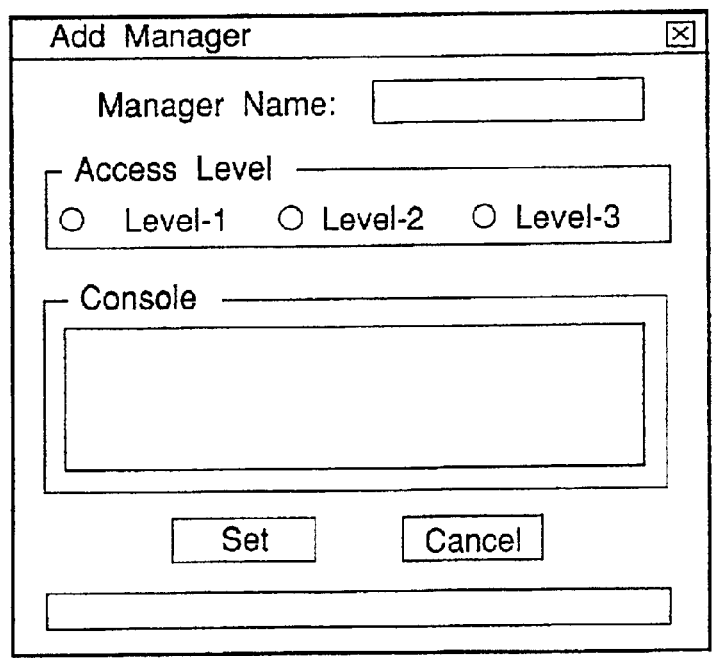
FIG. 62 is a view showing an Add Manager window.

When an Add button is clicked in the FIG. 61 window, an Add Manager window shown in FIG. 62 is opened. The FIG. 62 window is used for newly adding and registering a supervisory apparatus with respect to a monitored device selected in FIG. 61. When Manager Name and its access level are specified and the Set button is clicked in this window, the access level of the selected supervisory apparatus is set.

Figure 63:
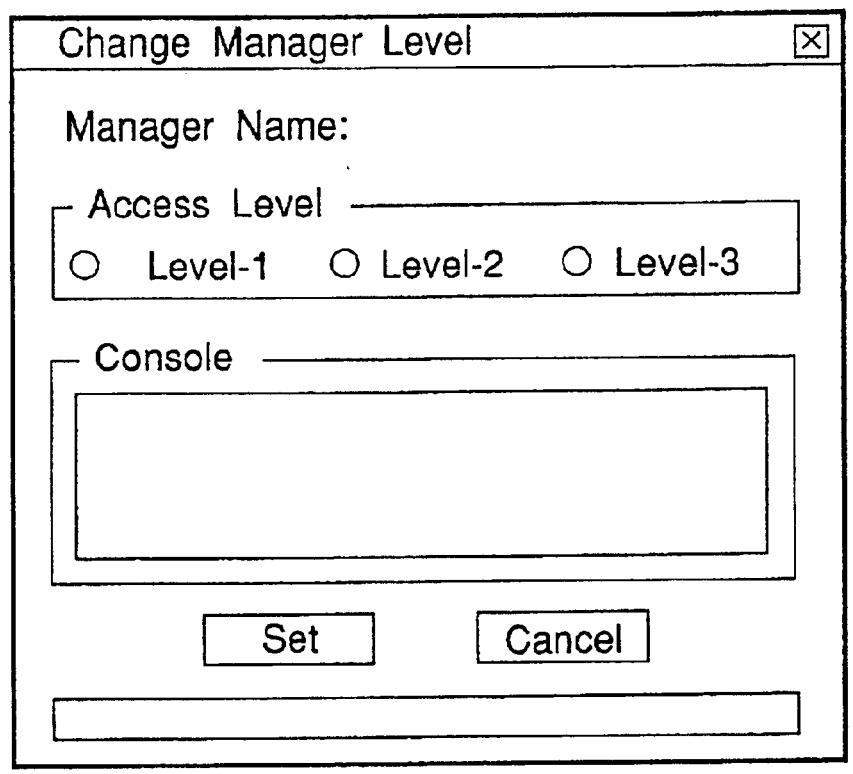
FIG. 63 is a view showing a Change Manager Level window.

When any supervisory apparatus displayed in FIG. 61 is selected and a Change button is clicked, a Change Manger Level window shown in FIG. 63 is displayed. The FIG. 63 window is used for changing an access level of the selected supervisory apparatus. In this window, when any radio button is checked and the Set button is then clicked, the new setting becomes effective.

Figure 65:
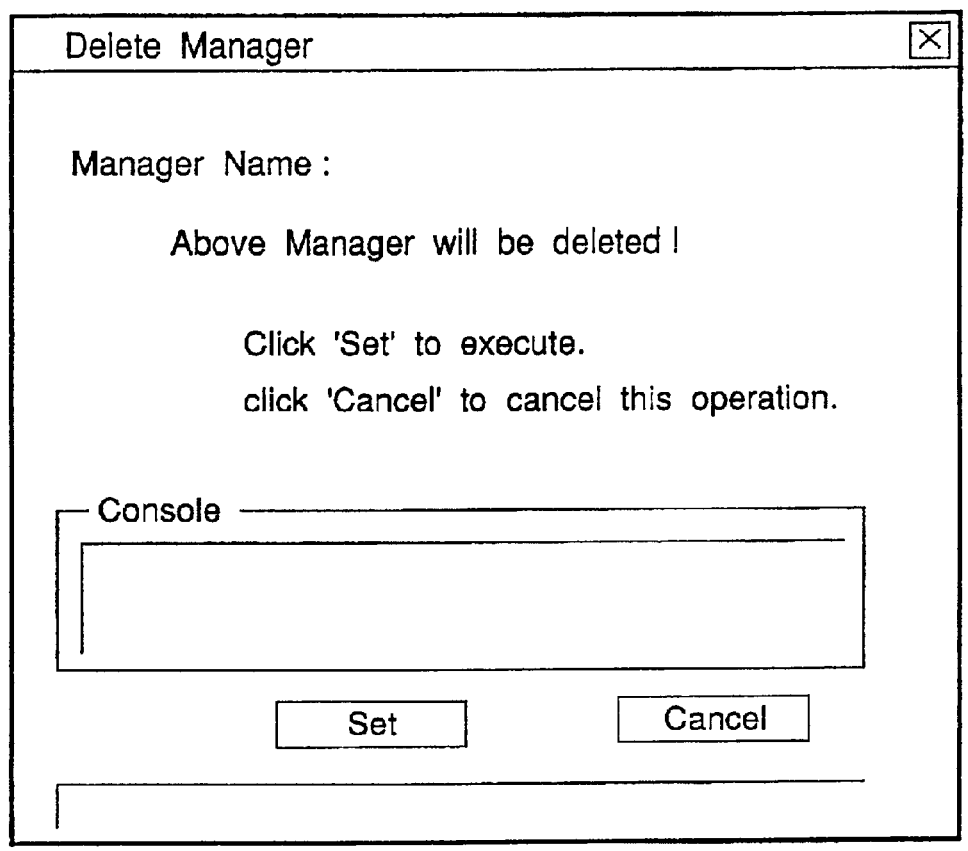
FIG. 65 is a view showing a Delete Manager window.

On the contrary, when any supervisory apparatus displayed in the scroll window in FIG. 61 is selected and a Delete button is then clicked, registration of the selected supervisory apparatus is deleted. At this moment, a CAUTION window such as shown in FIG. 65 may be displayed.

Figure 64:
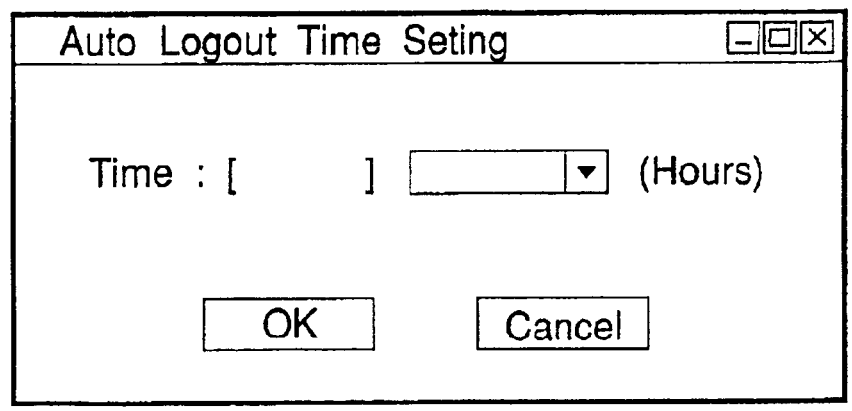
FIG. 64 is a view showing an Auto Logout Time Setting window.

Description will now be given as to an Auto Logout Time Setting window shown in FIG. 64. The FIG. 64 window is opened when Auto Logout Time Setting is clicked from the sub menu shown in FIG. 4. This window is used for setting the time in an auto logout function. The auto logout function automatically performs logoff when no operation is continuously carried out for a predetermine time in the Terminal 5 to which a user has accessed. This kind of function is well known as being effective for assuring the security. In the FIG. 64 window, the time from an initial operation to logoff (namely, the auto logout time) is set.

<System>

The operation concerning System will now be described. In regard to System, as shown in FIG. 6, there are prepared sub menus System Time Setting, Software Information, and Ring APS Control.

(System Time Setting)

A System Time Setting window shown in FIG. 66 will now be described. This window is opened when a System Time Setting button is clicked from the sub menu (shown in FIG. 5) which is opened by clicking System in the FIG. 3 main menu. This window is used for specifying an apparatus in the network system in order to set its operation reference time.

Figure 66:
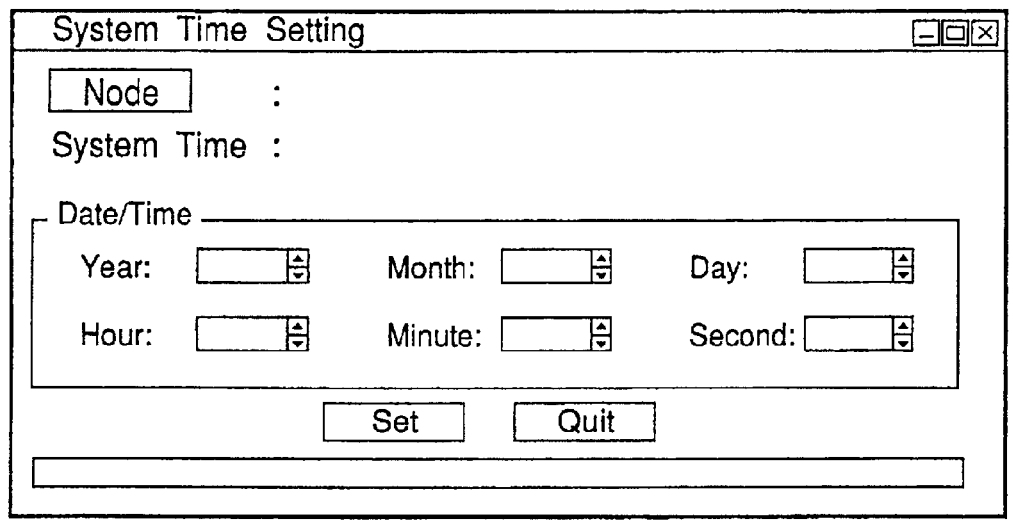
FIG. 66 is a view showing a System Time Setting window.

When the Node button is clicked in the FIG. 66 window, a window for specifying a NODE as a target whose time is to be set is opened, and a NODE as a setting target is specified in this window. The current set state is read from the selected NODE, and the content is reflected to FIG. 66. When the operation time is set in a Date/Time section and the Set button is then clicked in the FIG. 66 window, the time setting with respect to the selected NODE becomes effective.

All the apparatuses existing in the network system can be synchronously operated at the same time by setting the operation time relative to an arbitrary apparatus as described above. As a result, when the network system is set across areas having a difference in time, it is possible to set the operation time of each apparatus in conformity to Universal Time Coordinated (UTC). Of course, the operation time which varies depending on each apparatus can be also set according to needs.

(Ring APS Control)

A Ring APS Control window shown in FIG. 67 will now be described. The FIG. 67 window is displayed when Ring APS Control is clicked from the sub menu shown in FIG. 5. This window is used for setting various parameters concerning a high-speed side redundancy switching function referred to as Ring Aps.

As parameters concerning the Ring APS function, there are a number of NODEs constituting the ring network, a unique node ID of each NODE, a number of time slots of the high-speed side service traffic, a number of time slots of the high-speed side extra traffic, the connection relationship of the NODEs (Ring Topology Map) and others.

Figure 67:
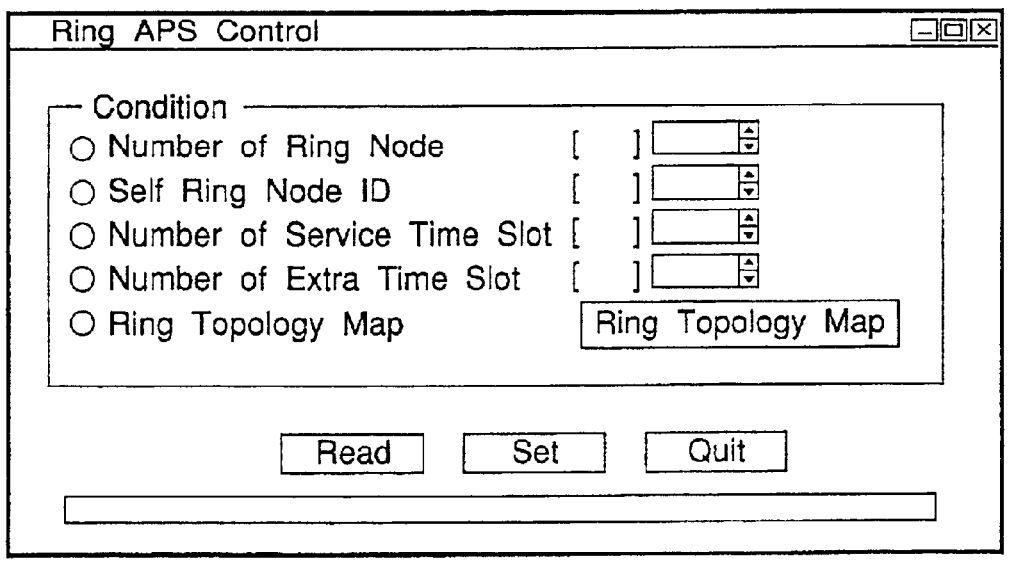
FIG. 67 is a view showing a Ring APS Control window.

When the Read button is clicked in the FIG. 67 window, a current value of each parameter concerning the ring network to which a connected NODE belongs is acquired in the Terminal 5. The acquired parameter value is displayed in the FIG. 67 window. When a numeric figure is inputted in accordance with each parameter item and the Set button is then clicked, the inputted value becomes effective.

When a Ring Topology Map button is clicked in FIG. 67, a Ring Topology Map Configuration window shown in FIG. 68 is opened. The FIG. 68 window is used for arbitrarily setting the connection relationship of the respective NODEs in the ring network. Reference characters A to P given to the Nodes in the FIG. 68 window indicate the NODEs adjacent to each other in the ring in a sequential order. For example, if #0 is A in the network conformation shown in FIG. 3, #1 is B, #2 is C, . . . , and #6 is F. For each NODE, a unique ID in the ring network and an ID of each NODE are separately set.

(Software Information)

Figure 69:
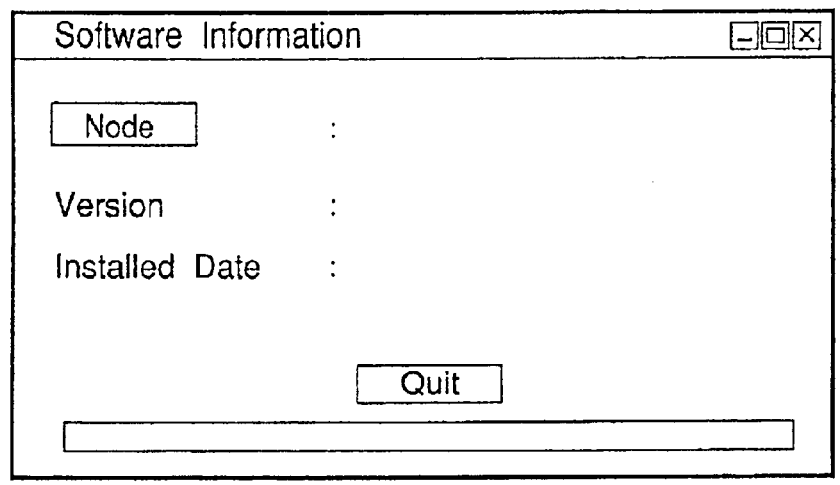
FIG. 69 is a view showing a Software Information window.

A Software Information window shown in FIG. 69 will now be described. The FIG. 69 window is displayed when a Software Information button is clicked in the sub menu shown in FIG. 5. This window is used for specifying a NODE and displaying information concerning software installed in that NODE. When the Node button is clicked and a NODE is selected in this window, version information of software and its date of installation are read from the specified NODE. This read content is displayed in the FIG. 69 window together with a name of that NODE.

<Node-Other>

The operation concerning Node-Other will now be described. In regard to Node-Other, as shown in FIG. 6, there are prepared sub menus LS Card Control and Notification Reporting Control.

(LS Card Control)

Figure 70:
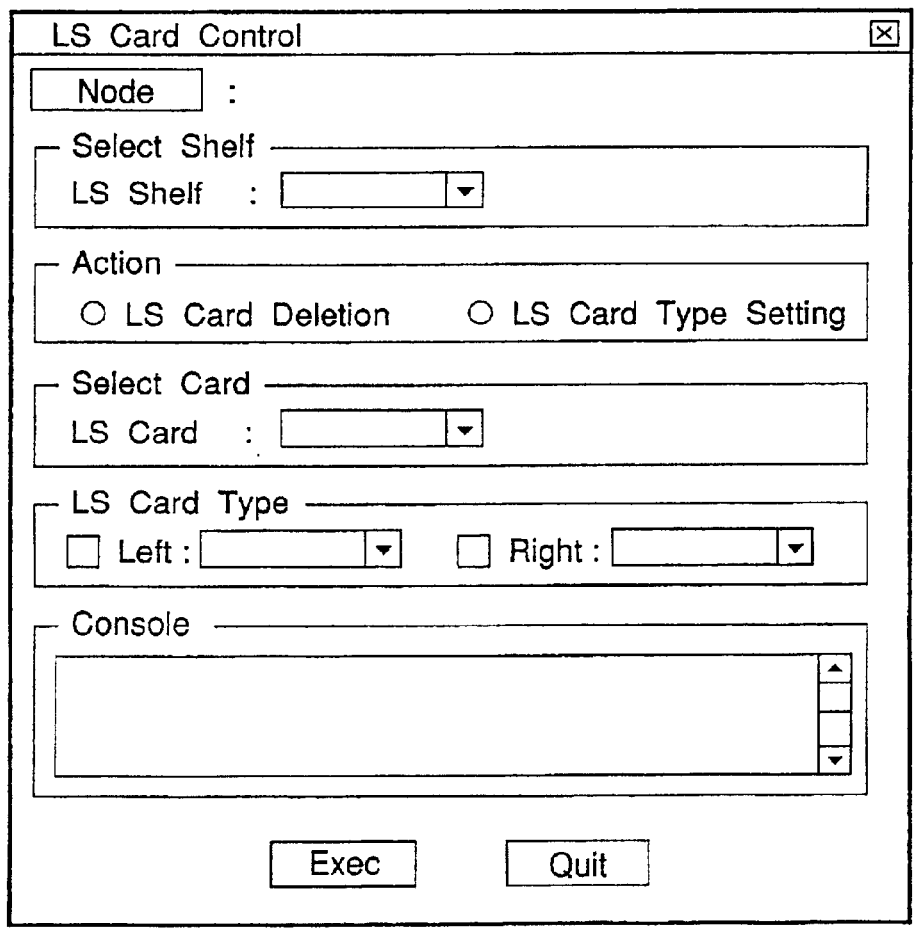
FIG. 70 is a view showing an LS Card Control window.

An LS Card Control window shown in FIG. 70 will ow be described. This window is displayed when an LS Card Control button is clicked in the sub menu (shown in FIG. 6) which is opened by clicking Node-Other in the FIG. 3 main screen. This window is used to select a NODE and set a card (board) mounted on the selected NODE as a supervisory target in the U-NME 3 or delete the card from the supervisory target.

That is, in the respective NODEs 1-1 to 1-n, a low-speed side board (LS card) can be freely inserted/removed. The U-NME 3 must fully grasp changes in the mounting state of a card due to replacement or expansion of a card in order to operate the system. The FIG. 70 window is used to set deletion of a board which is removed from a NODE and no longer mounted from supervisory targets of the U-NME 3.

Figure 71:
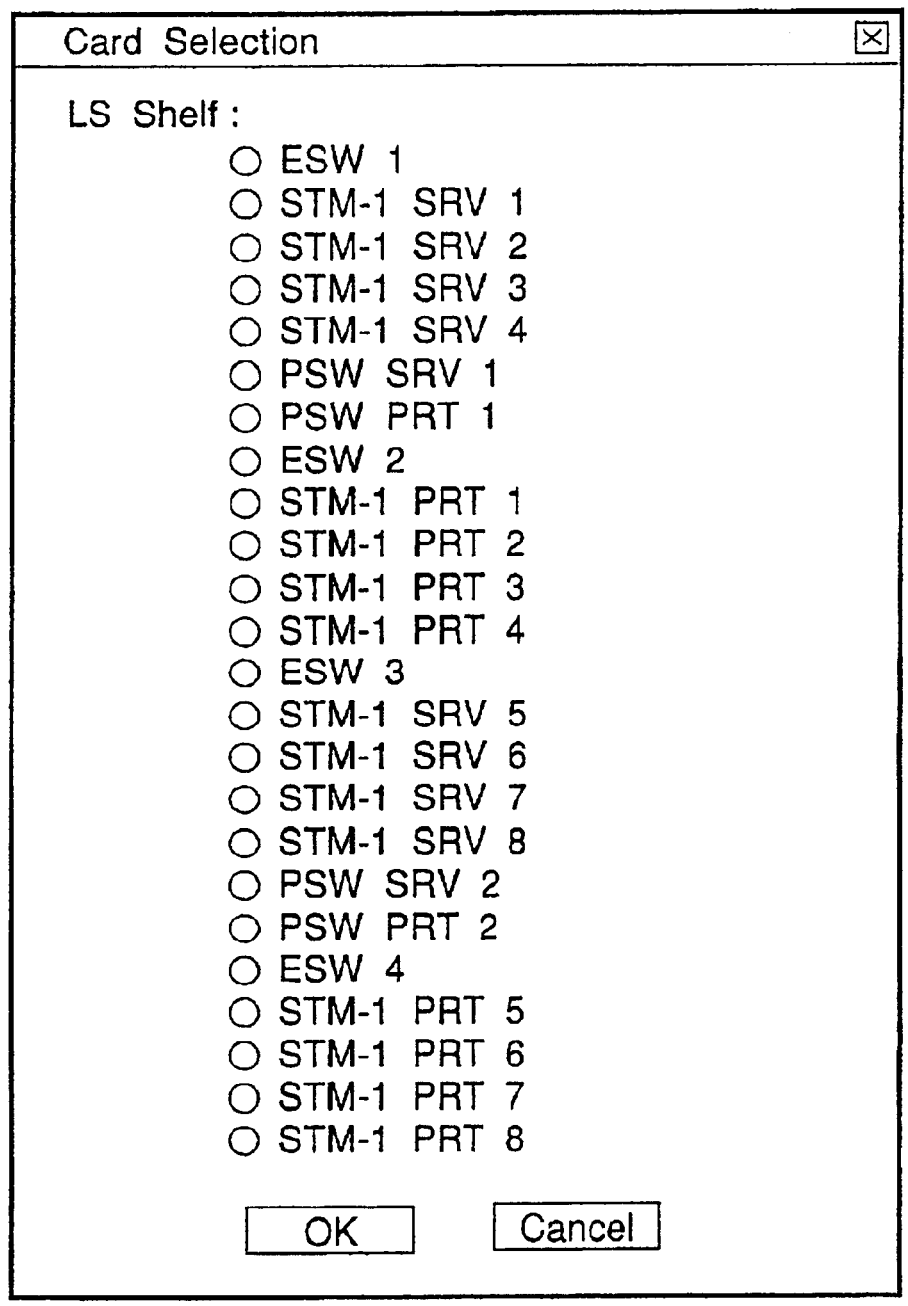
FIG. 71 is a view showing a Card Selection window.

When the Node button is clicked in FIG. 70, a window for selecting a NODE which should be an operation target is opened. An arbitrary NODE is selected in this window, and a low-speed side shelf is selected by a Select Shelf button. When a Select Card button is clicked, a Card Selection window depicted in FIG. 71 is opened, and a low-speed card in the shelf is selected in this window. In the FIG. 71 window, Left or Right can be specified in an LS Card Type section, and a mounting position in the shelf can be also selected.

As described above, an arbitrary board is selected, and either LS Card Deletion (deletion of a target board) or LS Card Type Setting (change of a board type) is selected in an Action section. Subsequently, when the Exec button is clicked, the target NODE is informed of the set content as a message, and this content is set.

By doing so, the following effects can be obtained. It is assumed that one STM-4 board having the throughput capacity equivalent to that of four STM-1 boards is inserted in place of these boards. Then, three slots in which the STM-1 boards have been inserted become vacant, and an alarm indicating that boards are not mounted to the slots is detected. As to the slot in which the STM-4 board is inserted, an alarm indicating that a wrong board is mounted is detected. If this state is left untouched, the state that the U-NME 3 is informed of these alarms endlessly continues, which becomes an obstacle to the system operation.

As a countermeasure, a message is transmitted to the NODE as described above, a board and a slot from which a board is removed are checked off, and a type of the board is changed, thereby avoiding the above-mentioned problem.

(Notification Reporting Control)

Description will now be given as to a Notification Reporting Control window depicted in FIG. 72. This window is opened when a Notification Reporting Control button is clicked from the sub menu shown in FIG. 6, and used for setting from the Terminal 5 side a destination of the notification information for an arbitrary NODE. That is, the FIG. 72 window is used for manually rewriting EFD (Event Forwarding Discriminator) of each node from the Terminal 5 side.

Figure 72:
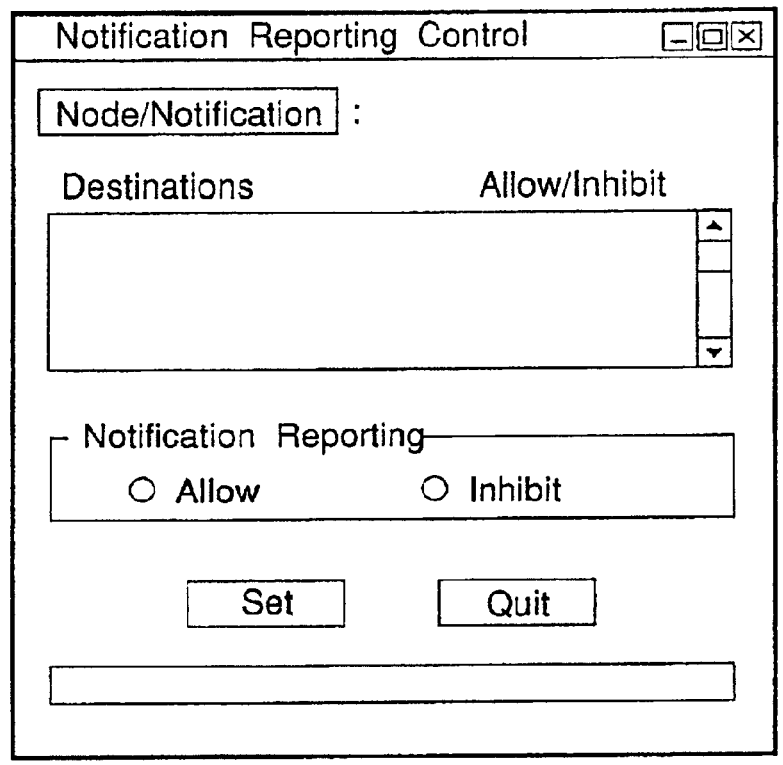
FIG. 72 is a view showing a Notification Reporting Control window.
Figure 73:
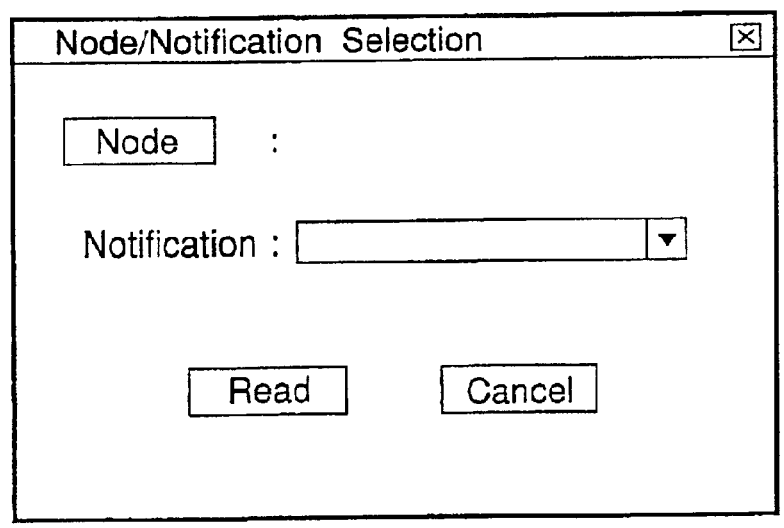
FIG. 73 is a view showing a Node/Notification Selection window.

When a Node/Notification button in FIG. 72 is clicked, a Node/Notification Selection window shown in FIG. 73 is opened. In the FIG. 73 window, a NODE as a target is selected, and a type of notification information (for example, Alarm) as an EFD rewriting target is selected in the FIG. 73 window.

In the window illustrated in FIG. 73, when the Read button is clicked, the current set content is read, and the read value is displayed as shown in FIG. 72. A Destinations section in FIG. 72 displays a name of the U-NME 3 which is a current destination of notification information of the selected node. An arbitrary U-NME 3 is selected in this section, either Allow (allowance) or Inhibit (inhibition) is specified in a Notification Reporting section below the former section.

In this manner, whether notification information is sent is individually set for each U-NME 3. When the Set button is clicked, a message for informing the set content is transmitted to the NODE as an operation target. The NODE having received this message operates in accordance with the set content.

By doing so, the following effects can be obtained. Assuming that any U-NME 3 fails to operate properly, informing this faulty U-NME 3 of notification information causes disadvantages on the system operation. That is because the transmitted notification information is lost in the faulty U-NME 3. Thus, rewriting the EFD in the above-described manner can avoid disadvantages such as loss of important data. Further, the traffic at the time of transmitting notification information to the U-NME 3 takes a relatively large marginal zone. Thus, if the above-described function is used to set informing only the necessary minimum U-NMEs 3 of notification information, notification information can be transmitted by the necessary minimum traffic, thereby reducing the load of the network.

<Display>

The operation concerning Display will now be described. In regard to Display, as shown in FIG. 6, there are prepared sub menus Display Control and Terminal Configuration.

Display Control

A Display Control window shown in FIG. 74 will now be described. This window is opened when Display Control is clicked in the sub menu (shown in FIG. 6) which is opened by clicking Display in the FIG. 3 main screen. In this window, respective clickable Color buttons are provided to items Critical, Major, Minor, Warning, Clear, Other Notifications and Maintenance indicating alarm levels. A current display color of each alarm level is shown in a square [□] on the left side and a newly set display color is shown in a square □ on the right side with the Color button sandwiched between these squares. Although not shown in the drawing, each square is colored.

Figure 74:
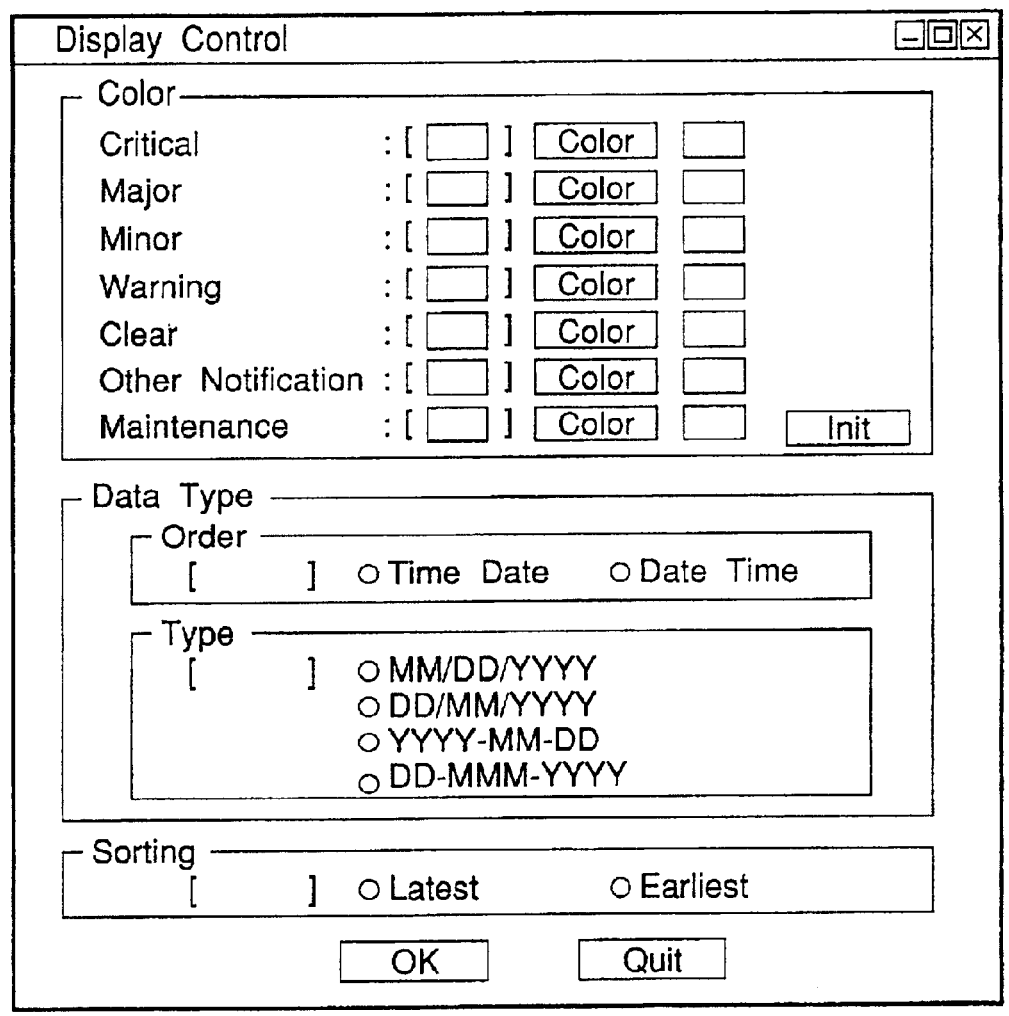
FIG. 74 is a view showing a Display Control window.
Figure 75:
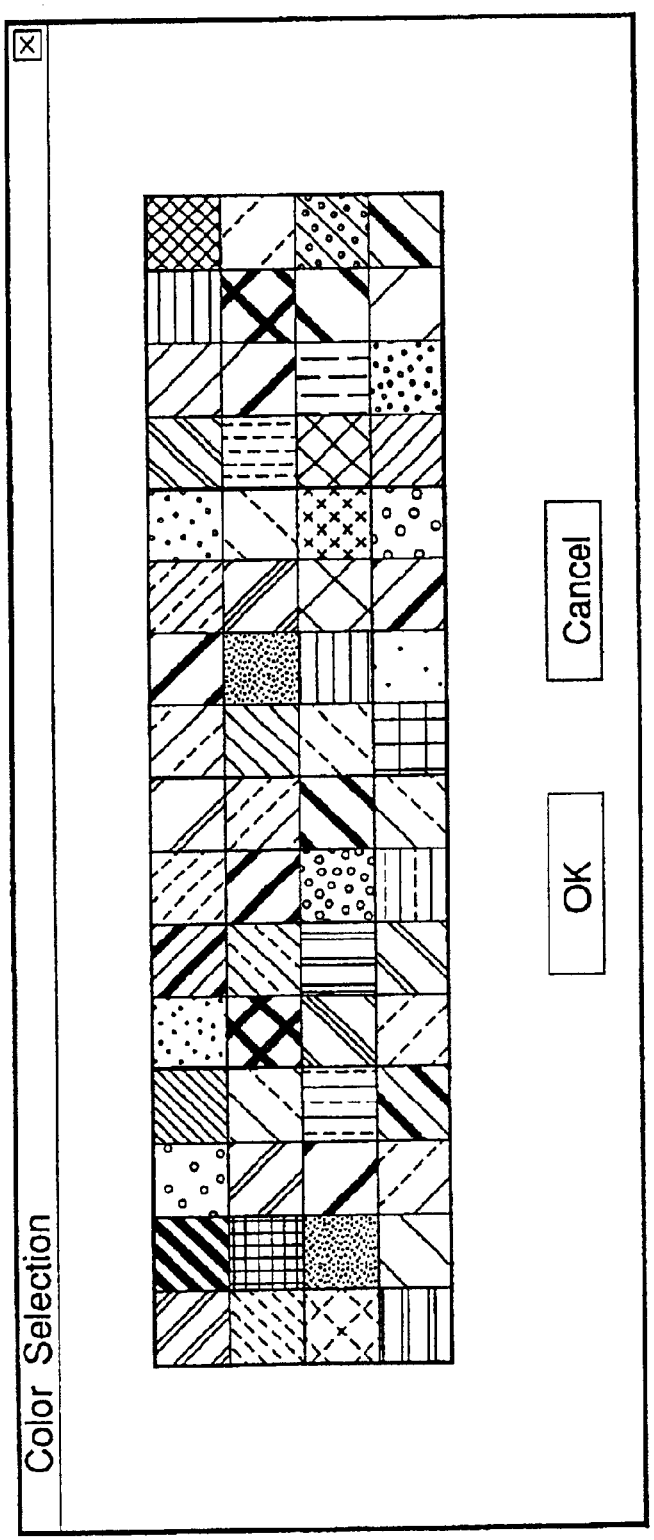
FIG. 75 is a view showing a Color Selection window.

When the Color button is clicked in the FIG. 74 window, a color pallet displayed in a Color Selection window in FIG. 75 is displayed. An arbitrary color is selected for each alarm level by using this pallet. For example, a display color set in the FIG. 74 window is applied to distinction of a faulty station or a faulty line in the FIG. 3 main screen by using different colors. In short, display colors set in this window are all reflected to distinction by using different colors in windows which graphically display the state of failures in the network mentioned above.

An item Date Type is displayed in the FIG. 74 window. In this item, either Time Date or Date Time is specified in an Order section. In accordance with specification in this section, the date and time at which various kinds of data are displayed in the window are displayed in the order of (time and date) or (date and time). A display form of the date, e.g., MM-DD-YYYY (month/day/year) is set in a Type section.

A display order of data is set in a Sorting section in the FIG. 74 window. That is, either displaying data in an arbitrary window from the latest one (Latest) or displaying the same from the earliest one (Earliest) is selected.

Terminal Configuration

A Terminal Configuration window shown in FIG. 76 will now be described. This window is displayed when Terminal Configuration is clicked in the sub menu shown in FIG. 6. The FIG. 76 window is used for manually inputting information of a remote station (NODE which is not connected with the Terminal 5) to the Terminal 5 in advance.

That is, in case of executing the various functions mentioned above, information of the NODE of the remote station may be read by the Terminal 5 through a communication line. At this moment, a quantity of data to be downloaded may be large, and it may often take time for reading this data. Thus, the time required for acquiring data is shortened by previously supplying and storing information by using the FIG. 76 window.

Figure 76:
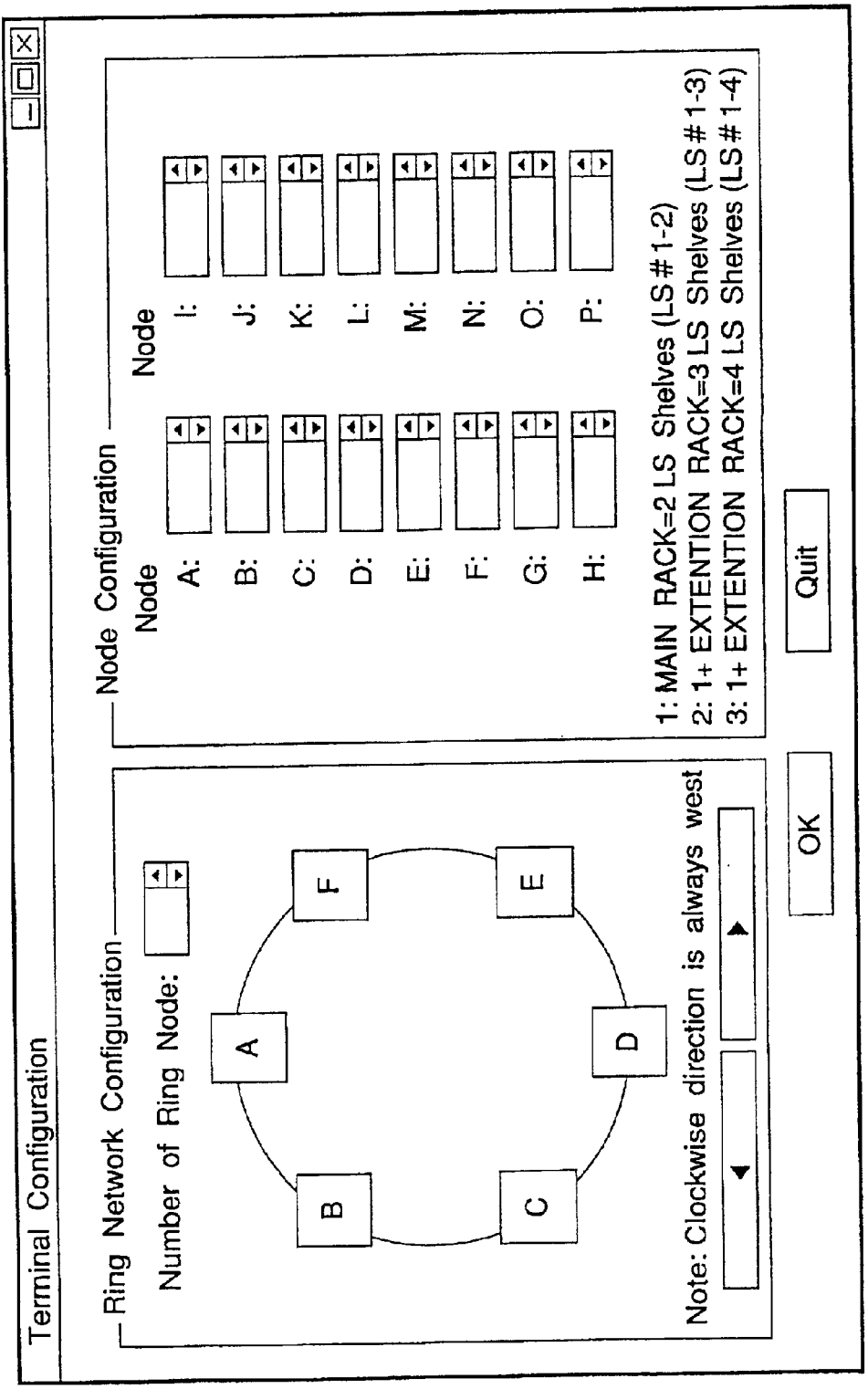
FIG. 76 is a view showing a Terminal Configuration window.

In Ring Network Configuration in the FIG. 76 window, a number of NODEs constituting one ring network is set in a Number of Ring Node section. A downward arrow button rotates a ring formed by the NODEs A to F in the clockwise or counterclockwise direction, and, for example, whether a local node (NODE to which the Terminal 5 is connected) is displayed on the top is set.

In Node Configuration, respective items 1, 2 and 3 are set in the form of numeric figures for each NODE displayed in Ring Network Configuration, and configuration information of each NODE is set.

As described above, according to this embodiment, it is possible to provide a supervisory control apparatus which can improve the human-machine interface and facilitate the operation.

It is to be noted that the present invention is not restricted to the above-described embodiment.

For example, the above-embodiment has described the functions in the Terminal 5, the SSE 2 can be provided with the similar functions within the range of its share.

Further, although one U-NME 3 is set in each station in the foregoing embodiment, one U-NME 3 may perform supervisory control over the entire network depending on the system, or the U-NME 3 may be set in an arbitrary station.

Furthermore, a name of each window and function button mentioned above, arrangement of a displayed objected in each window, a position of each function buttons and others are not restricted to those in the above-described embodiment.

Besides, various modifications are possible without departing from the scope of the present invention.

As described above, according to the present invention, it is possible to provide a terminal apparatus for an operator and a communication path setting method which can improve the human-machine interface and facilitate the operation.

Thus, the present invention is effective for technical fields relating to an optical undersea cable system, and particularly for technical fields concerning a network that conform to SDH/SONET.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A terminal apparatus for an operator used when connected to an arbitrary node in a network system including a plurality of ring networks each of which includes a plurality of nodes connected to each other through a communication line, said terminal apparatus for an operator comprising:

a display unit;

operating means for accepting click operations by a user;

information acquiring means for acquiring from a connected node notification information concerning a ring network to which said node belongs;

information processing means for managing occurrence statuses of failures in said network system based on said notification information acquired by said information acquiring means; and display controlling means for displaying information processed by said information processing means on said display unit, wherein said display controlling means displays a node icon associated with each node belonging to a ring network to which a node connected with its own apparatus belongs, displays a line associated with said communication line between said node icons on said display unit, and causes display modes of said node icon and said line to differ from each other depending on presence/absence of a failure in a corresponding node or communication line.

2. The terminal apparatus for an operator according to claim 1, wherein, when said each node includes a plurality of shelves, said display controlling means displays a first window on a screen of said display unit if any of said node icons is clicked by said operating means, displays in said first window a type drawing showing a shelf configuration of a node corresponding to said clicked icon, and displays a plurality of shelves shown in said type drawing in display modes which differ from each other depending on presence/absence of a failure in each shelf.

3. The terminal apparatus for an operator according to claim 2, wherein, when each of a plurality of shelves includes one or a plurality of cards, said display controlling means displays a second window on said screen of said display unit if any shelf shown in said type drawing is clicked by said operating means, displays a view showing a card configuration of said clicked shelf in said second window in said display unit, and displays a plurality of cards shown in said view of a card configuration in display modes which differ from each other depending on presence/absence of a failure in each card.

4. A terminal apparatus for an operator used when connected to an arbitrary node in a network system including a plurality of ring networks each of which includes a plurality of nodes, said terminal apparatus for an operator comprising:

a display unit;

operating means for accepting click operations by a user;

information acquiring means for acquiring from a connected node notification information concerning a ring network to which said node belongs;

information processing means for managing statuses of said network system based on said notification information acquired by said information acquiring means; and display controlling means for displaying information processed by said information processing means on said display unit, wherein said display controlling means displays a first window on a screen of said display unit, and displays in said first window a list of said notification information acquired by said information acquiring means in a text format together with a plurality of attributes characterizing each set of said notification information.

5. The terminal apparatus for an operator according to claim 4, wherein said display controlling means displays a button on said screen of said display unit, displays a second window on said screen of said display unit when said button is clicked by said operating means, displays in said second window an attribute specification section for arbitrarily selecting and specifying a plurality of said attributes, and selectively displays in said first window notification information having attributes specified in said attribute specification section.

6. The terminal apparatus for an operator according to claim 4, wherein said display controlling means displays a button on said screen of said display unit, displays a second window on said screen of said display unit when said button is clicked by said operating means, displays in said second window a section for setting an order of displaying said attributes in said first window, and rearranges said order of said attributes displayed in said first window in accordance with an order set in said section.

7. The terminal apparatus for an operator according to claim 4, wherein said display controlling means displays a button on said screen of said display unit, displays a second window on said screen of said display unit when said button is clicked by said operating means, displays in said second window a list of nodes which are management targets of its own apparatus; and wherein, when one or a plurality of nodes displayed in said second window are specified by said operating means, said information acquiring means masks alarm information included in notification information transmitted from said specified nodes.

8. The terminal apparatus according to claim 4, further comprising: an informing buzzer which sounds under predetermined conditions; and buzzer controlling means for controlling sounding of said informing buzzer, wherein said display controlling means displays a button on said screen of said display unit, displays a second window on said screen of said display unit when said button is clicked by said operating means, and displays in said second window a condition setting section for setting conditions for sounding said informing buzzer; and wherein said buzzer controlling means sounds said informing buzzer under conditions set in said condition setting section in said second window.

9. A terminal apparatus for an operator used when connected to an arbitrary node in a network system including a plurality of ring networks, each of said ring networks including a plurality of nodes, each node including storing means for accumulating a history of notification information concerning network management, said terminal apparatus for an operator comprising:

a display unit;

operating means for accepting click operations by a user;

information acquiring means for acquiring from a connected node notification information concerning a ring network to which said node belongs;

information processing means for managing statuses of said network system based on said notification information acquired by said information acquiring means; and display controlling means for displaying information processed by said information processing means on said display unit, wherein said display controlling means displays a first window on a screen of said display unit, displays in said first window a retrieval condition specification section for specifying a retrieval condition for retrieving desired notification information from a history accumulated in said storing means;

wherein said information processing means retrieves notification information satisfying said retrieval condition specified in said first window from a history accumulated in said storing means; and wherein said display controlling means display a second window on said screen of said display unit, and displays in said second window notification information retrieved by said information processing means in a text format together with a plurality of attributes characterizing said retrieved notification information.

10. The terminal apparatus for an operator according to claim 9, further comprising operating means for accepting click operations by a user, wherein said display controlling means displays a first button on said screen of said display unit, displays a third window on said screen of said display unit when said button is clicked by said operating means, displays in said third window an attribute specification section for arbitrarily selecting and specifying a plurality of attributes, and selectively displays in said second window notification information having attributes specified in said attribute specification section.

11. The terminal apparatus for an operator according to claim 9, further comprising operating means for accepting click operations by a user, wherein said display controlling means displays a second button on said screen of said display unit, displays a fourth window on said screen of said display unit when said second button is clicked by said operating means, and displays in said fourth window:

a section for specifying a node as an operation target and setting a maximum value of the size of a storage resource area of a history accumulated in said node; and a section for individually setting the size of said storage resource area of a notification information history to be accumulated; and wherein said information processing means can vary the size of said storage resource area of a history in an arbitrary node in accordance with the content set in said fourth window.

12. A terminal apparatus for an operator used when connected to an arbitrary node in a network system, said network system including a plurality of ring networks, each of said ring networks including a plurality of nodes, each node including storing means for accumulating a history of notification information including at least quality information concerning communication quality in said network system, said terminal apparatus for an operator comprising:

a display unit;

operating means for accepting click operations by a user;

information acquiring means for acquiring from a connected node notification information concerning a ring network to which said node belongs;

information processing means for managing statuses of said network system based on said notification information acquired by said information acquiring means; and display controlling means for displaying information processed by said information processing means on said display unit, wherein said display controlling means displays a first button on a screen of said display unit, displays a first window on said screen of said display unit when said first button is clicked by said operating means, and displays in said first window a retrieval condition specification section for specifying retrieval conditions for retrieving desired notification information from a history accumulated in said storing means;

wherein said information processing means retrieves notification information satisfying a retrieval condition specified in said first window from a history accumulated in said storing means; and wherein said display controlling means displays in said first window said notification information retrieved by said information processing means in a text format together with a plurality of attributes characterizing said retrieved notification information.

13. The terminal apparatus for an operator according to claim 12, wherein said display controlling means displays a second button on said screen of said display unit, displays a second window on said screen of said display unit when said second button is clicked by said operating means, and displays in said second window:

an operation target specification section for specifying a node as an operation target and a channel and a section thereof;

a section for specifying whether notification is performed in accordance with each type of quality information measured with respect to an operation target specified in said operation target specification section;

a section for setting a level of importance in accordance with each type of quality information measured with respect to an operation target specified in said operation target specification section; and a section for setting a threshold value used when performing notification for quality information measured with respect to an operation target specified in said operation target specification section; and wherein said information processing means informs a node as said operation target of the content specified in said second window and informs said node of quality information in accordance with said content.

14. A terminal apparatus for an operator used when connected to an arbitrary node in a network system including a plurality of ring networks, each of said ring networks including a plurality of nodes, said terminal apparatus for an operator comprising:

a display unit;

information acquiring means for acquiring notification information respectively transmitted from a plurality of said nodes;

information processing means for managing occurrence statuses of alarms in said network system based on said notification information acquired by said information acquiring means; and display controlling means for displaying information processed by said information processing means on said display unit, wherein said display controlling means displays a first button on a screen of said display unit, displays a first window on said screen of said display unit when said first button is clicked by said operating means, displays in said first window:

a first section for specifying an operation target which is on a level of urgency of said alarm; and a second section for selecting an occurrence cause of said alarm for said operation target specified in said first section, and reads a current set state of a level of urgency of said specified occurrence cause of said alarm with respect to a node having said operation target and displays a list of reading result in accordance with each occurrence cause when said operation target and said occurrence cause are specified in said first window; and wherein said information processing means causes an operator of its own apparatus to individually set a level of urgency in accordance with each occurrence cause of said alarm displayed in said list in said first window, and sets a level of urgency in accordance with each set occurrence cause of said alarm with respect to a node as said operation target.

15. The terminal apparatus for an operator according to claim 14, wherein said display controlling means displays a second button on said screen of said display unit, displays a second window on said screen of said display unit when said second button is clicked by said operating means, and displays in said second window a section for causing an operator of its own apparatus to specify a node as an operation target and a shelf thereof and set transmission or non-transmission of a maintenance signal to said specified operation target in said second window; and wherein said information processing means sets the content set in said second window to a node including said operation target.

16. The terminal apparatus for an operator according to claim 14, wherein said display controlling means displays a second button on said screen of said display unit, displays a second window on said screen of said display unit when said second button is clicked by said operating means, displays in said second window a section for causing an operator of its own apparatus to specify a node as an operation target and a shelf thereof and set a threshold value of an alarm indicative of signal quality degradation with respect to said specified operation target, and sets said threshold value set in said section to a node including said operation target.

17. A terminal apparatus for an operator used when connected to an arbitrary node in a network system, said network system including a plurality of ring networks, each of a plurality of said ring networks including a plurality of nodes and a traffic bypass function, a plurality of said nodes being connected to each other in a ring form through a communication line in which a plurality of paths are multiplexed, said communication line including a working system line and a preliminary line, said traffic bypass function for causing service traffic transmitted through said working system line to make a detour to said preliminary line, said terminal apparatus for an operator comprising:

a display unit;

information acquiring means for acquiring from a connected node notification information concerning a ring network to which said node belongs;

information processing means for managing statuses of said traffic bypass function in said network system based on said notification information acquired by said information acquiring means; and display controlling means for displaying information processed by said information processing means on said display unit, wherein said display controlling means displays a first button on a screen of said display unit, displays a first window on said screen of said display unit when said first button is clicked by said operating means, and displays in said first window an arrow associated with each path in a target ring network.

18. The terminal apparatus for an operator according to claim 17, wherein said display controlling means displays a second button on said screen of said display unit, displays a second window on said screen of said display unit when said second button is clicked by said operating means, and displays in said second window a section for causing an operator of its own apparatus to specify a transmission interval as an operation target and causing an operator of its own apparatus to set values of parameters concerning said traffic bypass function with respect to said specified operation target; and wherein said information processing means sets said values set in said section with respect to a node concerning said operation target.

19. The terminal apparatus for an operator according to claim 17, wherein said display controlling means displays information indicative of a destination to which a path corresponding to said arrow displayed in said first window is dropped in association with said arrow.

20. The terminal apparatus for an operator according to claim 19, wherein said information indicative of a destination to which a path is dropped includes at least a low-speed side channel number to which said path is dropped and information indicative of a type of concatenation of said path.

21. A terminal apparatus for an operator used when connected to an arbitrary node in a network system including a plurality of nodes each of which is provided with a plurality of boards, said terminal apparatus for an operator comprising:

a display unit;

operating means for accepting click operations by a user;

information acquiring means for acquiring from a connected node notification information concerning said network system; and display controlling means for display information processed by said information processing means on said display unit, wherein said display controlling means displays a first button on a screen of said display unit, displays a first window on said screen of said display unit when said first button is clicked by said operating means, and displays in said first window a section for causing an operator of its own apparatus to select one of nodes existing in said network system and specify a board of said selected node; and wherein said information processing means deletes said board selected in said first window from supervisory control targets of its own apparatus.

22. The terminal apparatus for an operator according to claim 21, wherein said display controlling means displays a second button on said screen of said display unit, displays a second window on said screen of said display unit when said 15th button is clicked by said operating means, and displays in said second window a section for causing an operator of its own apparatus to specify an arbitrary node and specify a type of notification information transmitted from said specified node; and wherein said information processing means reads set states of destinations of said notification information specified in said second window from said specified node and displays a list of said set states in said second window, causes a user to set allowance or inhibition of notification of said specified notification information with respect to said destinations displayed as a list, and sets the content set in said second window with respect to said specified node.

23. A terminal apparatus for an operator used when connected to an arbitrary node in a network system including a plurality of nodes, said terminal apparatus for an operator comprising:

a display unit;

information acquiring means for acquiring from a connected node notification information concerning said network system;

information processing means for managing said network system based on said notification information acquired by said information acquiring means; and display controlling means for displaying information processed by said information processing means on said display unit, wherein said display controlling means displays a first button on a screen of said display unit, displays a first window on said screen of said display unit when said first button is clicked by said operating means, and displays in said first window a list of operators who are allowed to login to its own apparatus while associating a name of each operator with an expiration date of a password and an access level of said each operator.

24. The terminal apparatus for an operator according to claim 23, wherein said display controlling means displays a second button on a screen of said display unit, displays a second window on said screen of said display unit when said second button is clicked by said operating means, and displays in said second window:

a section for causing an operator of its own apparatus to input his/her name; and a section for causing said operator to input his/her password and access level; and wherein said information processing means newly registers said operator inputted in said second window as a user whose can login to its own apparatus.

25. The terminal apparatus for an operator according to claim 23, wherein said display controlling means displays a second button on said screen of said display unit, displays a second window on said screen of said display unit when said second button is clicked by said operating means, and displays in said second window a section for causing an operator of its own apparatus to select an arbitrary node in said network system;

wherein said information processing means reads a name of a terminal apparatus for an operator registered in a node selected in said second window from said selected node; and wherein said display controlling means displays in said second window a list of said name of said terminal apparatus for an operator read by said information processing means.

26. The terminal apparatus for an operator according to claim 23, wherein said display controlling means displays a second button on said screen of said display unit, displays a second window on said screen of said display unit when said second button is clicked by said operating means, and displays in said second window:

a section for causing an operator of its own apparatus to select an arbitrary terminal apparatus for an operator in said network system; and a section for causing an operator of its own apparatus to set an access level with respect to said terminal apparatus for an operator selected in said section; and wherein said information processing means determines a node selected in said second window as a control target of said terminal apparatus for an operator selected in said first window and registers it together with said selected access level.

27. A terminal apparatus for an operator used when connected to an arbitrary node in a network system including a plurality of nodes, said terminal apparatus for an operator comprising:

a display unit;

information acquiring means for acquiring from a connected node notification information concerning said network system;

information processing means for managing said network system based on said notification information acquired by said information acquiring means; and display controlling means for display information processed by said information processing means on said display unit, wherein said display controlling means displays a first button on a screen of said display unit, displays a first window on said screen of said display unit when said first button is clicked by said operating means, displays in said first window:

a section for causing an operator of its own apparatus to select an arbitrary node in said network system;

a list of a current set status of an operation reference time in accordance with each node selected in said section; and a section for causing a user to select an arbitrary apparatus from said list and causing a user to individually set an operation reference time with respect to said selected apparatus; and wherein said information processing means sets said operation reference time set in said first window with respect to said selected node.

* * * * *